US010527775B2

(12) United States Patent
Yang et al.

(10) Patent No.: US 10,527,775 B2
(45) Date of Patent: Jan. 7, 2020

(54) OPTICAL SUBSTRATES HAVING LIGHT COLLIMATING AND DIFFUSION STRUCTURES

(71) Applicant: UBRIGHT OPTRONICS CORPORATION, Dasi Town, Taoyuan County (TW)

(72) Inventors: Ching-An Yang, Dasi Town (TW); Han-Tsung Pan, Dasi Town (TW)

(73) Assignee: UBRIGHT OPTRONICS CORPORATION, Taoyuan County (TW)

(*) Notice: Subject to any disclaimer, the term of this patent is extended or adjusted under 35 U.S.C. 154(b) by 117 days.

(21) Appl. No.: 15/196,059

(22) Filed: Jun. 29, 2016

(65) Prior Publication Data
US 2016/0341883 A1  Nov. 24, 2016

Related U.S. Application Data

(63) Continuation of application No. 14/870,008, filed on Sep. 30, 2015, now abandoned, which is a (Continued)

(51) Int. Cl.
*F21V 8/00* (2006.01)
*B29D 11/00* (2006.01)
(Continued)

(52) U.S. Cl.
CPC .............. *G02B 6/0053* (2013.01); *B26D 3/06* (2013.01); *B29C 33/3842* (2013.01);
(Continued)

(58) Field of Classification Search
CPC .. G02B 6/0053; G02B 6/0051; G02B 6/0058; G02B 27/30; G02B 5/0278;
(Continued)

(56) References Cited

U.S. PATENT DOCUMENTS 5,808,784 A * 9/1998 Ando .................... G02B 3/0031
359/400
2004/0196516 A1* 10/2004 Petersen ............. B29C 35/0888
359/15
(Continued)

*Primary Examiner* — Charles S Chang
(74) *Attorney, Agent, or Firm* — Min-Lee Teng; Litron Patent & Trademark Office

(57) ABSTRACT

This invention discloses a method of forming an uneven structure on a substrate. Use a hard tool to penetrate into a mold to cut a first trench and a second trench in an order on a surface of a mold, wherein the hard tool has a smoothly-curved shape such that the transverse width of each of the first trench and the second trench increases as the penetrating depth of the hard tool increases, wherein when each of the first trench and the second trench marches along a first direction, the penetrating depth of the hard tool is controlled by repeating moving the hard tool up and down to cut the mold such that the transverse width of each of the first trench and the second trench varies according to the controlled penetrating depth of the hard tool, wherein the first trench and the second trench completely overlap with each other with no space therebetween. Then, use the surface of the mold to emboss a thin film on a substrate.

19 Claims, 29 Drawing Sheets

Related U.S. Application Data continuation-in-part of application No. 14/469,572, filed on Aug. 26, 2014, now Pat. No. 9,180,609, which is a continuation-in-part of application No. 14/166,842, filed on Jan. 28, 2014, now Pat. No. 9,851,479, which is a continuation-in-part of application No. 13/073,859, filed on Mar. 28, 2011, now Pat. No. 8,638,408.

(60) Provisional application No. 61/318,061, filed on Mar. 26, 2010, provisional application No. 61/406,094, filed on Oct. 22, 2010.

(51) Int. Cl.

| | | |
|---|---|---|
| *B29C 33/38* | (2006.01) | |
| *B26D 3/06* | (2006.01) | |
| *G02F 1/1335* | (2006.01) | |
| *G02B 5/02* | (2006.01) | |
| *B29C 33/42* | (2006.01) | |
| *G02B 3/00* | (2006.01) | |
| *B29C 59/02* | (2006.01) | |
| *G02B 27/30* | (2006.01) | |
| *B29L 11/00* | (2006.01) | |
| *G02F 1/13357* | (2006.01) | |
| *B29C 35/08* | (2006.01) | |

(52) U.S. Cl.
CPC .......... *B29C 33/424* (2013.01); *B29C 59/026* (2013.01); *B29D 11/00278* (2013.01); *B29D 11/00798* (2013.01); *G02B 3/0043* (2013.01); *G02B 3/0068* (2013.01); *G02B 5/0215* (2013.01); *G02B 5/0221* (2013.01); *G02B 5/0278* (2013.01); *G02B 6/0051* (2013.01); *G02B 6/0058* (2013.01); *G02B 27/30* (2013.01); *G02F 1/133504* (2013.01); *B29C 2035/0827* (2013.01); *B29C 2059/023* (2013.01); *B29L 2011/00* (2013.01); *B29L 2011/0016* (2013.01); *G02F 2001/133607* (2013.01)

(58) Field of Classification Search
CPC .. G02B 5/0221; G02B 3/0043; G02B 3/0068; G02B 5/0215; B26D 3/06; G02F 1/133504; G02F 2001/133607; B29D 11/00278; B29D 11/00798; B29L 2011/0016; B29L 2011/00; B29C 33/3842; B29C 33/424; B29C 59/026; B29C 2035/0827; B29C 2059/023
USPC .......................................................... 349/64
See application file for complete search history.

(56) References Cited

U.S. PATENT DOCUMENTS

| | | | | |
|---|---|---|---|---|
| 2004/0246697 | A1* | 12/2004 | Yamashita | G02B 6/0038 362/612 |
| 2009/0147179 | A1* | 6/2009 | Yamashita | G02B 5/0221 349/64 |
| 2010/0271840 | A1* | 10/2010 | Hamada | G02B 5/0242 362/606 |
| 2013/0121021 | A1* | 5/2013 | Lin | G02B 5/0215 362/606 |

* cited by examiner

FIG. 1 (PRIOR ART)
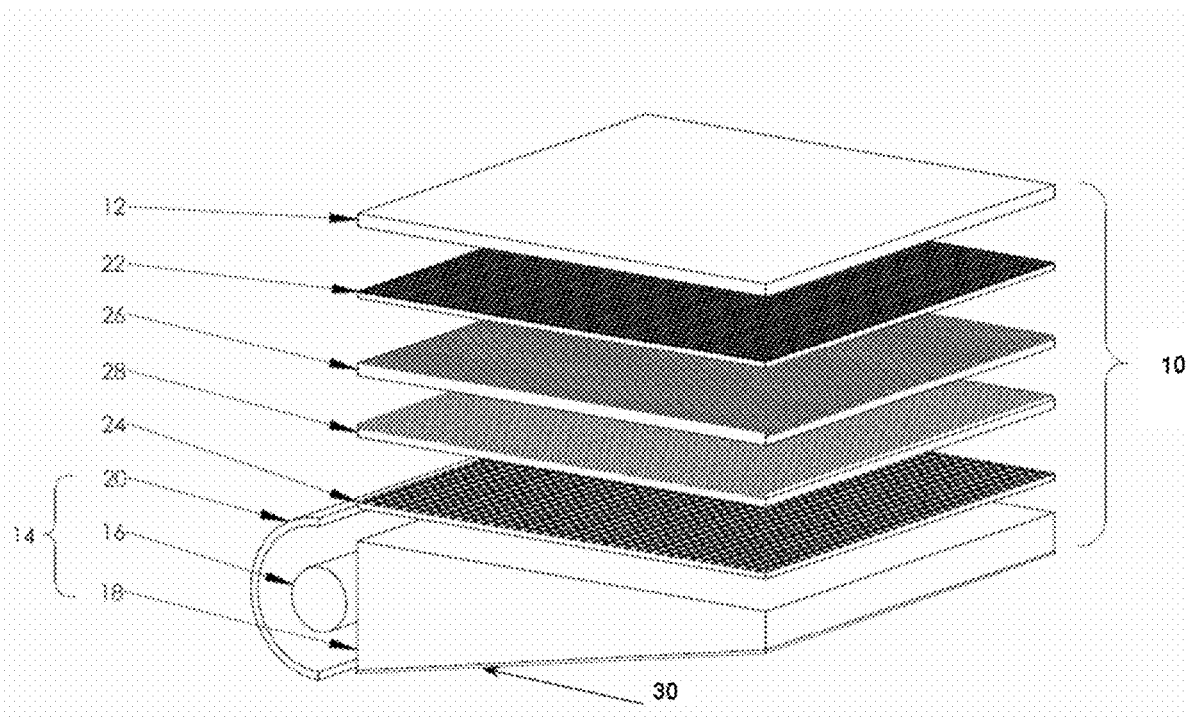
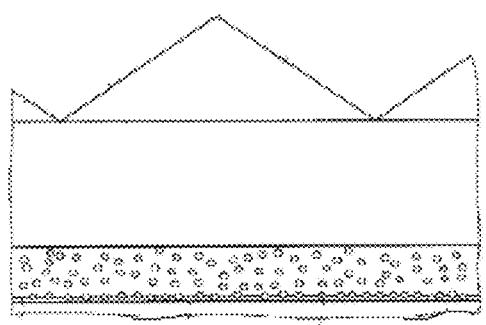
FIG. 2 (PRIOR ART)

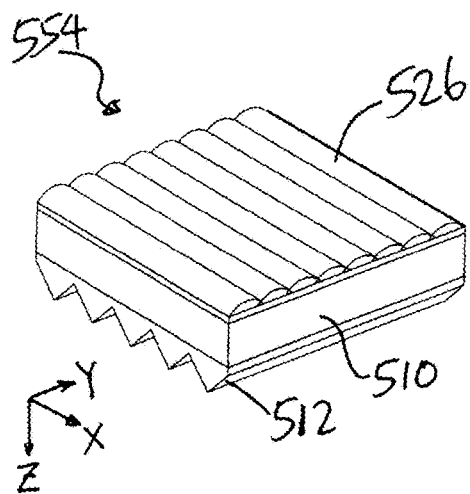 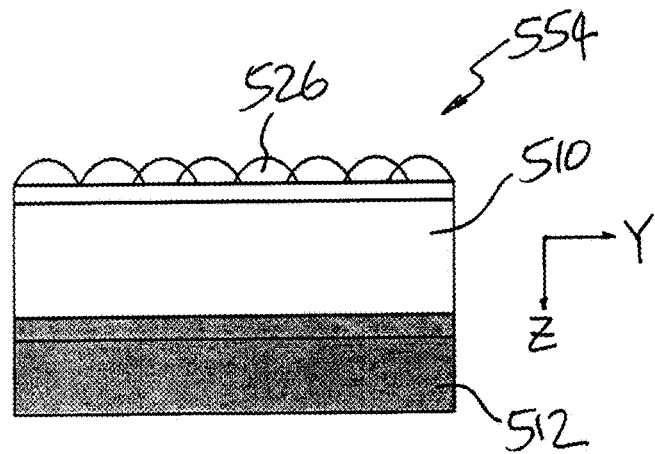
FIG. 12a　　　　　　FIG. 12b
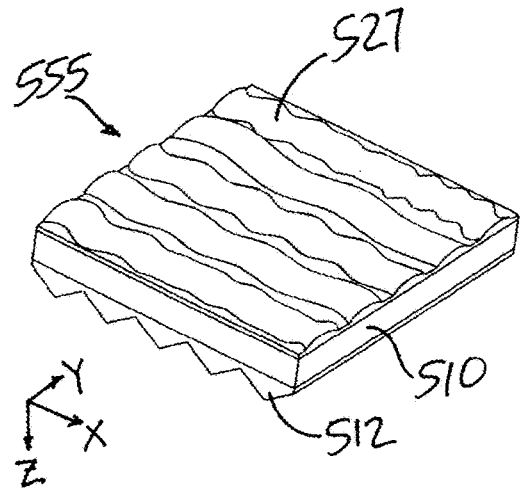 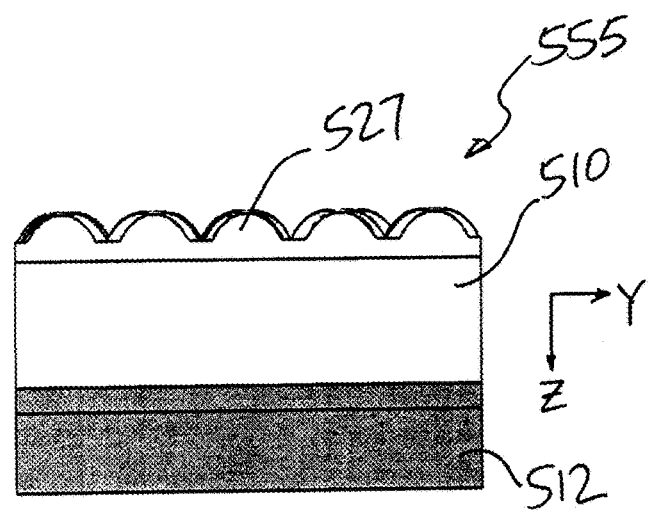
FIG. 13a　　　　　　FIG. 13b

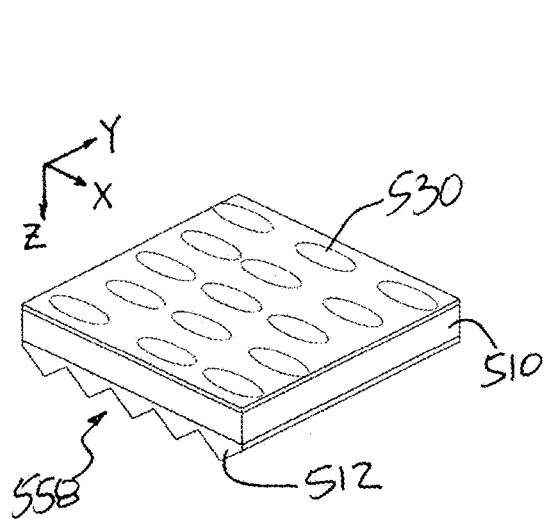
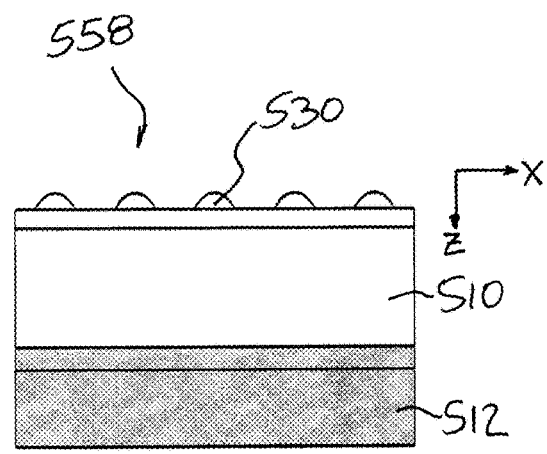
FIG. 16a  FIG.16b
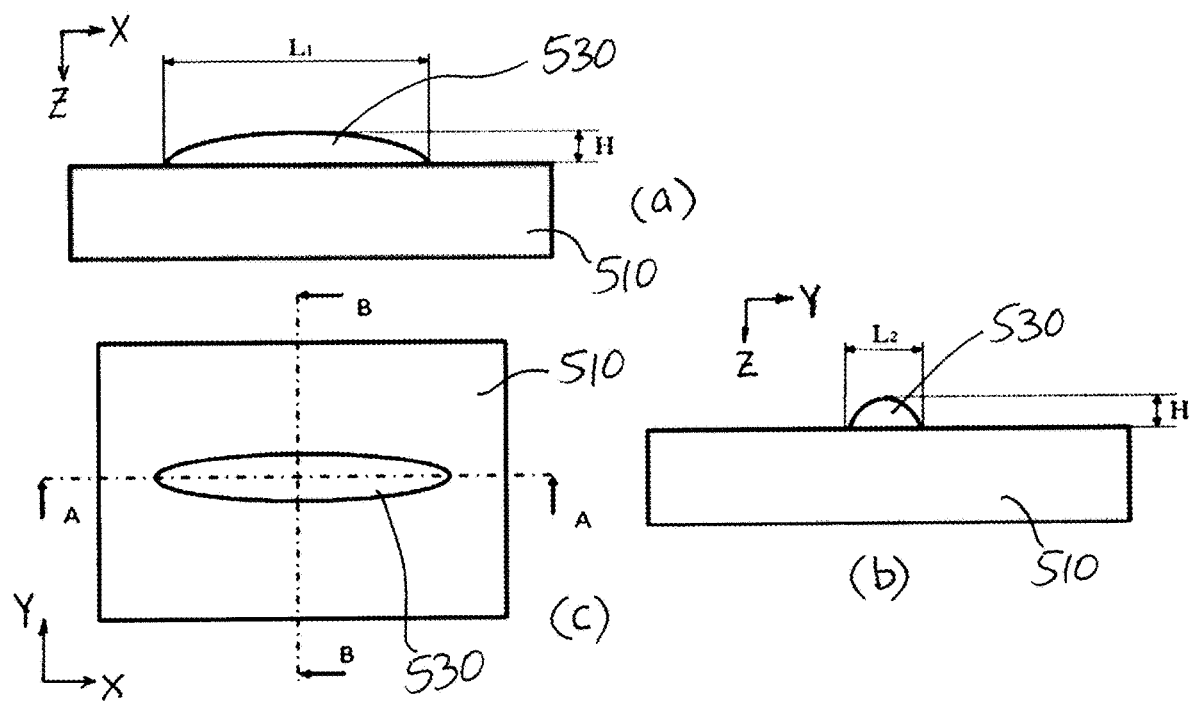
FIG. 17

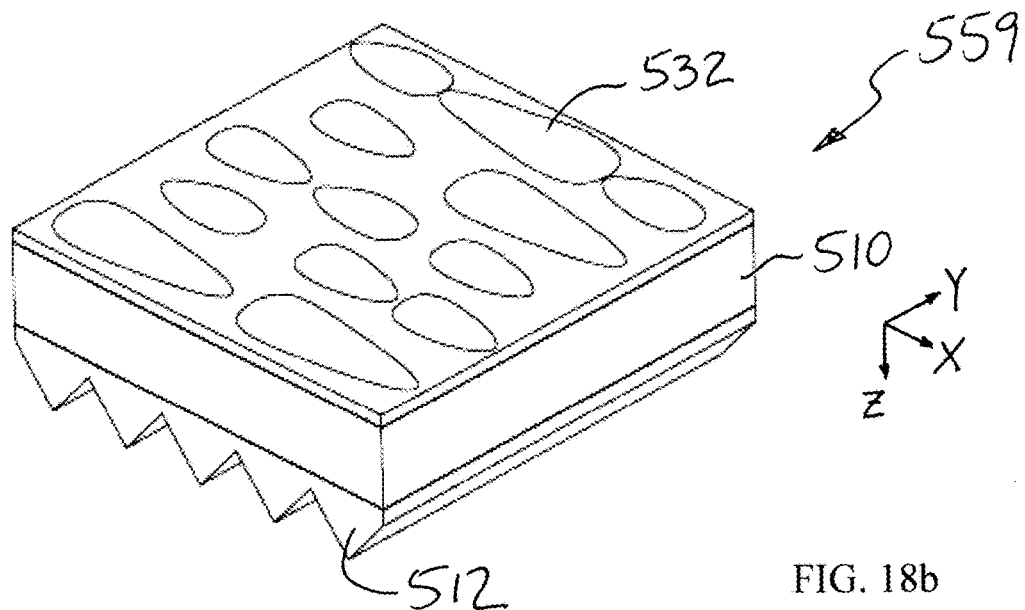
FIG. 18b
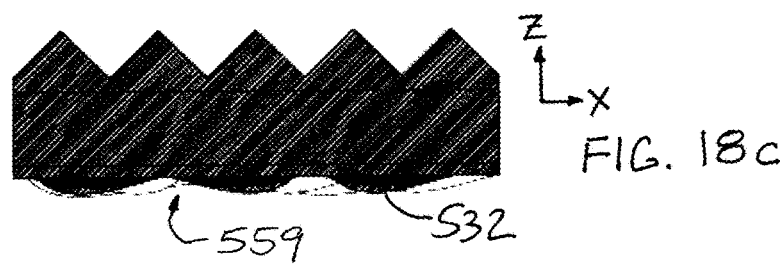
FIG. 18c
FIG. 18a
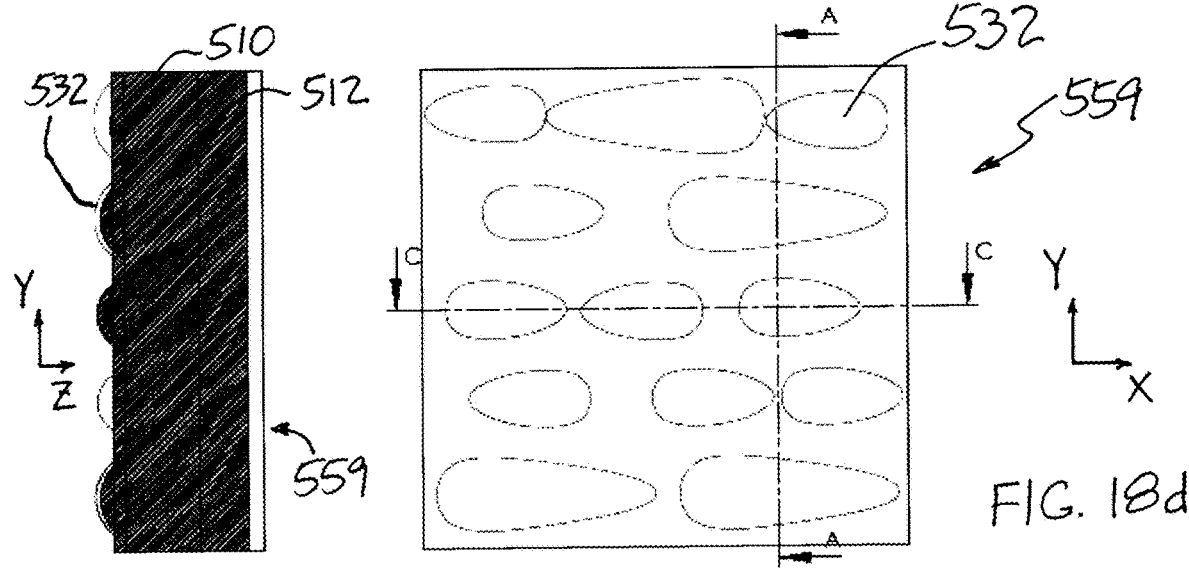
FIG. 18d

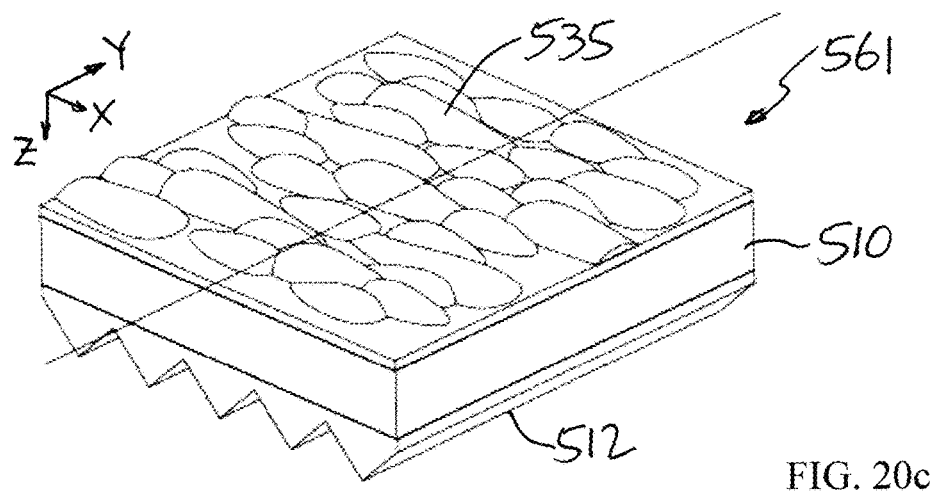
FIG. 20c
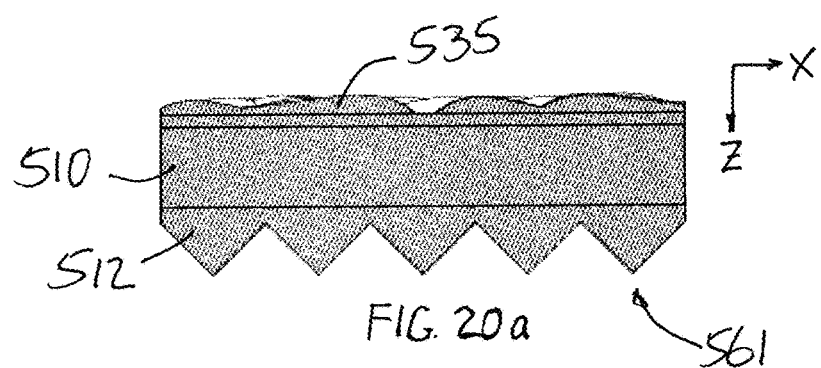
FIG. 20a
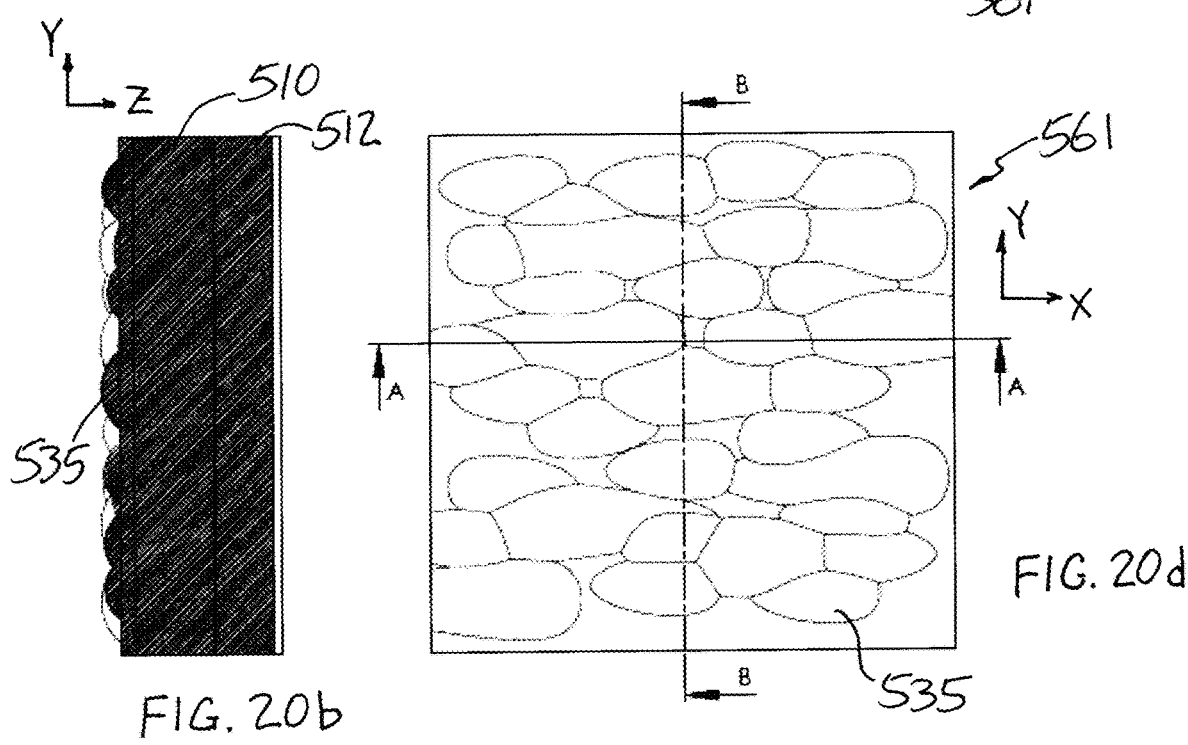
FIG. 20b
FIG. 20d

OPTICAL SUBSTRATES HAVING LIGHT COLLIMATING AND DIFFUSION STRUCTURES

CROSS-REFERENCE TO RELATED APPLICATIONS

This application is a continuation of U.S. patent application Ser. No. 14/870,008 filed on Sep. 30, 2015, which is a continuation-in-part of U.S. patent application Ser. No. 14/469,572 filed on Aug. 26, 2014, now U.S. Pat. No. 9,180,609, which is a continuation-in-part of U.S. patent application Ser. No. 14/166,842 filed on Jan. 28, 2014, which is a continuation-in-part of U.S. patent application Ser. No. 13/073,859, now U.S. Pat. No. 8,638,408, which claims priority of (a) U.S. Provisional Application Ser. No. 61/318,061 filed on Mar. 26, 2010; and (b) U.S. Provisional Application Ser. No. 61/406,094 filed on Oct. 22, 2010. All of these applications are incorporated by referenced herein in their entirety.

BACKGROUND

Field of Invention

The present invention relates to optical substrates having a structured surface, particularly to optical substrates for brightness enhancement and diffusion, and more particularly to brightness enhancement and diffusion substrates for use in flat panel displays having a planar light source.

Description of Related Art

Flat panel display technology is commonly used in television displays, computer displays, and displays in handheld electronics (e.g., cellular phones, personal digital assistants (PDAs), digital cameras, tablets, etc.). Liquid crystal display (LCD) is a type of flat panel display, which deploys a liquid crystal (LC) module having an array of pixels to render an image.

FIG. 1 illustrates an example of an LCD display. A backlight LCD 10 comprises a liquid crystal (LC) display module 12, a planar light source in the form of a backlight module 14, and a number of optical films interposed between the LC module 12 and the backlight module 14. The LC module 12 comprises liquid crystals sandwiched between two transparent substrates, and control circuitry defining a two-dimensional array of pixels. The backlight module 14 provides planar light distribution, either of the backlit type in which the light source extends over a plane, or of the edge-lit type as shown in FIG. 1, in which a linear light source 16 is provided at an edge of a light guide 18. A reflector 20 is provided to direct light from the linear light source 16 through the edge of the light guide 18 into the light guide 18. The light guide 18 is structured (e.g., with a tapered plate and light reflective and/or scattering surfaces 30 defined on the bottom surface facing away from the LC module 12) to distribute and direct light through the top planar surface facing towards LC module 12. The optical films may include upper and lower diffuser films 22 and 24 that diffuse light from the planar surface of the light guide 18. The optical films further includes upper and lower structured surface, optical substrates 26 and 28, which redistribute the light passing through such that the distribution of the light exiting the films is directed more along the normal to the surface of the films. The optical substrates 26 and 28 are often referred in the art as luminance or brightness enhancement films, light redirecting films, and directional diffusing films. The light entering the LC module 12 through such a combination of optical films is uniform spatially over the planar area of the LC module 12 and has relatively strong normal light intensity.

The main function of brightness enhancement films 26 and 28 is to improve the brightness of overall backlight module. The effect of brightness enhancement films is to increase the amount of light emitted at small angles to the axis of the display by reducing the amount emitted at greater angles. Thus, as one looks at a display at increasing angles with respect to the axis, the perceived brightness will decline. Between 35 and 45 degrees the perceived brightness will decline very rapidly. This effect is known as a sharp cutoff.

In the backlight LCD 10, brightness enhancement films 26 and 28 use longitudinal prismatic structures to direct light along the viewing axes (i.e., normal to the display), which enhances the brightness of the light viewed by the user of the display and which allows the system to use less power to create a desired level of on-axis illumination. The brightness enhancement films 26 and 28 have a light input surface that is smooth or glossy, through which light enters from the backlight module. Heretofore, many LCDs used two brightness enhancement film layers (as in the LCD in FIG. 1) that are rotated about an axis perpendicular to the plane of the films, relative to each other such that the longitudinal peaks/grooves in the respective film layers are at 90 degrees relative to each other, thereby collimating light along two planes orthogonal to the light output surface.

When the glossy bottom surface of the brightness enhancement film 26 above the structured surface of the other brightness enhancement film 28, it has been experienced that the optical interaction between the glossy surface of top brightness enhancement film 26 and the structured surface and/or glossy surface of the lower brightness enhancement film 28 creates undesirable visible artifacts in the display image in the form of interference fringes (i.e., bright and dark repeated patterns) that are observable in the display image. These bright and dark patterns may also be generated between the upper brightness enhancement film 26 and the adjacent surface of the LC module 12 absenting an upper diffuser film 22 (FIG. 1). Undesirable image affecting effects arising from flaws and non-uniformities such as interference fringes, cutoff effects (rainbow), physical defects, flows, stains, can be masked by using an upper diffuser film (e.g., diffuser film 22 above brightness enhancement film 26 in FIG. 1).

There is an increasing need for reducing power consumption, thickness and weight of LCDs, without compromising display quality of the LCDs. Accordingly, there is a need to reduce power consumption, weight and thickness of backlight modules, as well as thicknesses of the various optical films. In this regard, many light directing techniques have been developed to reduce power consumption without compromising display brightness. Some developments are directed to the design of the backlight module (i.e., designing structures of the components of the backlight module 14 in FIG. 1, comprising the light source 16 and reflector 20, and light guide 18, to improve overall light output performance. In addition, other developments are directed to diffuser films 22 and 24, and luminance/brightness enhancement films 26 and 28.

Heretofore, to reduce the overall thickness of the optical films in LCDs, much effort had been directed to reducing the number of the optical films, from four films (e.g., optical films 22, 24, 26 and 28 in FIG. 1) to three films. In this regard, one approach is to keep the low diffuser film 24 and low brightness enhancement film 28 as separate structures, but the functions of the top diffuser film 22 and top brightness enhancement film 26 are combined and merged into a single hybrid film structure. The three-film type display has been widely adopted in handheld electronic devices and notebooks, where it is particularly desirable to push the envelope to reduce overall size of such devices.

Various efforts also have been undertaken to develop hybrid brightness enhancement films. Referring to FIG. 2, U.S. Pat. No. 5,995,288 disclosed a coating layer of particles provided on the underside of the optical substrate, on the opposite side of the substrate with respect to the structured surface on the top side. A glossy surface is no longer present at the underside of the optical substrate. The added particles achieve the effect of scattering light for light diffusion. Referring to FIG. 3, U.S. Pat. No. 5,598,280 disclosed a method to form small projections on the underside of the optical substrate to improve uniformity in luminance by light diffusion. Such diffusion treatments will hide many of the interference fringes, making them invisible to the user. One of the disadvantages of these approaches is that light scattering decreases on-axis gain. Moreover, the hybrid brightness enhancement films are also less effective in directing light within the desirable viewing angle.

Others have explored modifying the structure of prism surface of the structured surface of the optical substrate. For example, referring to FIGS. 4A and 4B, U.S. Pat. No. 6,798,574 provides fine protrusions on the prism surface of the structured surface of the optical substrate, which is supposed to spread light in a certain direction with a wider angle.

Accordingly, all the foregoing hybrid brightness enhancement films involve weakened light output directivity. Moreover, the overall brightness or luminance for the foregoing films is significantly reduced. Further, all the above-mentioned hybrid brightness enhancement films involve relatively complex structures requiring relatively higher manufacturing costs.

Because the composite film used in the portable apparatus is thinner, the product has a bad stiffness and some undesired phenomenon (e.g., Newton's ring, wet-out) easily happens. Moreover, people use the portable apparatus in a short-distance manner, and rainbow phenomenon easily affects display quality. Conventionally, the backside of the substrate is designed with high haze to reduce the above optical defects, but brightness also decays.

There remains a need for an optical substrate having a structure that both enhances brightness and provides effective diffusion, and overcoming the shortcomings of the prior art multifunctional optical films.

SUMMARY OF THE INVENTION

The present invention relates to a diffused prism substrate having both light-collimating and light-diffusing functions. More particularly, the present invention is directed to an optical substrate that possesses a structured surface that enhances luminance or brightness by collimating light and enhances diffusion of light.

In one aspect of the present invention, the optical substrate is in the form of a film, sheet, plate, and the like, which may be flexible or rigid, having a structured prismatic surface and an opposing structured lenticular surface. In one embodiment, the structured lenticular surface includes shallow-curved lens structure (e.g., convex lens). Adjacent shallow-curved lens structure may be continuous or contiguous, or separated by a constant or variable spacing. The lens structure may have a longitudinal structure with a uniform or varying cross section. The lenticular lenses may have a laterally meandering structure. Sections of adjacent straight or meandering lenticular lenses may intersect or partially or completely overlap each other. In a further embodiment, the lenticular lenses may be in the form of lenticular segments instead of a continuous structure between opposing edges of an optical substrate. The lenticular segments may have regular, symmetrical shapes, or irregular, asymmetrical shapes, which may be intersecting or overlapping. The surfaces of lenticular lenses, including lenticular segments, may be textured to further effect diffusion.

In a further aspect of the present invention, the shallow-curved lens structure is provided with isolated ripples, in the form of a single knot, or a series of knots.

In accordance with the present invention, the structured surfaces provide both light collimation and light diffusion characteristics, which may reduce certain undesired optical effects such as wet-out, Newton's rings, interference fringes and cutoff-effect (rainbow) without significantly reducing overall brightness.

In another aspect of the present invention, the primary objective of the invention is to provide a brightness enhancement film having a structured underside surface, which avoids the glossy underside surface to effectively prevent the absorption (wet-out) between the underside of the film and the surface of optical elements in contact with the underside. A further objective of the invention is to provide a brightness enhancement film having the characteristic of improved brightness enhancement effect with minimum diffusion effect.

In one embodiment, a structured prismatic surface is provided on one major surface and a structured lenticular surface is provided on an opposite major surface of a substrate, wherein the included angle α between the longitudinal axes of the prisms and the lenticular lenses are substantially 0°.

The lenticular surface has a structure comprising a plurality of convex curved surfaces, each being a cylindrical surface formed with a large radius to render the lenticular surface close to a flat surface, but with surface features having a slight convex curvature. The lenticular surface structures therefore have very little or minimal light diffusion characteristics, so that overall brightness of the light transmitted through the lenticular surface would not be reduced by the lenticular surface. By using low refractive index resin material for the structure that defines the lenticular surface features, the overall brightness of LCD can be further increased effectively.

Another objective of the invention is to provide a brightness enhancement film having the characteristics of reduced distortion and/or warpage. By controlling the shrinkage rate of the resin material used for the structure (e.g., a layer of material) that defines the prismatic surface features to be substantially similar or approximately to the shrinkage rate of the resin material used for the structure (e.g., a layer of material) that defines the lenticular surface features, the two structured surfaces of the brightness enhancement film can reduce distortion or warpage of the film. In one embodiment, the lenticular surface and the prismatic surface are defined by separate layers bonded together to form the brightness enhancement film. An intermediate support substrate may be provided, wherein the separate lenticular layer and the prismatic layer are bonded to two opposite major surfaces of the support substrate. In another embodiment, the lenticular surface and the prismatic surface are defined by the same layer structure (e.g., a monolithic or unitary layer).

Another objective of the invention is to provide a brightness enhancement film having the characteristics of reducing the moiré interference pattern between the structured prismatic surface and an opposite lenticular structured surface. In one embodiment, the width and/or pitch or the centerline spacing of the lenticular lenses at the lenticular surface is significantly greater than the width and/or pitch or centerline spacing of the prismatic structures at the prismatic surface. The radius of the lenticular lens structure is large, so as to render the underside surface of the brightness enhancement film close to a flat surface, but with surface features having a slight convex curvature. As a result of the larger pitch/centerline spacing and large radius of curvature, the moiré interference pattern between the prismatic surface and the opposite lenticular surface are significantly reduced to a minimum.

Another objective of the invention is to provide a method of forming an uneven structure on a substrate. The method comprises: using a hard tool to penetrate into a mold to cut a first trench and a second trench in an order on a surface of a mold, wherein the hard tool has a smoothly-curved shape such that the transverse width of each of the first trench and the second trench increases as the penetrating depth of the hard tool increases, wherein when each of the first trench and the second trench marches along a first direction, the penetrating depth of the hard tool is controlled by repeating moving the hard tool up and down to cut the mold such that the transverse width of each of the first trench and the second trench varies according to the controlled penetrating depth of the hard tool, wherein the first trench and the second trench completely overlap with each other with no space therebetween; and using the surface of the mold to emboss a thin film on a substrate. The uneven structure has the following advantages: a. back light can effectively penetrate the uneven structure without decaying to achieve the optimized brightness gain; b. it can avoid moiré resulting from more regular prismatic structure; c. it is changed from one-dimensional lenticular structure to two-dimensional curved structure to effectively increase diffusion range of the optical film and screening property.

BRIEF DESCRIPTION OF THE DRAWINGS

For a fuller understanding of the nature and advantages of the invention, as well as the preferred mode of use, reference should be made to the following detailed description read in conjunction with the accompanying drawings. In the following drawings, like reference numerals designate like or similar parts throughout the drawings.

FIG. 1 schematically illustrates the structure of a prior art LCD.

FIGS. 2, 3, 4a and 4b illustrate prior art hybrid brightness enhancement optical and diffusion substrates.

FIGS. 6b to 6d are sectional views of the optical substrate in FIG. 6a.

FIGS. 12a and 12b schematically illustrate a lenticular surface structure in accordance with still yet another embodiment of the present invention.

FIGS. 13a and 13b schematically illustrate a lenticular surface structure in accordance with a further embodiment of the present invention.

FIGS. 16a and 16b schematically illustrate a lenticular surface structure in accordance with yet another embodiment of the present invention.

FIG. 17 are schematic views of a lenticular segment in accordance with one embodiment of the present invention.

FIGS. 18a to 18d are schematic views of a lenticular segment in accordance with another embodiment of the present invention.

FIGS. 20a to 20d are schematic views of a lenticular segment in accordance with yet another embodiment of the present invention.

FIG. 21b is an SEM photograph of the lenticular segments in FIG. 21a.

FIG. 39b is a schematic top view of FIG. 39a.

DETAIL DESCRIPTION OF THE ILLUSTRATED EMBODIMENTS

The present description is of the best presently contemplated mode of carrying out the invention. This invention has been described herein in reference to various embodiments and drawings. This description is made for the purpose of illustrating the general principles of the invention and should not be taken in a limiting sense. It will be appreciated by those skilled in the art that variations and improvements may be accomplished in view of these teachings without deviating from the scope and spirit of the invention. The scope of the invention is best determined by referenced to the appended claims.

The present invention relates to a diffused prism substrate having both light-collimating and light-diffusing functions. More particularly, the present invention is directed to an optical substrate that possesses a structured surface that enhances luminance or brightness by collimating light and enhances diffusion of light. In one aspect of the present invention, the optical substrate is in the form of a film, sheet, plate, and the like, which may be flexible or rigid, having a prismatic structured surface and an opposing lenticular structured surface. In accordance with the present invention, the structured surfaces provide light diffusion characteristics, which may reduce certain undesired optical effects such as wet-out, Newton's rings or interference fringes without significantly reducing overall brightness.

In the context of the present invention, the inventive optical substrate may be adopted in display devices having display panels that may be flat or curved, and rigid or flexible, which comprise an array of display pixels. Planar light source refers to a light source that provides illumination to cover an area of the array of display pixels. Accordingly, for display panels having a curved image plane of display pixels (such panels may be rigid or flexible), the backlight would cover the array of display pixels in the curved plane, to effectively provide illumination coverage to the curved image plane.

The present invention will be further described below in connection with the illustrated embodiments.

Figure 3:
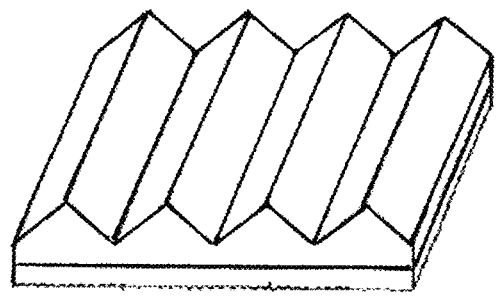
Figure 4A:
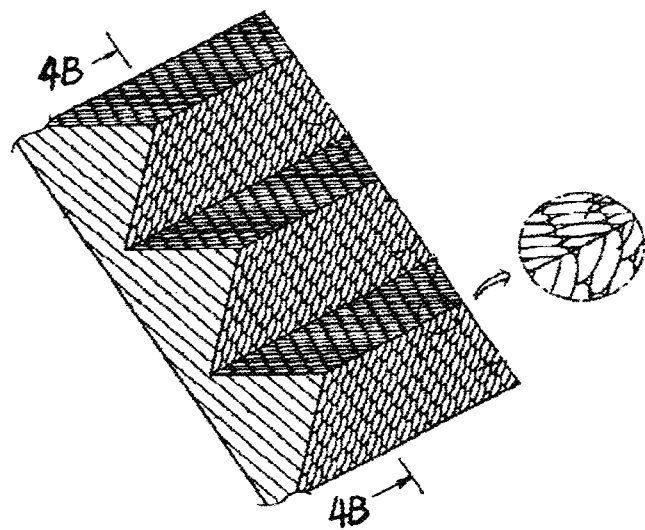
Figure 4B:
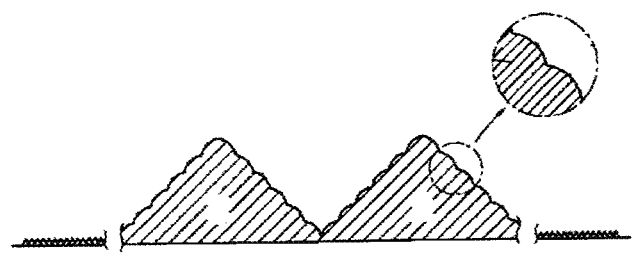
Figure 5:
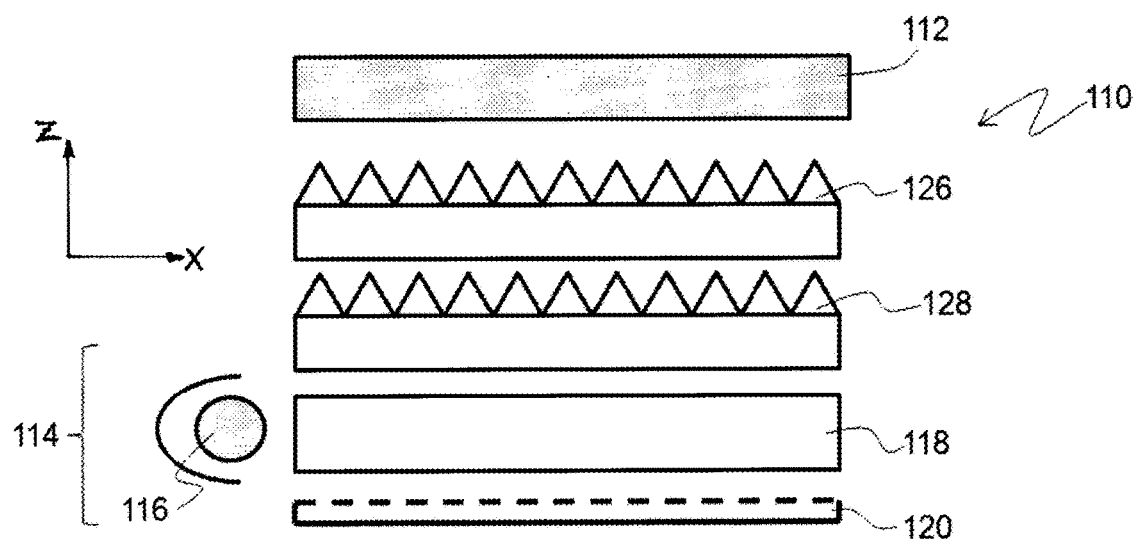
FIG. 5 schematically illustrates the structure of a LCD, which incorporate the optical substrate in accordance with one embodiment of the present invention.

FIG. 5 schematically illustrates an example of a flat panel display. A backlight LCD 110, in accordance with one embodiment of the present invention, comprises a liquid crystal (LC) display module 112, a planar light source in the form of a backlight module 114, and a number of optical films interposed between the LC module 112 and the backlight module 114. The LC module 112 comprises liquid crystals sandwiched between two transparent substrates, and control circuitry defining a two-dimensional array of pixels. The backlight module 114 provides planar light distribution, either of the backlit type in which the light source extends over a plane, or of the edge-lit type as shown in FIG. 5, in which a linear light source 116 is provided at an edge of a light guide 118. A reflector is provided to direct light from the linear light source 116 through the edge of the light guide 118 into the light guide 118. The light guide is structured (e.g., with a tapered or flat plate and light reflective and/or scattering surfaces defined on the bottom surface facing away from the LC module 112) to distribute and direct light through the top planar surface facing towards LC module 112. A reflector 120 may be provided to facilitate trapping light escaping through the underside of the light guide 118 and redirecting towards back to the light guide 118.

In the illustrated embodiment, there are two structured optical substrates 126 and 128 (which may be similar in structure) in accordance with the present invention, which are arranged with the longitudinal prism structures generally orthogonal between the two substrates. In FIG. 5, the two substrates 126 and 128 are schematically illustrated, which shows the prism structures on the substrates appearing parallel to one another (i.e., included angle α=0°; see also FIG. 6a). Typically, prism structures are rotated with an include angle greater than 0°, which can be visualized without requiring further illustration. The structured optical substrates 126 and 128 are structured to diffuse light as well as enhance luminance or brightness, redirecting light out of the display. The light entering the LC module 112 through such a combination of optical films is uniform spatially over the planar area of the LC module 112 and has relatively strong normal light intensity. The structured optical substrate 126 and 128 obviate the need for a separate diffuser sheet between the LC module 112 and the upper structured optical substrate 126. This would reduce the overall thickness of the LCD 110. Further, the structured optical substrates 126 and 128 in accordance with the present invention would reduce interference fringe from being created between the substrates, and between the upper substrate and the adjacent LC module 112. Alternatively, only one of the optical substrates 126 and 128 need to be structured in accordance with the present invention (e.g., only the upper optical substrate 126), to provide acceptable interference fringe level and optical diffusion effect. Alternatively, only one of the optical substrates 126 and 128 is provided in the LCD 110.

While the backlight module 114 is shown with a light source 116 placed at an edge of the light guide plate 118, the backlight module may be of another light source configuration, such as an array of LEDs positioned at an edge of a light guide, or a planar array of LEDs in place of the light guide, without departing from the scope and spirit of the present invention.

While the illustrated embodiment of the LCD 110 does not include additional pure, the optical films in the LCD 110 may include optional upper and/or lower diffuser films, without departing from the scope and spirit of the present invention. In other words, it is well within the scope of the present invention to replace the brightness enhancement films 26 and/or 28 in the LCD 10 shown in FIG. 1, to achieve the benefits of the present invention. It is noted that a diffuser film or layer is distinguishable from an optical substrate for brightness enhancement (i.e., brightness or luminance enhancement film discussed below), in that the diffuser film does not have prismatic structures. Diffuser film primarily scatters and spreads light, instead of primarily directing light to enhance luminance in a direction out of the display as in the case of a luminance enhancement film.

The optical substrate of the present invention has prismatic structures and lenticular structures on opposing sides, which are configured to both enhance luminance and diffuse light. Specifically, the optical substrate shown in FIG. 5 includes opposing structured surfaces in accordance with the present invention, which diffuse light as well as redistribute the light passing through such that the distribution of the light exiting the films is directed more along the normal to the surface of the films.

Figure 6A:
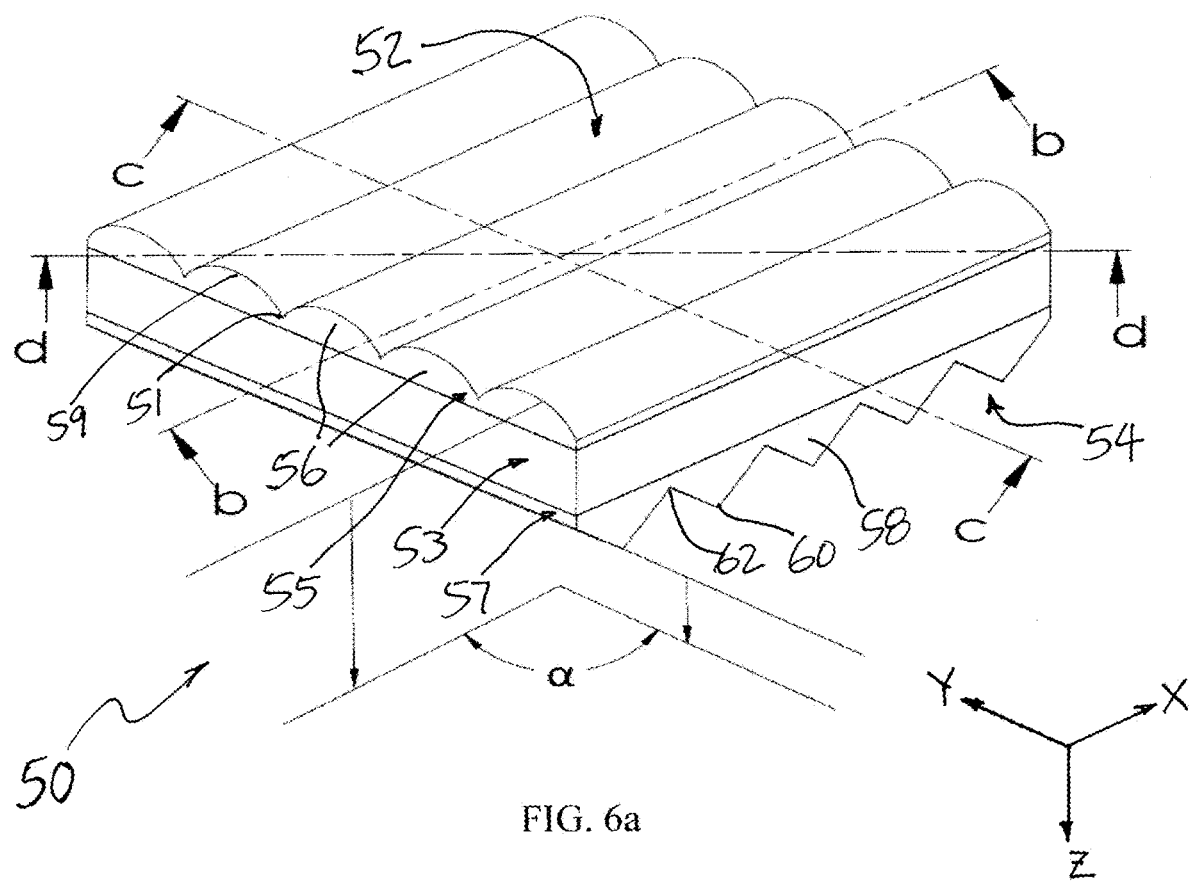
FIG. 6a is a schematic perspective view of an optical substrate having structured light input and output surfaces, in accordance with one embodiment of the present invention.

FIG. 6a illustrates an optical substrate that combines prismatic and lenticular structures on opposing sides of the substrate, in accordance with one embodiment of the present invention, which can be used as the structured optical substrate 126 and/or 128 in the LCD 110 in FIG. 5. The optical substrate 50 has a structured lenticular surface 52 and a structured prismatic surface 54. In this illustrated embodiment, the structured prismatic surface 54 is a light output surface and the structured lenticular surface 52 is a light input surface.

The prismatic surface 54 includes parallel rows of contiguous or continuous longitudinal prisms 58, extending between two opposing edges of the substrate 50. In the embodiment of FIG. 6a, the rows of longitudinal prisms 58 are arranged in parallel laterally (side-by-side), defining parallel peaks 60 and valleys 62. The sectional profile of the peak 60 is symmetrical about peak in this embodiment (viewed in the x-z plane). The peak vertex angle may be right angled, and the peaks are of constant or similar height and/or the valleys are of constant or similar depth, across the plane of the prismatic surface 54. The distance or pitch between adjacent peaks/valleys is constant in the illustrated embodiment of FIG. 6a.

For ease of reference, the following orthogonal x, y, z coordinate system will be adopted in explaining the various directions. For the embodiment shown in FIG. 6a, the x-axis is in the direction across the peaks 60 and valleys 62, also referred to as the lateral or transverse direction of the prisms 58. The y-axis is orthogonal to the x-axis, in a generally the longitudinal axis or direction of the prisms 58. The longitudinal direction of prisms 58 would be in reference to the general direction in which the peaks 60 proceed from one end to another end of the prisms 58. The prismatic surface 54 lies in an x-y plane. For a rectangular piece of the optical substrate, the x and y-axes would be along the orthogonal edges of the substrate. The z-axis is orthogonal to the x and y-axes. The edge showing the ends of the laterally arranged 15 rows of prisms 58 lies in the x-z plane, such as shown in FIG. 6a, which also represents a sectional view in the x-z plane. The prisms 58 each has a constant sectional profile in the x-z plane. References to cross sections of prisms 58 would be sections taken in x-z planes, at various locations along the y-axis. Further, references to a horizontal direction would be in an x-y plane, and references to a vertical direction would be along the z-direction.

The lenticular structured surface 52 comprises a shallow-curved lens structure (e.g., a convex or concave lens structure, or a combination of convex and concave). Particularly, the lenticular structured surface 52 includes parallel, contiguous or continuous rows of lenticular lenses 56, each extending in the x-direction continuously between two opposing edges of the substrate 50. The curved surfaces of adjacent lenticular lenses intersect, defining parallel grooves 51 and crowns 59. For the lenticular lenses 56, the y-axis is in the direction across the grooves 51 and crowns 59, also referred to as the lateral or transverse direction of the lenticular lenses 56. The x-axis represents the longitudinal axis or direction of the lenticular lenses 56. The longitudinal direction of lenticular lenses would be in reference to the general direction in which the crowns 59 proceed from one end to another end of the lenticular lenses 56. The edge showing the ends of the laterally arranged rows of lenticular lenses 56 lies in the y-z plane, such as shown in FIG. 6a, which also represents a sectional view in the y-z plane. The lenticular lenses 56 each has a constant sectional profile in the y-z plane. References to cross sections of lenticular lenses 56 would be sections taken in y-z planes, at various locations along the x-axis. Further, references to a horizontal direction would be in an x-y plane, and references to a vertical direction would be along the z-direction.

Figure 6B:
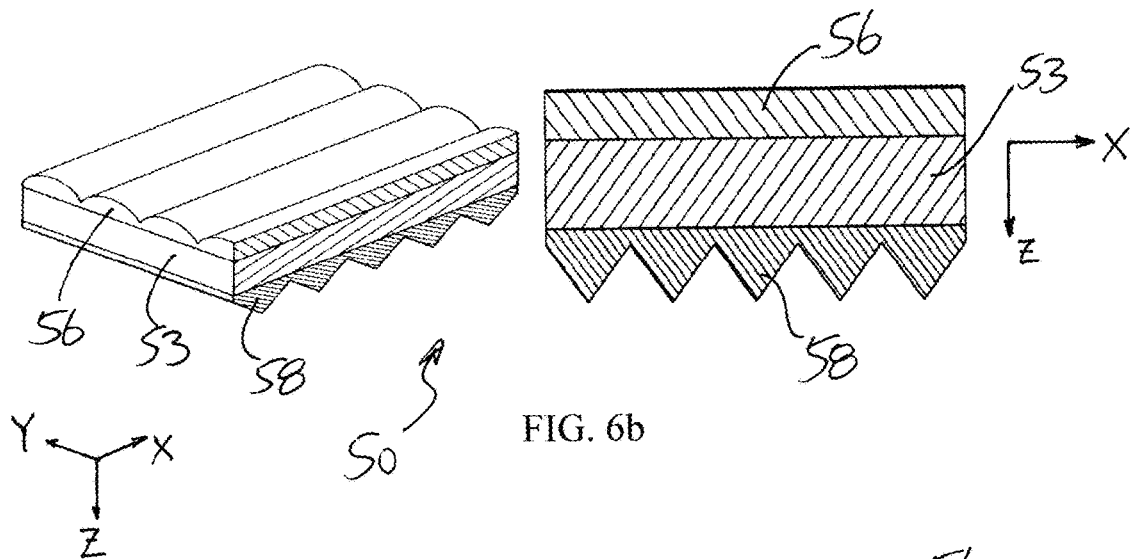
Figure 6C:
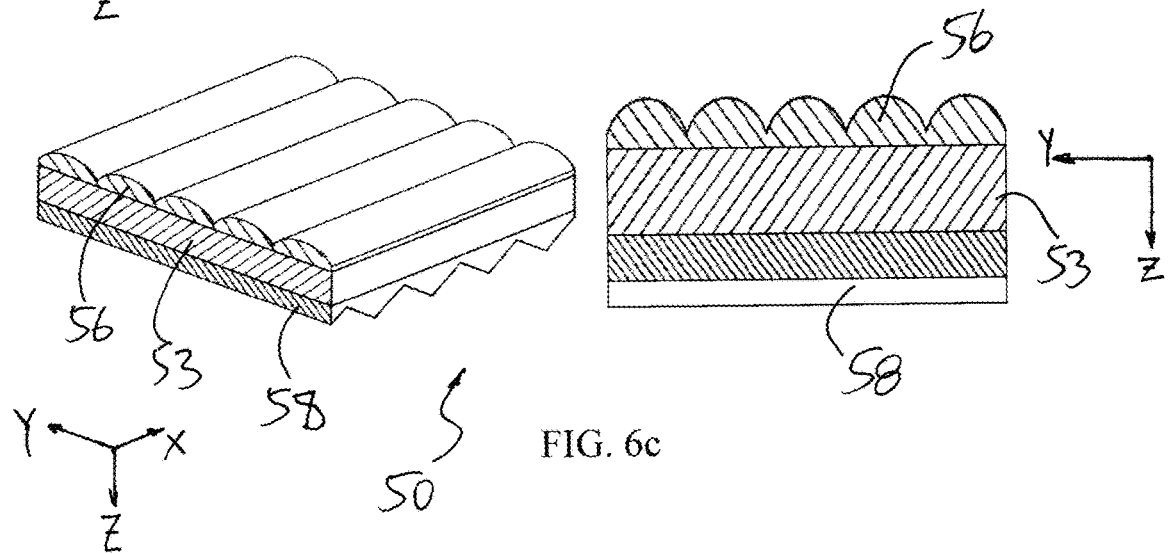
Figure 6D:
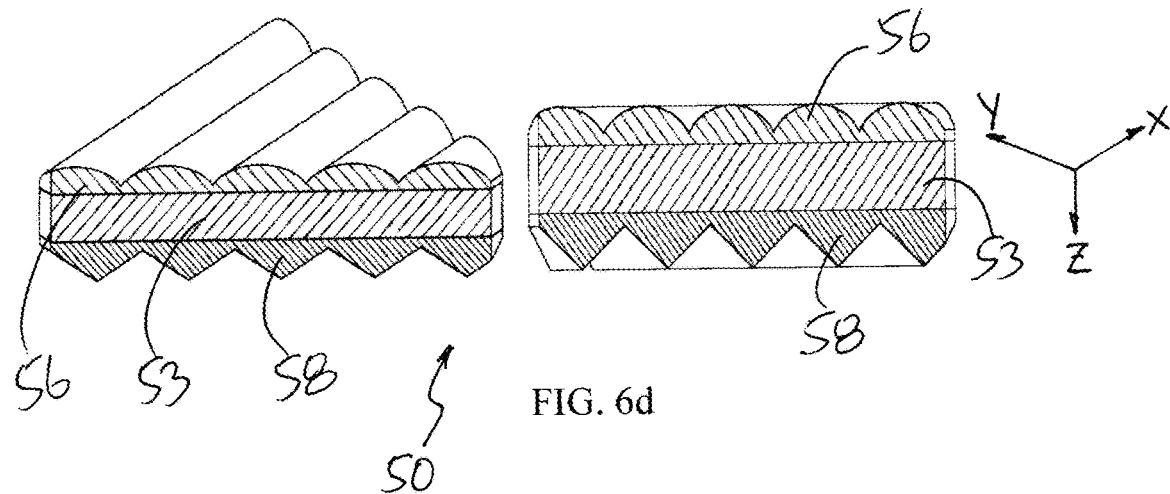

Referring also to FIG. 6b to FIG. 6d, which illustrate sectional views taken along the x-axis, the y-axis, and at an angle 45 degrees to the x and y axes. In the illustrated embodiment, the structured prismatic surface 54 and the structured lenticular surface 52 are generally parallel to each other in the overall optical substrate structure (i.e., do not form an overall substrate structure that is generally tapered like a light guide plate in a backlight module, or that is concave or convex). In the illustrated embodiment, the substrate 50 comprises three separate layers, including a first structured layer 57 bearing the prismatic surface of prisms 58, a second structured layer 55 bearing the lenticular surface of lenticular lenses 56, and an intermediate planar base layer 53 supporting the layers 55 and 57. The two structured layers 55 and 57 are adhered to the base layer 53 to form the overall optical substrate 50. It can be appreciated that the optical substrate may be formed from a single integrated physical layer of material, instead of three separate physical layers, without departing from the scope and spirit of the present invention. The optical substrate 50 may be a unitary or monolithic body, including a base portion bearing the surface structures of prisms and lenticular lenses.

The structured prism surface 54 has a plurality of triangular prisms 58 in the sectional view of FIG. 6b taken along the x-z plane. The structured lenticular surface 52 has a plurality of curved convex lenses 56 in the sectional view of FIG. 6c taken along the y-z plane. The triangular prisms 58 lean next to each other defining a contiguous or continuous prismatic structured surface 54, while the lenticular lenses 56 also leans next to each other defining a contiguous or continuous lenticular structured surface 52. The lenticular structured surface 52 contributes to diffusion function and may reduce certain undesired optical defects such as wet-out, Newton's rings, and interference fringes.

In the illustrated embodiment of FIG. 6a, the longitudinal direction of the lenticular lenses and the longitudinal direction of the prisms are orthogonal. The longitudinal directions of the lenticular lenses and the prisms may be configured at different included angles α. The included angle α may range from 0° to 90°, preferably 45° to 90°, in order to provide an optical substrate having satisfactory ability to diffuse light while not significantly reducing the overall brightness. The included angle α may be substantially 90° to provide preferable performance. Alternatively, the included angle α may be substantially 0°, as illustrated in the embodiments illustrated in FIGS. 27-31, which will be discussed in detail later below.

In the illustrated embodiment, the lenticular layer 55 and the prism layer 57 may be made of the same or different material, and the base layer 53 may be made of a same or different material. The lenticular layer 55 and the prism layer 57 may be formed using an optically transparent material, preferably a polymerizable resin, such an ultraviolet or visible radiation-curable resin, such as UV curable adhesive. Generally, the structured prismatic surface 54 and lenticular surface 52 are formed by applying a coatable composition comprising a polymerizable and crosslinkable resin onto a master mold or master drum and undergoing a hardening process. For example, the prismatic and lenticular structures are formed on the base layer 53 by die assemblies, press rolling machines, mold pressing assemblies or other equivalent apparatuses. The base layer 53 may be made of a transparent material, such as polyethylene-terephthalate (PET), polyethylene (PE), polyethylene napthalate (PEN), polycarbonate (PC), polyvinyl alcohol (PVA), or polyvinyl chloride (PVC). The base layer 53 may instead be made from the same transparent material as the structured layers 55 and 57. The base layer 53 provides the necessary thickness to provide structural integrity to the final film of optical substrate 50.

In another embodiment, the prismatic structured surface 54 can be integrately-formed by molding, pressing, embossing, calendaring or extrusion onto the transparent base film, while the structured lenticular surface 52 is manufactured separately on to the transparent base layer 53 by UV curing with resin.

Further discussions of processes for forming a substrate having structured surfaces may be referenced to U.S. Pat. No. 7,618,164, which had been incorporated by reference herein.

In still another embodiment, the structured lenticular surface 52 can be integrally-formed by molding, pressing, embossing, calendaring or extrusion onto the transparent base layer 53, while the prismatic structured surface 54 is manufactured separately on to the transparent base layer 53 by UV curing with resin.

In a further embodiment, the prismatic structured surface 54 may be formed integrally or separately onto a base film, while the structured lenticular surface may also be formed integrally or separately onto another base film. The two base films is combined back to back by simply stacking or applying adhesives such as pressure sensitive adhesive (PSA) to the films to form a structure equivalent to the base layer 53. It is apparent that many techniques and combinations of manufacture methods may be applied to obtain the combination of the structured prismatic surface, the structured lenticular surface and the base layer, or equivalent thereof.

The dimensions of the optical substrate are generally as follows, for example:

Thickness of base layer 53=tens of micrometers to several millimeters

Peak height of prism (as measured from the adjacent surface of the base layer, or if a base layer is integral to the prisms, as measured from the valley between adjacent non-intersecting prisms)=tens to hundreds of micrometers Distance of prism valley bottom from top of base layer=about 0.5 to hundreds of micrometers Vertex angle of prism peaks=about 70 to 110 degrees Pitch between adjacent prism peaks=tens to hundreds of micrometers Crown height of lenticular lens (as measured from the adjacent surface of the base layer, or if a base layer is integral to the lenticular lens, as measured from the valley between non-intersecting adjacent lenses)=1 to 300 micrometers Pitch between adjacent crown heights=10 to several hundred micrometers The optical substrates in accordance with the present invention may be used with LCDs to be deployed for displays, for example, for televisions, notebook computers, monitors, portable devices such as cell phones, digital cameras, PDAs and the like, to make the displays brighter.

Figure 7:
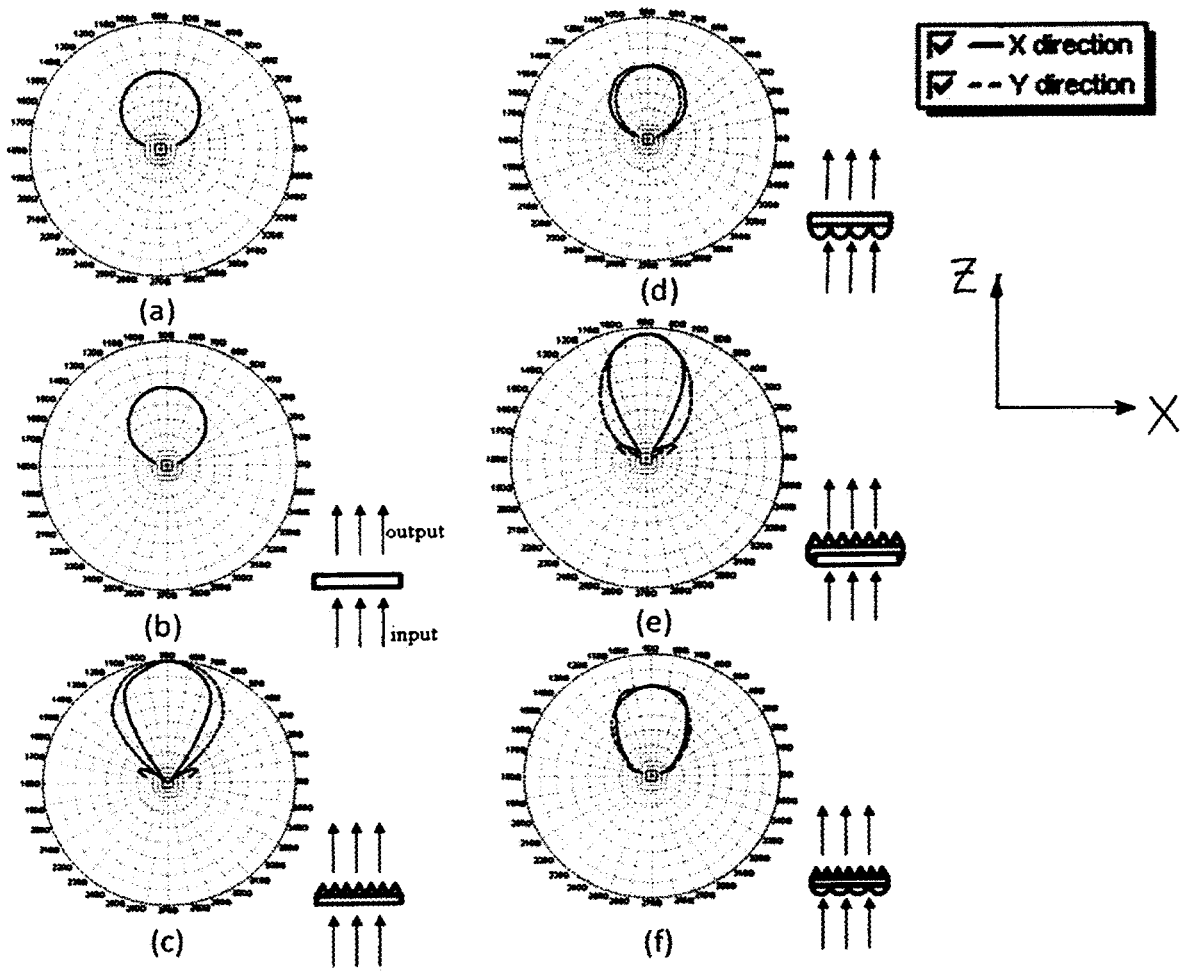
FIG. 7 shows comparative parametric study of candela distribution curves for a Lambertian light source incident at optical substrates having different light input and output surfaces.

The effects of the lenticular surface 52 and the prismatic surface 54 and their interactions for various optical substrate configurations can be observed in reference to FIG. 7. FIG. 7 shows comparative parametric study of candela distribution curves for a Lambertian light source incident at optical substrates having different light input and output surfaces. The curves in solid lines represent candela distributions in the X-direction, and the curves in dotted line represent candela distributions in the Y direction. For the examples illustrated in FIG. 7, the X-direction is horizontal, and the Y-direction is into the page.

The candela distribution curve 201 in FIG. 7 shows the candela distribution curve for a Lambertian light source, in the absence of any optical substrate. The distributions in the X and Y directions are same.

The candela distribution curve 202 in FIG. 7 shows the result for a Lambertian light source incident on a planar PET film. The candela distribution curves 202 are substantially similar to the candela distribution curve 201.

The candela distribution curve 203 in FIG. 7 shows the result for a Lambertian light source incident on an optical substrate having a light output surface in the form of a one-dimensional structured prismatic film with the longitudinal axis of the prisms in the Y-direction, without any lenticular structure. The candela distribution curve indicates an obvious enhancement in distribution in primarily X-direction. This improves the brightness by collimating light from a light input surface to a light output surface in the on-axis direction. With the triangular structure of the prismatic output surface of the optical substrate, light is redirected in X-direction when passing through the optical film.

The candela distribution curve 204 in FIG. 7 shows the result for a Lambertian light source incident on an optical substrate having a one-dimensional lenticular structured film, in which the longitudinal axis of the lenticular lenses is in the Y-direction. The candela distribution curve indicates light is diverged in X-direction while passing through the lenticular film.

The candela distribution curve 205 in FIG. 7 shows the result of a Lambertian light source incident on an optical substrate having a structured lenticular light input surface and a structured prismatic light output surface. The longitudinal axes of the two structured surfaces are rotated with respect to one another by 90°, with the longitudinal axis of the prisms in the Y-direction. The result indicates more enhanced light in the X-direction and more diverged light (i.e., diffusion) in the Y-direction.

The candela distribution curve 206 in FIG. 7 shows the result of a Lambertian light source incident on another optical substrate having a structured lenticular light input surface and a structured prismatic light output surface. The longitudinal axes of the two structured surfaces are rotated with respect to one another by 0°, both in the Y-direction. The result indicates enhanced light as well as diverged/diffused light in the same direction.

In accordance with the above comparative study, it is observed that a lenticular light input surface diverges light to effect diffusion, and a prismatic light output surface enhances light in the on-axis direction, in a scattering and refracting manner.

Figure 8:
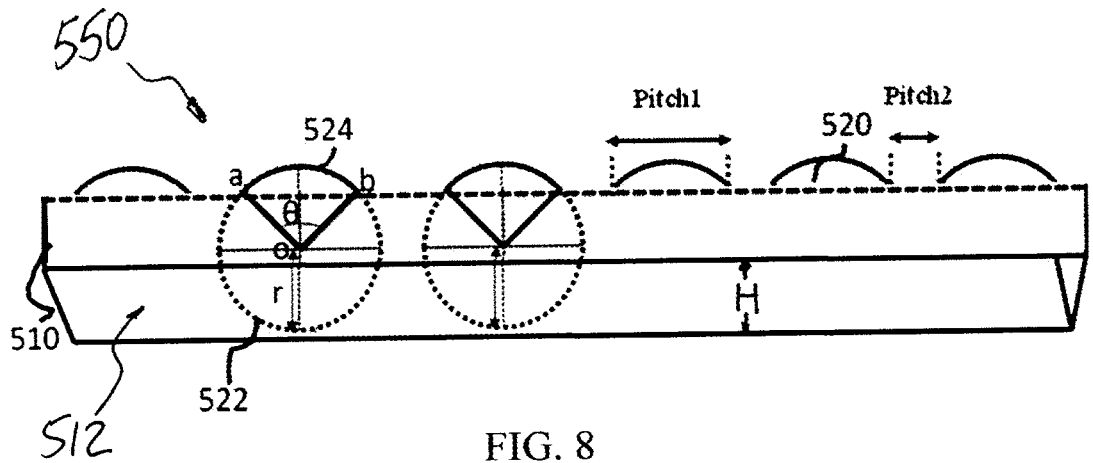
FIG. 8 is a schematic sectional view illustrating the lenticular surface structure.

In another embodiment of the invention, at least some lenticular lenses do not intersect each other, leaving the adjacent convex curved lens surfaces discontiguous or discontinuous. While the embodiments discussed below are in reference to prisms having longitudinal axis normal to the longitudinal axis of the lenticular lenses (i.e., included angle α=90 degrees), the lenticular surface discussed below are equally applicable to included angles α that are within the range of 0 to 90 degrees (such as the embodiment of α=0 degree discussed later below). FIG. 8 is a cross-sectional view of an optical substrate 550 view in the y-z plane (same plane as in FIG. 6b). The optical substrate 550 includes a base layer 510 and a plurality of lenticular lens 520 having convex curved surfaces 524 formed on the top surface of the base layer 510, and longitudinal prisms 512 (similar to the prisms 58) formed on the bottom surface of the base layer 510. The surface 524 of each of the lenticular lenses 520 corresponds substantially to a section of the surface of a circular cylinders 522 having a radius "r" with center "O" in cross-section, which surface section corresponds to a subtended angle θ, and a subtended arc between point "a" and "b" in cross-section. In the sectional view shown in FIG. 8, the lens 520 corresponds to a segment of the circle 522, which is bounded by the chord a-b and the arc a-b. As shown in FIG. 8, adjacent arcuate surfaces 524 of lenticular lenses 520 do not contact one another to form a contiguous or continuous lens surface, as compared to FIG. 6b. In this embodiment, the surface 524 of each lens 520 "bottoms" onto the top of the base layer 510, with a flat spacing between adjacent lenses. In this embodiment, the lens width pitch 1 is the same for the discontinuous lenses 520. The spacing pitch 2 may be the same or different between adjacent discontinuous lenses.

In a preferred embodiment, the angle θ of lenticular structure is in the range of 5 degrees to 90 degrees, more preferably in the range of 20 degrees to 65 degrees. The height (H) of the lenticular lens structure (measured from the top of the base layer 510, or if the base layer is integral to the lenticular lens structure, measured from the valley between adjacent non-intesecting or non-overlapping lenticular lenses) is identical, preferably in the range of 1 μm to 100 μm, more preferably in the range of 2 μm to 50 μm. The curvature of the lenticular lenses is the same. Prism 512 peak height=5 μm to 100 μm; pitch of adjacent prism peaks=10 μm to 500 μm; thickness of base layer 510=5 μm to 1000 μm; Pitch 1=5 μm to 500 μm; Pitch 2=1 μm to 100 μm, referably 0 μm; distance between centers O of adjacent lenses=5 μm to 500 μm.

In a preferred embodiment, the vertex angle of prisms 512 is in the range of 70 degrees to 110 degrees, more preferably in the range of 80 degrees to 100 degrees. In another preferred embodiment, the vertical height (H) of the prism unit is in the range of 10 μm to 100 μm, more preferably in the range of 20 μm to 75 μm. Alternatively, the prism unit may or may not have the same vertical heights. In another preferred embodiment, the horizontal pitch of the prisms 512 is in the range of 10 μm to 250 μm, more preferably in the range of 15 μm to 80 μm.

Figure 9A:
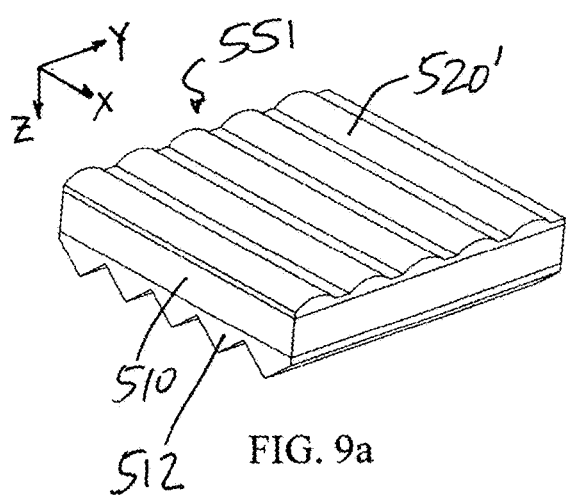
FIGS. 9a and 9b schematically illustrate a lenticular surface structure in accordance with an embodiment of the present invention.
Figure 9B:
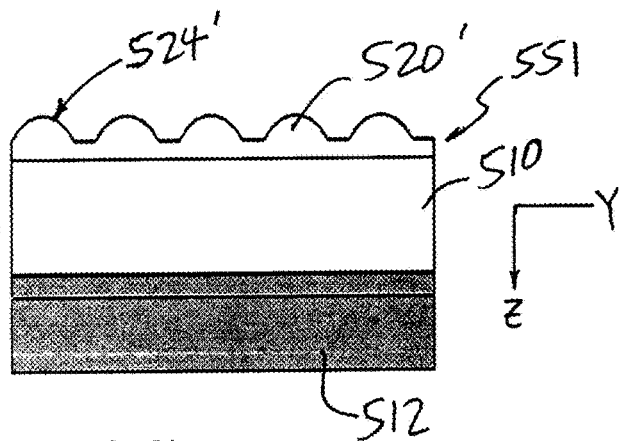

FIG. 9a is a top perspective view and FIG. 9b is a sectional view (in the y-z plane) of another embodiment of an optical substrate 551. In this embodiment, the curvature and height of the lenticular lenses 520' are respectively the same, and the distance pitch 2 between two discontinuous lenticular lenses 520' of the structured lenticular surface is the same. In this embodiment, the surface 524' of each lens 520' does not bottom onto the top of the base layer 510. The vertical height (H) of the lenticular lens structures (measured from the top of the base layer 510, or if the base layer is integral to the lenticular lenses, measured from the valley between adjacent lenticular lenses) is identical, preferably in the range of 1 μm to 300 μm, more preferably in the range of 2 μm to 50 μm. The curvature of the lenticular lenses is the same. Pitch 1=5 μm to 500 μm; Pitch 2=1 μm to 100 μm.

Figure 10A:
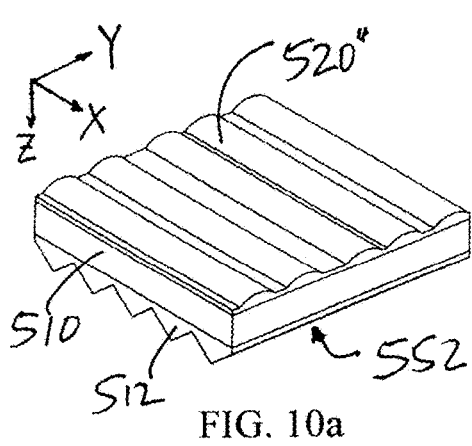
FIGS. 10a and 10b schematically illustrate a lenticular surface structure in accordance with another embodiment of the present invention.
Figure 10B:
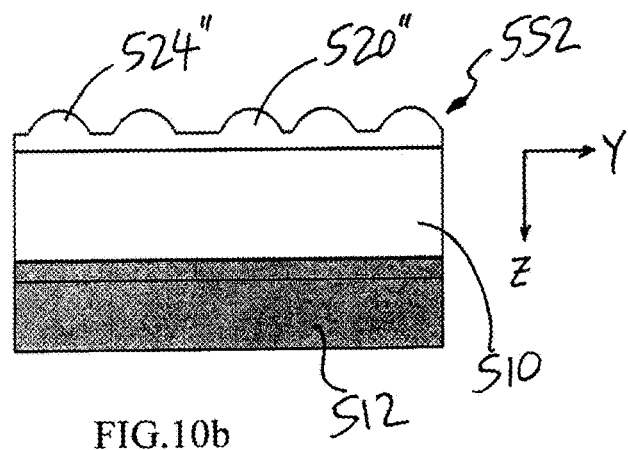

FIGS. 10a and FIG. 10b illustrates another embodiment of an optical substrate 552. In this embodiment, the distance pitch 2 between two discontinuous lenticular lenses 520" of the structured lenticular surface 524" is variable or different across the section. The height of the lenticular lenses (measured from the top of the base layer 510, or if the base is integral to the lenticular lenses, measured from the valley between non-intersecting adjacent lenticular lens) is identical, preferably in the range of 1 μm to 100 μm, more preferably in the range of 2 μm to 50 μm. The curvature of the lenticular lenses is the same. Pitch 1=5 μm to 500 μm; Pitch 2 varies between 1 μm to 100 μm.

Figure 11A:
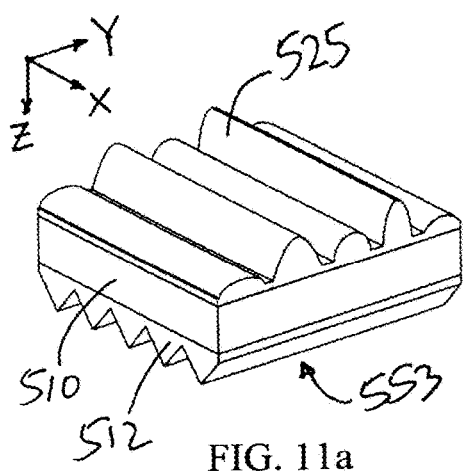
FIGS. 11a and 11b schematically illustrate a lenticular surface structure in accordance with yet another embodiment of the present invention.
Figure 11B:
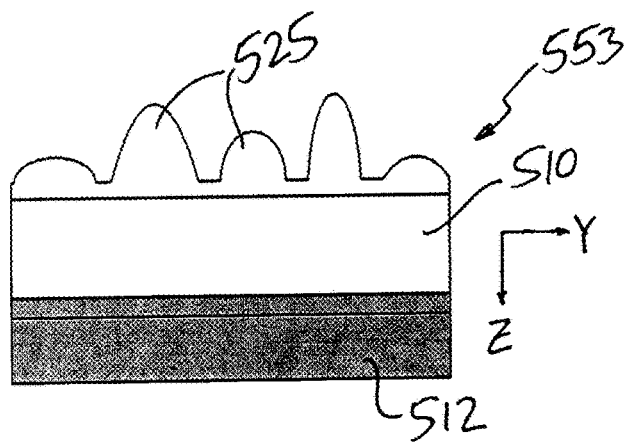

FIGS. 11a and 11b illustrate still another embodiment of an optical substrate 553. In this embodiment, the vertical height (H) of the structures of the lenticular lenses 525 is variable. Further, the radius of curvature of different lenticular lenses 525 may also vary and/or different lenticular surfaces may conform to cylinders of different cross-sections other than a circle (e.g., an ellipse or other cross-sections of regular or irregular geometries) and further of varying sizes. Longitudinal lenticular structures having a uniform cross-section defining other convex curve surface profiles are also contemplated (e.g., same profile or different profiles for different lenticular lenses). Pitch 1=5 μm to 500 μm; Pitch 2=1 μm to 100 μm; height varies 0.5 μm to 300 μm.

FIGS. 12a and 12b illustrate yet still another embodiment of an optical substrate 554. In this embodiment, some of the adjacent lenticular lenses intersect or partially overlap each other, thus defining a contiguous or continuous lenticular structured surface with some of the lenticular lenses 526 having an asymmetrical cross-section (as viewed in the y-z plane shown in FIG. 12b). The vertical height and curvature of the lenticular lenses 526 are respectively the same between the lenses. Pitch 1=5 μm to 500 μm; the extent of intersection may be between 1 μm to 50 μm overlap of the edges of adjacent lenticular lenses.

FIGS. 13a and 13b illustrate a further embodiment of an optical substrate 555. In this embodiment, the lenticular lenses 527 are discontinuous across in the y-direction (as shown in the illustrated sectional view). Portions of adjacent lenticular lenses 527 may be adjoining or contiguous. The lenticular lenses 527 swing laterally (in the y-direction), along the longitudinal direction (x-direction) of the lenses. In one embodiment, the lenticular structure may be viewed as comprising rows of laterally meandering longitudinal lenticular lenses and/or sections of continuous curved segments (i.e., sections with a curve in a particular direction, or generally C-shaped or S-shaped curve sections) coupled end-to-end to form the overall meandering longitudinal lenticular lens structure. In one embodiment, the laterally meandering rows of longitudinal lenticular structures are arranged in parallel laterally (side-by-side in the y-direction). In one embodiment, the lateral waviness is regular with a constant or variable wavelength and/or wave amplitude (or extent of lateral deformation). The lateral waviness may generally follow a sinusoidal profile, or other curved profile. In another embodiment, the lateral waviness may be of random wavelength and/or wave amplitude. In one embodiment, the vertical height, curvature, surface profile, and/or width of the lenticular lenses 527 respectively may be the same for adjacent lenses across a particular cross-sectional plane, and may be constant or varying for different cross-sectional plane along the longitudinal x-direction. Pitch 1=5 µm to 500 µm; Pitch 2=0 µm to 100 µm.

Figure 14A:
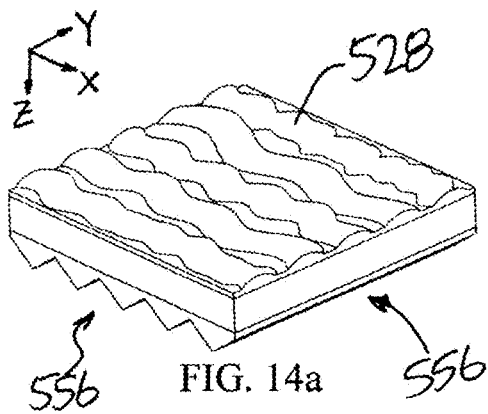
FIGS. 14a to 14f schematically illustrate a lenticular surface structure in accordance with another further embodiment of the present invention.
Figure 14B:
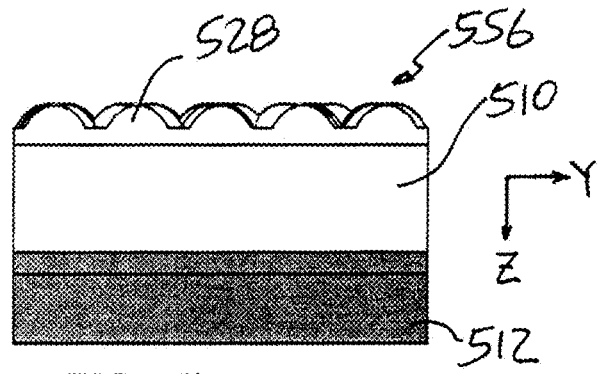
Figure 14C:
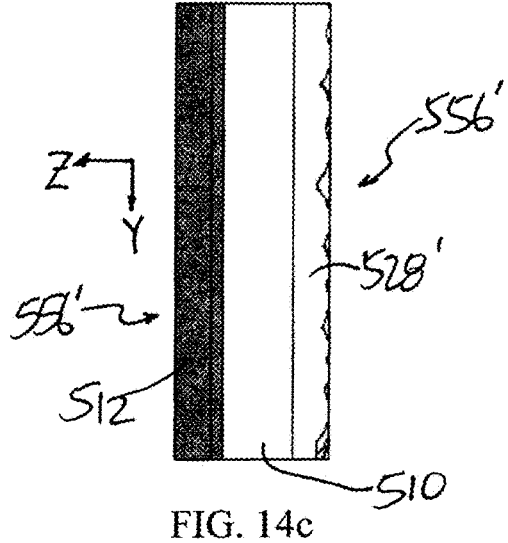
Figure 14D:
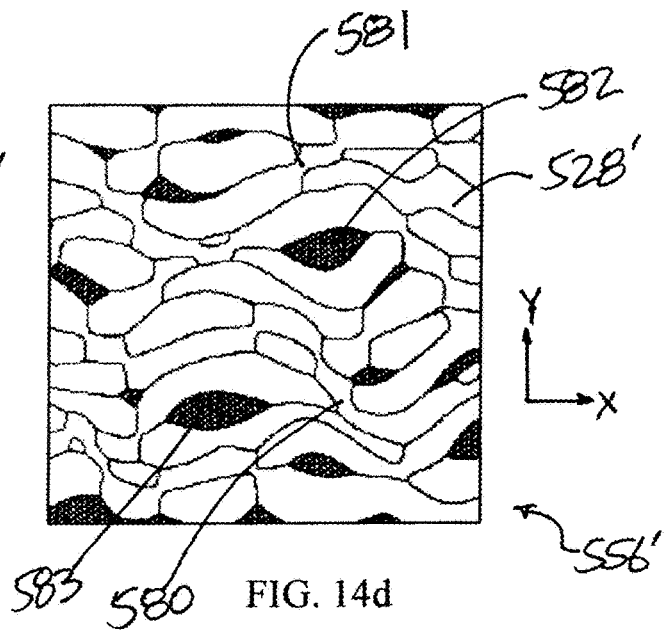
Figure 14E:
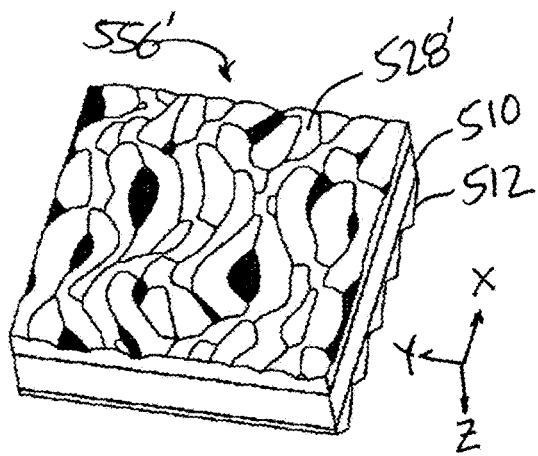
Figure 14F:
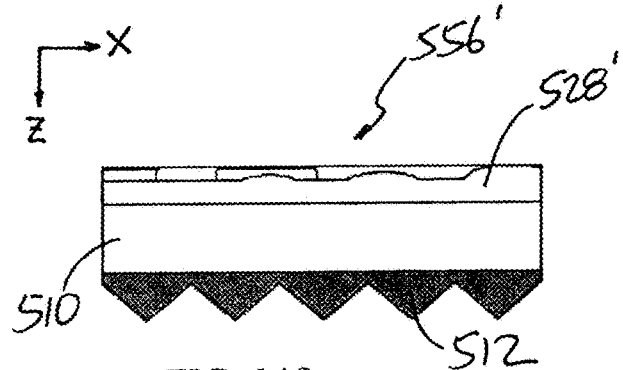

FIGS. 14a and 14b illustrate a modification of the embodiment of FIGS. 13a and 13b. In this embodiment of an optical substrate 556, some of the adjacent laterally meandering lenticular lenses intersect or partially overlap each other, thus defining a contiguous or continuous lenticular surface at some locations along the length of each lenticular lens 528. Those adjacent lenticular lenses 528 that intersect would have an asymmetrical cross-section (as viewed in the y-z plane shown in FIG. 14b; see also FIG. 12b). The lenticular lenses 528 have the same height. Other structures may be similar to those in the embodiment of FIG. 13.

FIGS. 14c to 14f illustrate a variation of the laterally meandering lenticular lenses 528 shown in FIGS. 14a and 14b. As illustrated, part of the lenticular lenses 528' in FIGS. 14c to 14f intersect or partially or completely overlap each other, thus defining a contiguous or continuous lenticular structured surface on the optical substrate 556'. Essentially, the lenticular lenses 528' combine the height varying feature of the lenticular lenses 528 in FIGS. 14a and 14b, and the intersecting feature of the lenticular lenses 526 in FIGS. 12a and 12b. As shown in the x-y plane of FIG. 14d, the lenticular lenses 528' are not all longitudinally continuous from one edge to an opposing edge of the optical substrate 556'. Some of the lenticular lens 528' appear as longitudinal segments that are shorter, having a terminating end at a place (e.g., 580 and 581), where one section of a lenticular lens 528' completely overlaps another lenticular lens 528'. There are spaces or flats (e.g., at 582 and 583) between the lenticular lenses 528'.

U.S. Pat. No. 7,618,164 incorporated in the present invention by reference hereafter describes "Hard tools can be used to cut the surface of the mold to form above-described the structured surface (e.g., even structure) of the optical substrate. The hard tools may be diamond tools of very small size mounted on a CNC (Computer Numeric Control) machine (e.g., turning, milling and ruling/shaping machines)." The even structure in FIG. 14c to FIG. 14f can be formed by cutting trenches on the surface of the mold through a control system (e.g., CNC system) and using the surface of the molding to emboss a thin film on the substrate.

A portion of lenticular lenses 528' in FIG. 14c to FIG. 14f result from overlap of the lenticular lenses 528 in FIG. 14a to FIG. 14b; that is, a plurality of trenches are cut in an order on the surface of the mold, each trench is cut in a first direction, (if the trenches do not overlap, the lenticular lenses 528 can be formed), then a portion of lenticular lenses 528' in FIG. 14c to FIG. 14f can be formed by overlap of the trenches. From what FIG. 14c to FIG. 14f illustrate previously, the lenticular lenses 528' are not all longitudinally continuous from one edge to an opposing edge of the optical substrate 556'; that is, a portion of trenches are cut off by the other trench(es) such that a portion of lenticular lenses 528' (segments) of the uneven structure correspond to the portion of a portion of trenches that is not cut off.

Figure 15A:
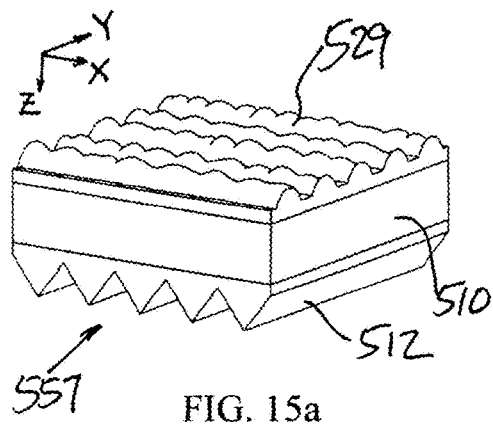
FIGS. 15a to 15f schematically illustrate a lenticular surface structure in accordance with still a further embodiment of the present invention.
Figure 15B:
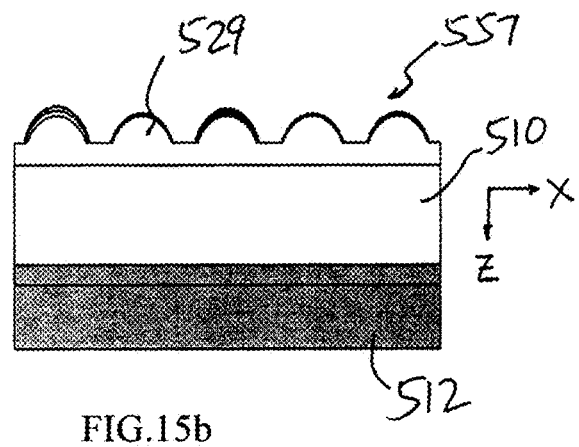
Figure 15C:
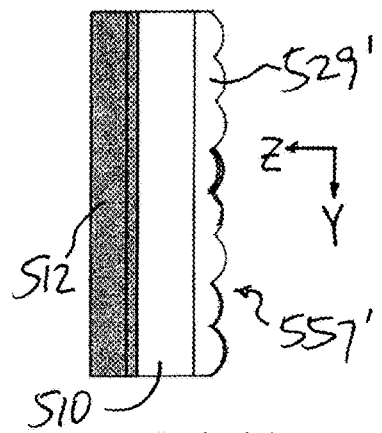
Figure 15D:
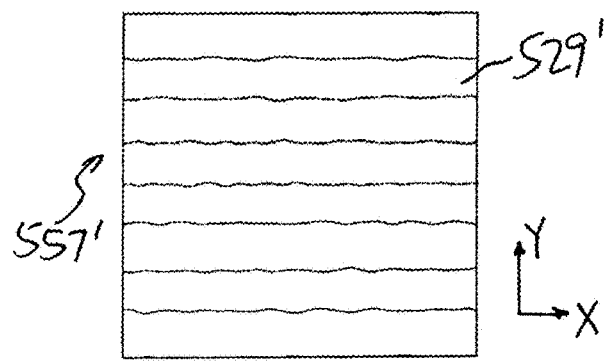
Figure 15E:
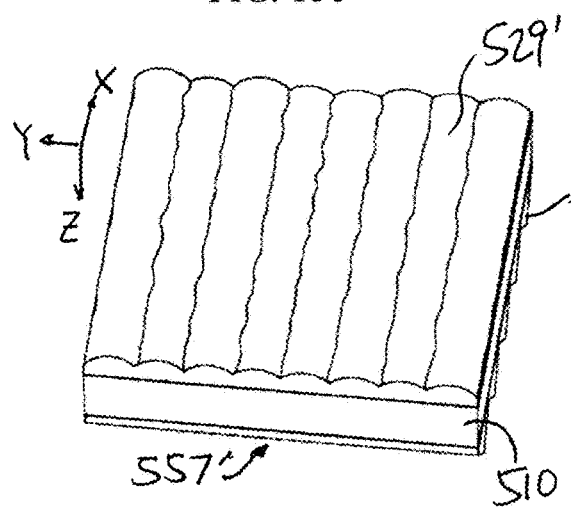
Figure 15F:
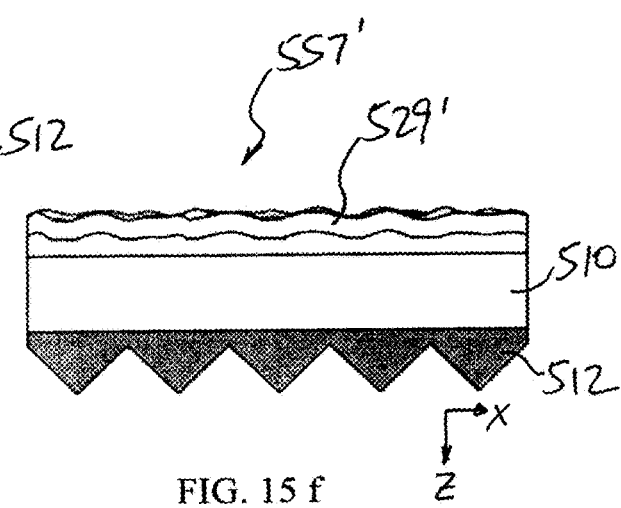
Figure 19A:
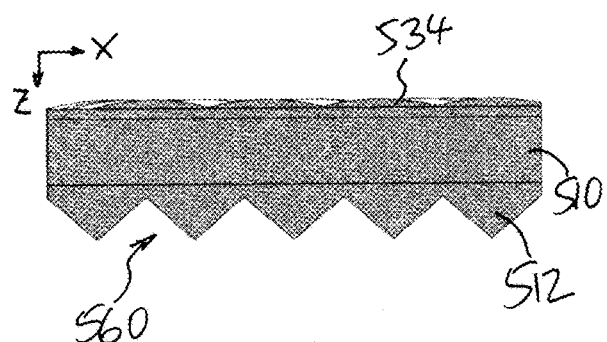
FIGS. 19a to 19d are schematic views of a lenticular segment in accordance with a further embodiment of the present invention.
Figure 19B:
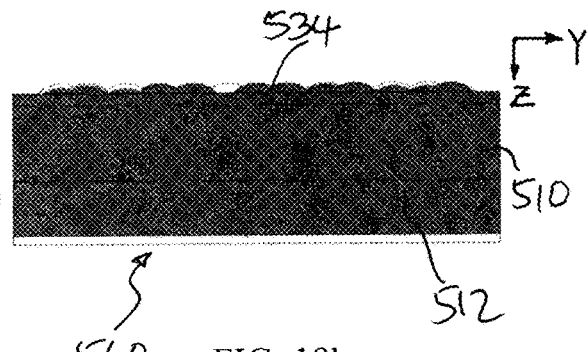
Figure 19C:
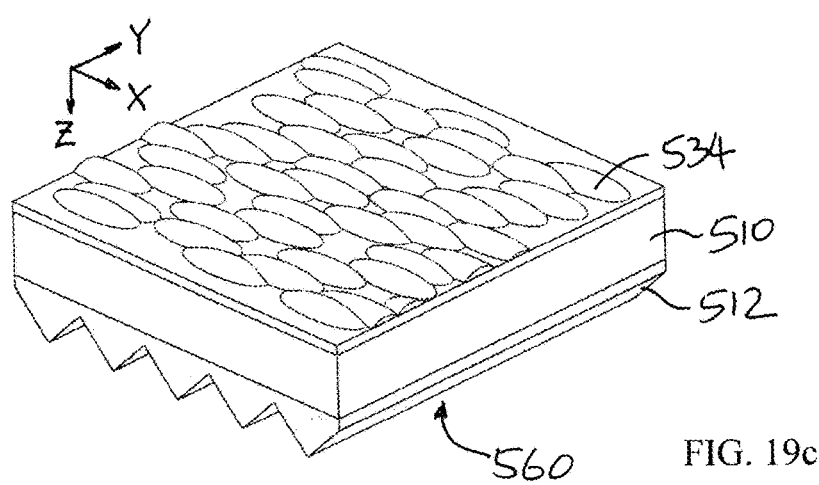
Figure 19D:
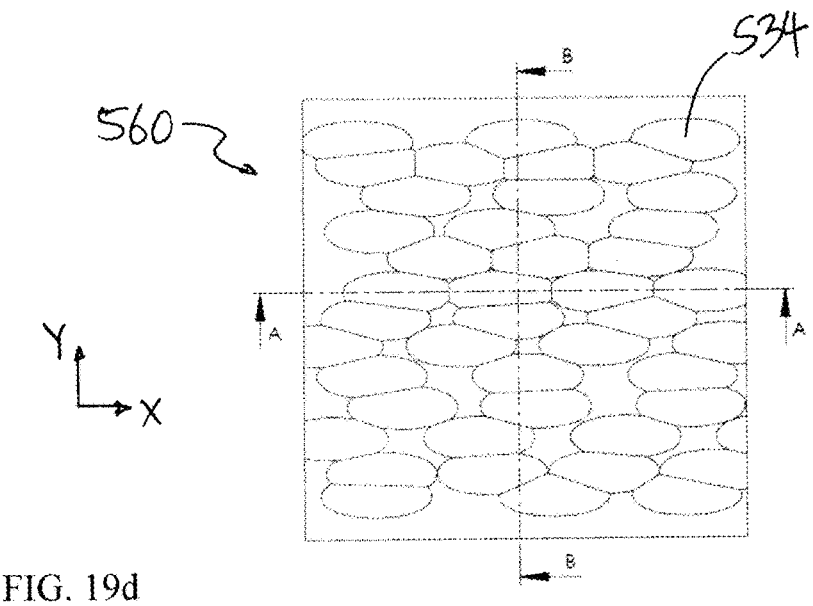

FIGS. 15a and 15b illustrate a further embodiment of an optical substrate 557. In this embodiment, adjacent lenticular lenses 529 are separated by a spacing, and the height varies along the length of each lenticular lens in the x-direction. In this illustrated embodiment, as the height varies along a lens, the sectional surface profile varies in the x direction. The height variation may generally follow a sinusoidal profile, or other curved profile, in regular, constant, varying or random wavelength and/or wave amplitude. The width of the lenses (e.g., pitch 1 between point "a" to point "b" as shown in FIG. 8) is the same for adjacent lenses, and constant along each lens in the x-direction. In an alternate embodiment, the width may also vary between adjacent lenses or along the x-direction for one or more of the lenses. The spacing (e.g., pitch 2 as shown in FIG. 8) between lenses may be constant across a section as shown in FIG. 14b (also shown in FIG. 9b) or may be varying across a section (e.g., as shown in FIG. 10b). Pitch 1=5 µm to 500 µm; Pitch 2=0 µm to 100 µm; range of height variations=1 µm to 50 µm.

FIGS. 15c to 15f illustrate a variation of the height varying lenticular lenses 529 shown in FIGS. 15a and 15b. As illustrated, the longitudinal lenticular lenses 529' in FIGS. 15c to 15f intersect or partially overlap each other, thus defining a contiguous or continuous lenticular structured surface on the optical substrate 557'. Essentially, the longitudinal lenticular lenses 529' combine the height varying feature of the lenticular lenses 529 in FIGS. 15a and 15b, and the intersecting feature of the longitudinal lenticular lenses 526 in FIGS. 12a and 12b. The structure in FIGS. 15c to 15f can be formed by the following way: (a) using a hard tool to penetrate into a mold to cut a plurality of trenches in an order on a surface of a mold (maybe through a control system), wherein the hard tool has a shape such that the transverse width of each trench increases as the penetrating depth of the hard tool increases, wherein when each of the plurality of trenches marches along a first direction, the penetrating depth of the hard tool is controlled by repeating moving the hard tool up and down to cut the mold such that the transverse width of each of the plurality of trenches varies according to the controlled penetrating depth of the hard tool, wherein each adjacent two trenches completely overlap with each other with no space therebetween; (b) using the surface of the mold to emboss a thin film on a substrate. When a trench marches along the first direction, the transverse width of the trench has the maximum value and the minimum value alternating with each other by repeating moving the hard tool up and down such that the trench has a structure in the form of the annelid; comparing with the trench having the constant transverse width controlled by the constant penetrating depth, it changes one-dimensional cylindrical structure to two-dimensional structure in the form of the annelid so as to increase the diffusion of the optical film. When two trenches marches along the first direction (preferably along a straight line in the first direction), the present invention solves the problem "there exists a space between the traverse width of the former trench and the traverse width of the latter trench having the minimum at the same time" which guarantees that there is no flat portion on the film embossed by the mold so as to increase the diffusion performance. Preferably, use the hard tool to cut a plurality of trenches in an order on the surface of the roll through a CNC (Computer Numeric Control) system, wherein when each trench is cut, the hard tool is not pulled away from the roll (when the hard tool does not penetrate into the mold/roll, the mold/roll has a unstructured surface; however, when the hard tool penetrates into the mold/roll, the front end of the hard tool is kept below the unstructured surface until the trench is completely formed); it changes one-dimensional cylindrical structure to two-dimensional structure in the form of the annelid such that there exists no space between adjacent two trenches so as to increase the diffusion of the optical film. Preferably, (the front end of) the hard tool has a lenticular shape (as illustrated in FIG. 8, the front end of the hard tool has an arc shape); comparing with the film embossed by the mold cut by the hard tool having a prismatic shape, the film embossed by the mold cut by the hard tool having a lenticular shape has a better diffusion performance. However, the hard tool of the present invention is not limited to have an arc shape, the hard tool having a smoothly-curved shape to get a better diffusion performance can be applied in the present invention. Preferably, comparing with cutting each trench meandering along the first direction, cutting each trench by maintaining the hard tool substantially along a straight line in the first direction not only shortens the time of the mold-making but also enhances the precision of the mold to reduce the error of the mold-making (the front end of the hard tool has an arc shape so as to guarantee that each trench cut on the mold has a smooth arc shape and the film embossed by the mold has a better diffusion performance).

FIGS. 16a to 16b illustrate still another embodiment of an optical substrate 558. In this embodiment, instead of the continuous longitudinal lenticular structure extending across the entire optical substrate as in the prior embodiments, it is broken into lenticular segments. Referring also to FIG. 17, each lenticular segment 530 is generally in an elongated, slender structure having rounded ends. The overall structure of the lenticular segment 530 is symmetrical in the x-y plane, resembling a segment of an ellipsoid. The top view of the structure of the lenticular segment 530 shown in FIG. 17c is generally a symmetrical, slender, elongated or flat elliptic-like structure. The longitudinal sectional profile of the lenticular segment 530 shown in FIG. 17a is generally slender and elongated curved surface, resembling the top of an ellipse. In the illustrated embodiment of FIG. 16a, the lenticular segments 530 are arranged in straight longitudinal rows in the X-direction, with the longitudinal (or major) axis of the lenticular segments 530 aligned with the longitudinal direction (i.e., X-direction) of the rows. In an alternate embodiment, the planar geometry of the lenticular segments may be asymmetric. The lenticular segments 530 are isolated or separated from each other in this embodiment. The transverse sectional profile of the lenticular segment 530 shown in FIG. 17b is generally cylindrical surface, resembling the sectional profiles in the earlier embodiments. In this embodiment, the vertical height (H) along each lenticular segment may be viewed to vary a great degree along the longitudinal x-direction. The overall height of the lenticular segments 530 is the same. By controlling the surface curvature, the ratio of the pitch (L) and height (H), the lenticular segment 530 can effect light diffusion in the x-y plane (i.e., along the x and y directions). The dimensions of the segment 530: length L1=1 μm to 5000 μm; pitch L2=0.5 μm to 2000 μm; H=0.1 μm to 500 μm. The distribution of the segments 530 is from about 30% to 100% coverage of the area of the optical substrate. It is noted that 100% coverage means the lenticular segments are overlapping (see, for example, FIG. 19 and discussion below).

FIGS. 18 to 21 illustrate variations of the lenticular segments on the structured lenticular surface of optical substrates, in accordance with further embodiments of the present invention. Other than the lenticular segments, the remaining structures in the various embodiments may be similar to those in FIG. 16.

In the embodiment of FIG. 18, the elliptic-like lenticular segments 532 on the optical substrate 559 are asymmetrical (not symmetrical) in the x-y plane, as compared to the lenticular segment 530 in the FIG. 16 embodiment.

In the embodiment of FIG. 19, the elliptical-like lenticular segments 534 are symmetrical, but intersect or partially overlap each other on the optical substrate 560, as compared to the lenticular segment 530 in the FIG. 16 embodiment. The illustrated structured surface can provide better diffusion.

In the embodiment of FIG. 20, the elliptical-like lenticular segments 535 are asymmetrical and intersect or partially overlap each other on the optical substrate 561, as compared to the FIG. 19 embodiment. The illustrated structured surface can also provide better diffusion.

Figure 21A:
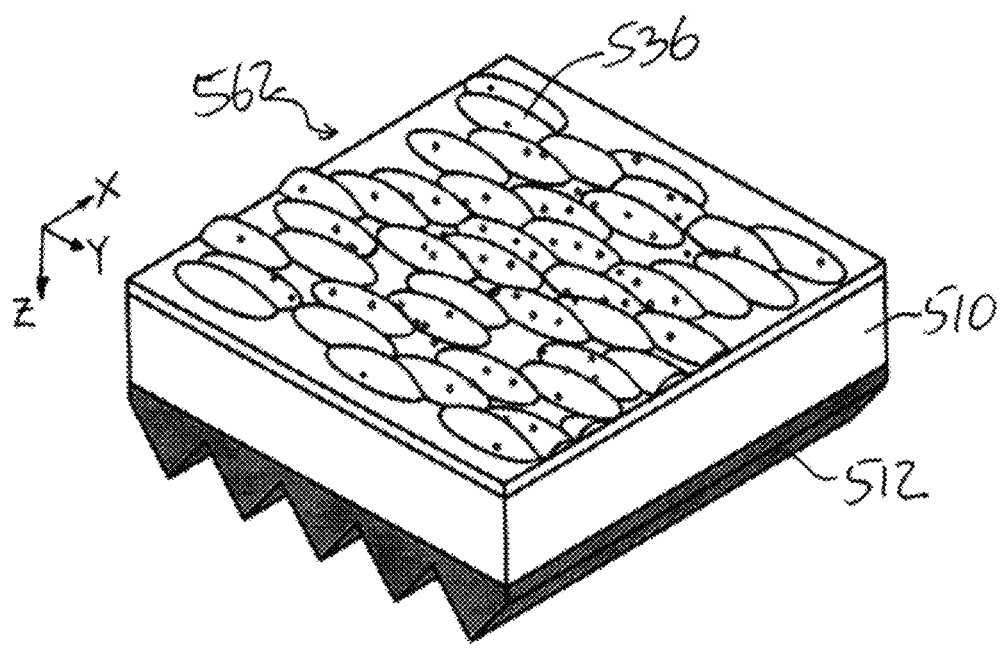
FIG. 21a is a schematic view of a lenticular segment in accordance with a still further embodiment of the present invention.
Figure 21B:
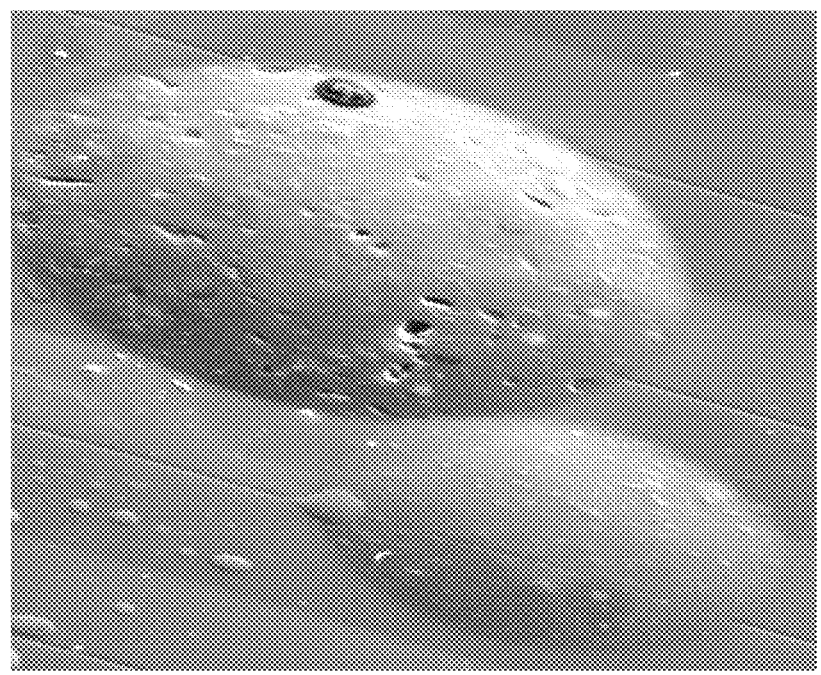

In the embodiment of FIG. 21, the elliptical-like lenticular segments 536 are symmetrical and intersect or partially overlap each other on the optical substrate 562, similar to the FIG. 19 embodiment, but the surface of the lenticular segments 536 in this embodiment is roughened or textured with dents, lines, cracks, pits, and/or protrusions, etc. to increase diffusion effect. FIG. 21b shows an SEM photograph of the textured surface of the lenticular segments. The lenticular structures in the other embodiments disclosed herein may also be similarly textured.

Figure 26:
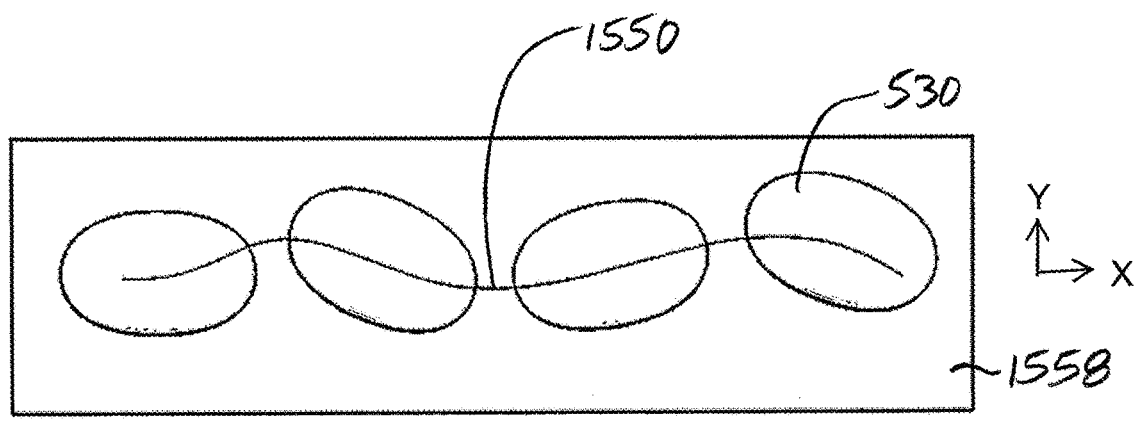
FIG. 26 is a schematic top view of a lenticular surface structure comprising lenticular segments in accordance with a further embodiment of the present invention.

FIG. 26 is a schematic top view illustrating a variation of the arrangement of the lenticular lenses in the form of lenticular segments 530 on the structured lenticular surface of optical substrate 1558, in accordance with an alternate embodiment of the present invention. Compared to the straight line alignment of the lenticular segments 530 illustrated in FIG. 16, the lenticular segments 530 in FIG. 26 are aligned in a longitudinal wavy row extending in the longitudinal X-direction, with their longitudinal (or major) axis following a generally wavy profile 1550. The wavy profile 1550 may be regular, irregular, sinusoidal, and/or random waveform or wavy profile. FIG. 26 is merely a schematic depiction of the alignment of the lenticular segments in a single wavy row, in accordance with one embodiment. For simplicity, only one wavy row is illustrated in FIG. 26. Even though not illustrated in FIG. 26, there are multiple wavy rows at the lenticular surface of the optical substrate 1558, wherein the wavy rows are arranged in parallel and extend in the longitudinal X-direction. In other embodiments, the lenticular segments may be symmetrical or non-symmetrical, may intersect or partially overlap (in either or both the longitudinal Y-direction or the lateral X-direction), and/or may have textured surface, similar to the embodiments disclosed in the earlier embodiments above.

Experimental Results

Various sample optical substrates have been evaluated for the effect of angle and Refractive Index versus haze and gain, and the effect on interference fringes.

Haze measurement is made on sample optical substrates having only lenticular lenses on the light input surface without prisms on the opposing light output surface. Haze is measured by placing the respective optical substrates in a haze meter (e.g., Haze Turbidity Meter by Nippon Denshoku Industries Co. Ltd., Model No. NDH-2000).

Gain of sample optical substrates is evaluated using a colorimeter (e.g., TopCon BM7 Luminance colorimeter), to determine the on-axis luminance emitting from backlight through optical substrates of the present invention, which have both structured prismatic light output surface and structured lenticular light input surface (i.e., prism structures and lenticular structures are present on opposing sides of the optical substrate). On-axis luminance is the intensity of light emitting normal to the test samples. Data was reported as the luminance in candela per square meter (cd/m$^2$). For the evaluation of gain, a lower diffuser sheet is placed on the backlight, which is interposed between the backlight and each sample optical substrate under evaluation. No other optical films or LC module is being used for gain evaluation. The luminance value for each sample optical substrate is measured. The luminance value of the same backlight with only the same lower diffuser sheet is measured. The value of on-axis luminance gain is expressed as the ratio of the measured luminance value of a sample optical substrate (with the intermediate lower diffuser) to the measured luminance value of the backlight with the lower diffuser only.

Interference fringe effect of the sample optical substrates of the present invention are simply observed by the naked eye using the backlight, with intermediate layers of a lower diffuser sheet placed on the backlight, and a prismatic luminance enhancement sheet (with no lenticular structures on the light input side) between the sample optical substrate and the lower diffuser sheet.

The flat ratio is the ratio of Pitch 2/(Pitch 2+Pitch 1). For all the experiments, pitch 1 is constant for the sample optical substrates.

Experiment A:

Table 1 shows the effects of the angle θ of the lenticular structure (e.g., similar to embodiment shown in FIG. 6*a*, with flat ratio at 0%) on gain and diffusion/haze. It has been observed that interference fringes are eliminated and the gain maintained between 1.49 and 1.54 for angle θ in the range of 16 degrees to 66 degrees.

TABLE 1

| Lenticular structure | | | | | Haze (single side lenticular structure with no prism structure) % | Gain (with prism structure on the light output side) | Dark and bright fringes |
|---|---|---|---|---|---|---|---|
| Radius (μm) | Angle θ (deg.) | Refractive Index | Angle α (deg.) | Flat ratio % | | | |
| 600 | 6 | 1.48 | 90 | 0 | 2.38 | 1.55 | Observed |
| 600 | 16 | 1.48 | 90 | 0 | 20.25 | 1.54 | Observed |
| 600 | 26 | 1.48 | 90 | 0 | 42.92 | 1.53 | Very slight |
| 58 | 36 | 1.48 | 90 | 0 | 58.04 | 1.53 | Not observed |
| 600 | 46 | 1.48 | 90 | 0 | 65.6 | 1.51 | Not observed |
| 600 | 56 | 1.48 | 90 | 0 | 70.83 | 1.49 | Not observed |
| 58 | 66 | 1.48 | 90 | 0 | 72.9 | 1.51 | Not observed |
| 58 | 82 | 1.48 | 90 | 0 | 78.24 | 1.42 | Not observed |
| 58 | 106 | 1.48 | 90 | 0 | 79.09 | 1.25 | Not observed |
| 58 | 120 | 1.48 | 90 | 0 | 81.01 | 1.23 | Not observed |
| 58 | 144 | 1.48 | 90 | 0 | 81.18 | 1.20 | Not observed |

Experiment B:

Table 2 shows the effects of the refractive index of the lenticular structure (e.g., structure shown in FIGS. 6*a* and 8 with zero flat ratio). At bigger angles θ, haze is higher but gain is lower. Haze will increase when the refractive index of lenticular structure increases. However, the gain of optical substrate will decrease. It appears that the preferred refractive index of lenticular structure is in the range of 1.45 to 1.58.

TABLE 2

| Lenticular structure | | | | | Haze (single side lenticular structure with no prism structure) % | Gain (with prism structure on the light output side) | Dark and bright fringes |
|---|---|---|---|---|---|---|---|
| Radius (μm) | Angle θ (deg.) | Refractive Index | Angle α (deg.) | Flat ratio % | | | |
| 58 | 82 | 1.56 | 90 | 0 | 87.2 | 1.34 | Not observed |
| 58 | 66 | 1.56 | 90 | 0 | 75.7 | 1.48 | Not observed |
| 58 | 52 | 1.56 | 90 | 0 | 71.8 | 1.51 | Not observed |
| 58 | 36 | 1.56 | 90 | 0 | 63.0 | 1.51 | Not observed |
| 58 | 82 | 1.48 | 90 | 0 | 78.2 | 1.42 | Not observed |
| 58 | 66 | 1.48 | 90 | 0 | 72.9 | 1.51 | Not observed |
| 58 | 52 | 1.48 | 90 | 0 | 68.4 | 1.53 | Not observed |
| 58 | 36 | 1.48 | 90 | 0 | 58.0 | 1.53 | Not observed |

Experiment C:

Table 3 shows there is no significant change in haze and gain while changing lenticular radius (e.g., structure shown in FIGS. 6*a* and 8 with zero flat ratio). However, angle θ is significant to changes in haze and gain.

TABLE 3

| Lenticular structure | | | | | Haze (single side lenticular structure with no prism structure) % | Gain (with prism structure on the light output side) | Dark and bright fringes |
|---|---|---|---|---|---|---|---|
| Radius (μm) | Angle θ (deg.) | Refractive Index | Angle α (deg.) | Flat ratio % | | | |
| 7.8 | 106 | 1.48 | 90 | 0 | 77.2 | 1.35 | Not observed |
| 23 | 106 | 1.48 | 90 | 0 | 81.5 | 1.34 | Not observed |
| 58 | 106 | 1.48 | 90 | 0 | 79.1 | 1.25 | Not observed |
| 7.8 | 66 | 1.48 | 90 | 0 | 70.5 | 1.51 | Not observed |
| 23 | 66 | 1.48 | 90 | 0 | 70.0 | 1.51 | Not observed |
| 58 | 66 | 1.48 | 90 | 0 | 72.9 | 1.51 | Not observed |
| 7.8 | 36 | 1.48 | 90 | 0 | 29.3 | 1.55 | observed |
| 23 | 36 | 1.48 | 90 | 0 | 50.9 | 1.54 | Not observed |
| 58 | 36 | 1.48 | 90 | 0 | 58.0 | 1.53 | Not observed |

Experiment D:

Table 4 shows the effects of the flat ratio of the optical substrate, such as embodiment shown in FIG. 9. At low flat ratio, the optical substrate has higher haze and interference fringes may be eliminated. When the flat ratio of the optical substrate is higher, the ability to eliminate the interference fringes decreased. The preferable flat ratio of the optical film does not exceed 10%.

TABLE 4

| Lenticular structure | | | | | Haze (single side lenticular structure with no prism structure) % | Gain (with prism structure on the light output side) | Dark and bright fringes |
|---|---|---|---|---|---|---|---|
| Radius (μm) | Angle θ (deg.) | Refractive Index | Angle α (deg.) | Flat ratio % | | | |
| 58 | 106 | 1.48 | 90 | 7.76 | 74.7 | 1.27 | Not observed |
| 58 | 106 | 1.48 | 90 | 34.70 | 61.4 | 1.34 | Observed |
| 58 | 106 | 1.48 | 90 | 61.64 | 50.8 | 1.37 | Observed |

Experiment E:

In this experiment, the two optical substrates are rotated with respect to one another to vary the angle α (see embodiment of FIG. 6a). Table 5, the angle α can be substantially 90° to provide a brightness enhancement film having acceptable diffusion that also exhibits good gain.

TABLE 5

| Lenticular structure | | | | | Haze (single side lenticular structure with no prism structure) % | Gain (with prism structure on the light output side) |
|---|---|---|---|---|---|---|
| Radius (μm) | Angle θ (deg.) | Refractive Index | Angle α (deg.) | Flat ratio % | | |
| 600 | 6 | 1.48 | 0 | 0 | 2.4 | 1.55 |
| 600 | 16 | 1.48 | 0 | 0 | 20.3 | 1.52 |
| 600 | 26 | 1.48 | 0 | 0 | 42.9 | 1.48 |
| 600 | 6 | 1.48 | 45 | 0 | 2.4 | 1.55 |
| 600 | 16 | 1.48 | 45 | 0 | 20.3 | 1.52 |
| 600 | 26 | 1.48 | 45 | 0 | 42.9 | 1.49 |
| 600 | 6 | 1.48 | 75 | 0 | 2.4 | 1.55 |
| 600 | 16 | 1.48 | 75 | 0 | 20.3 | 1.53 |
| 600 | 26 | 1.48 | 75 | 0 | 42.9 | 1.49 |
| 600 | 6 | 1.48 | 90 | 0 | 2.4 | 1.55 |
| 600 | 16 | 1.48 | 90 | 0 | 20.4 | 1.54 |
| 600 | 26 | 1.48 | 90 | 0 | 42.9 | 1.53 |

Given the afore-described embodiments and experimental results, one can reasonably anticipate the effects of selecting and/or combining the different features of structured surfaces to reduce interference fringes and increase gain, without compromising acceptable diffusion, as well as achieve the other benefits of the present invention noted above. For example, the level of light scattering is controlled by parameters including refractive index (RI) of resin, radius of curvature of the lenticular lenses, subtended angle/height of the lenticular lens, flat ratio, etc. It is clear that there is synergy in the combination of the structured lenticular light input surface and the structured prismatic light output surface to achieve the benefits of the present invention.

While the afore-described optical substrates comprising a prismatic structured surface and an opposite lenticular structured surface, diffusion can be accomplished while reducing certain undesired optical effects such as wet-out, Newton's rings or interference fringes, without significantly reducing overall brightness. While the lenticular structured surface reduces cutoff effect (manifested as a rainbow at the cutoff) between perceived dark and light regions to some extent at certain angle of view or observation, a more gradual or soft cutoff would be desirable for certain display applications.

According to another aspect of the present invention, the lenticular structure surface of the optical substrate comprises a shallow-curved lens structure having "ripples" distributed along the lenticular structure (which may be otherwise uniform in cross section). The ripples may resemble knots or a series of knots. The level of light scatting would then be controlled by parameters including density of the ripples, in addition to refractive index (RI) of resin, radius of curvature of the lenticular lenses, subtended angle/height of the lenticular lens, flat ratio, etc.

FIGS. 22a to 22d illustrate an optical substrate 70 having a knotted structured lenticular surface in accordance with one embodiment of the present invention. In this embodiment, the structure of the optical substrate 70 is essentially similar to the optical substrate 50 shown in FIG. 6a and described above, except for the addition of isolated knots 86 on the structured lenticular surface 72 as further explained below, and a structured prismatic surface 74 having prism heights alternately varying along the prisms 78. Both structured layers are supported by the base layer 53.

Figure 22A:
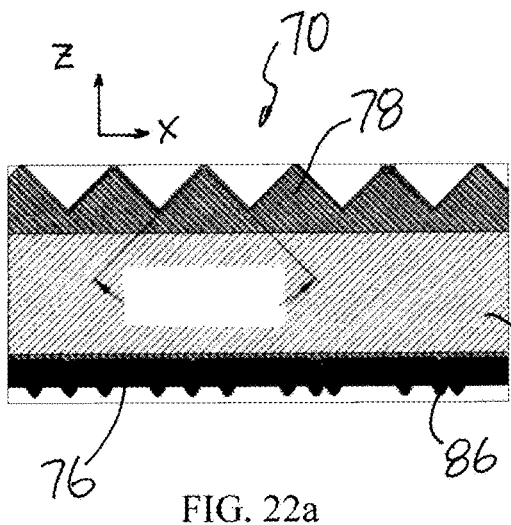
FIGS. 22a to 22d illustrate a knotted lenticular structure in accordance with one embodiment of the present invention.
Figure 22B:
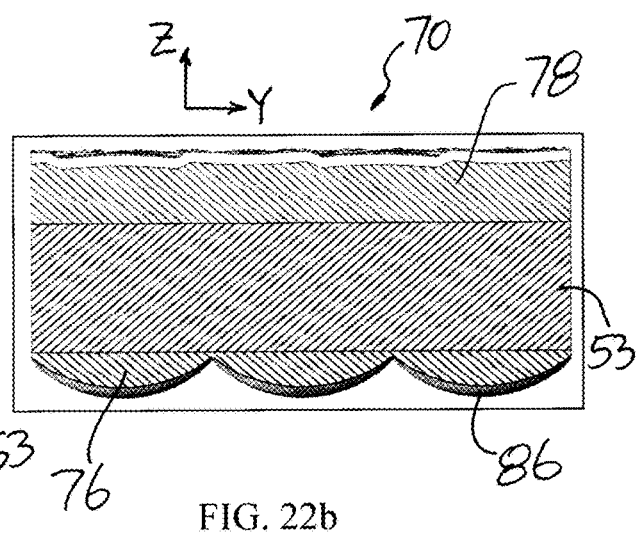
Figure 22C:
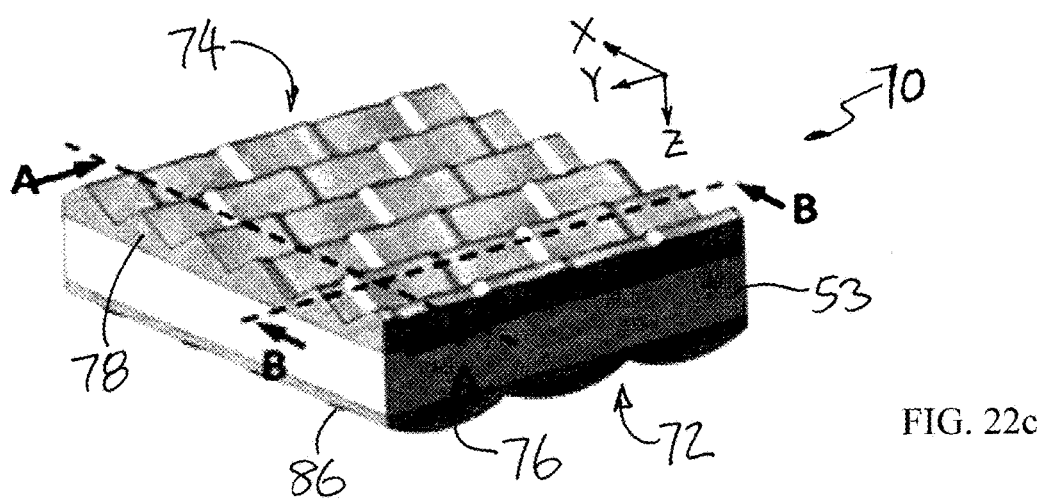
Figure 22D:
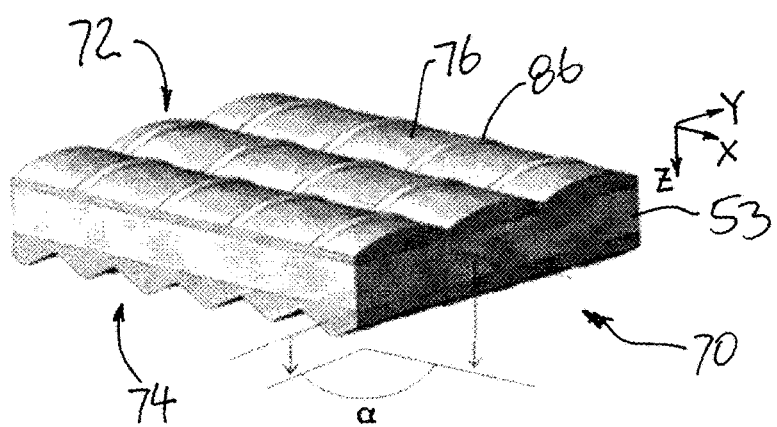

The shallow-curved convex lenses 76 are provided with ripples in the form of pre-defined isolated knots 86 distributed in the x-direction, along the otherwise continuous, uniform lenticular lenses 76. The knots 86 are each in the form of a section of an annular band around the cylindrical surface of the lenticular lenses 76. In the sectional view of FIG. 22a, the knots 86 have a convex curved sectional profile. The pre-defined knots 86 on the structured lenticular surface 72 scatter light in the longitudinal x direction parallel to the longitudinal lenticular lenses 76, and the shallow-curved lenticular lenses can scatter light in the lateral y direction perpendicular to longitudinal lenticular lenses 76, so the shallow-curved lens structure with pre-defined knots surface can improve diffusion effect as compared to the earlier embodiment of FIG. 6a, for example. Accordingly, the knots 86 contribute to diffusion and also reduce certain undesirable optical defects such as cutoff-effect (rainbow), Newton's rings, and interference fringes. The knots may be several micrometers to hundreds of micrometers wide (in the x-direction, viewed in section as shown in FIG. 22a), and one micrometer to tens of micrometers above or below the adjacent surface of the lenticular lens. The distance between isolated knots 86 along a lenticular lens may be several micrometers to thousands of micrometers.

In this embodiment, the longitudinal prisms 78 have peaks alternating between two heights (about 3 µm difference in heights) along the longitudinal y direction. The prismatic structured surface 74 can improve brightness by collimating light incident on the structured lenticular surface to emit light in an on-axis direction.

The triangular prisms 78 lean next to each other defining a continuous or contiguous prismatic structured surface, while the shallow-curved lenses 76 also lean next to each other defining a continuous or contiguous lenticular structured surface 72. As in earlier embodiments, the longitudinal directions of the lenticular lenses 76 and the prisms 78 may be configured at different included angles α. The included angle α may range from 0° to 90°, preferably 45° to 90°, to provide an optical substrate having satisfactory ability to diffuse light while not significantly reducing the overall brightness. The included angle α may be substantially 90° to provide preferable performance. The fabrication of the optical substrate 70 may involve similar processes as in earlier embodiments.

Figure 23A:
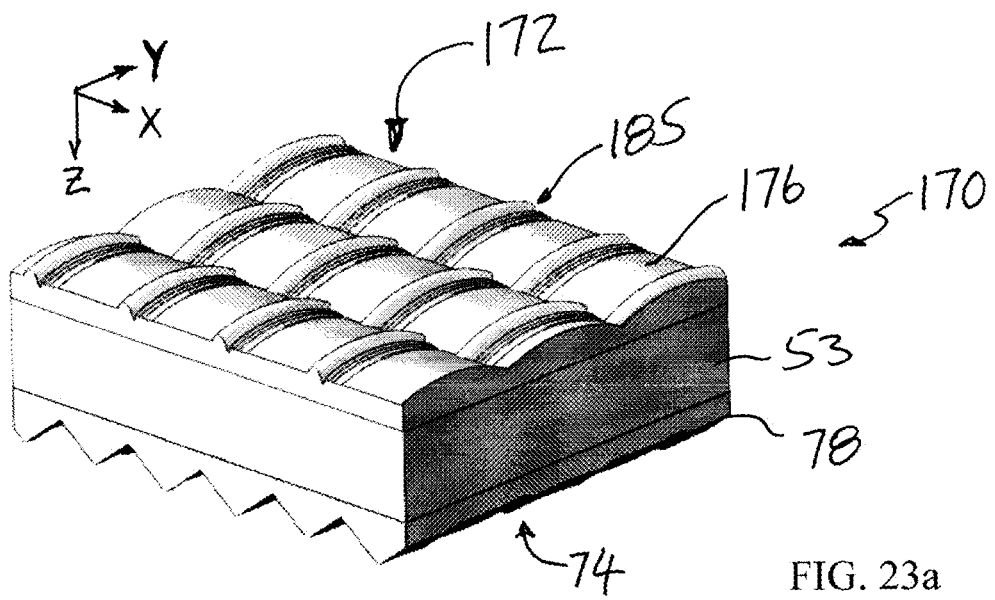
FIGS. 23a to FIG. 23c illustrate a rippled lenticular structure in accordance with one embodiment of the present invention.
Figure 23B:
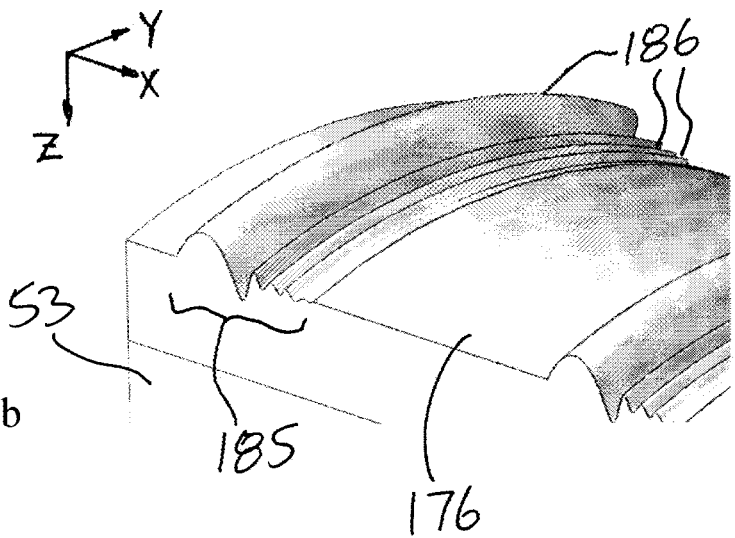
Figure 23C:
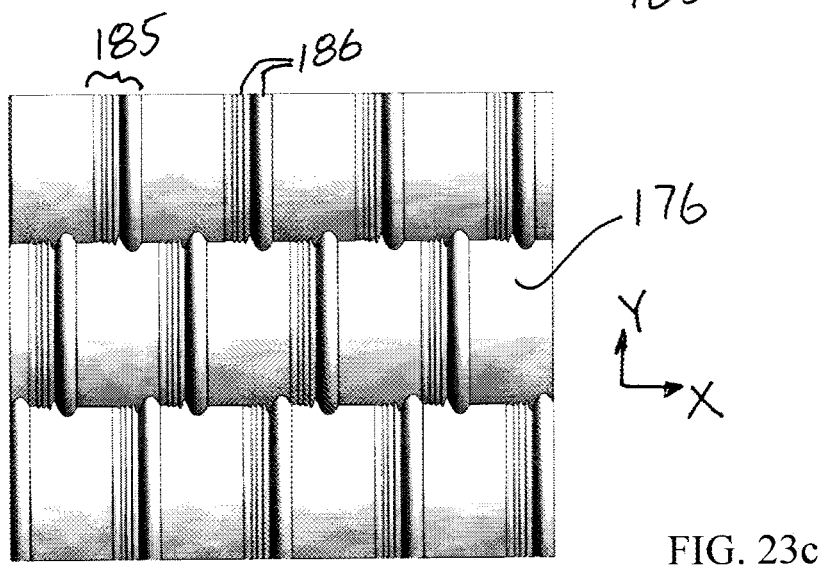

FIGS. 23a to 23c illustrate still another embodiment of structured lenticular surface having ripples 185 resembling a series of adjoining knots 186 on the structure lenticular light input surface 172 of the optical substrate 170, as compared to the previous embodiment shown in FIG. 22.

Other than the ripples 185, the remaining structure of the optical substrate 170 may be similar to those in the optical substrate 70 in the FIG. 22 embodiment. In particular, the shallow-curved convex lenses 176 are provided with isolated predefined ripples 185 in the form of a series of knots 186 distributed in the x-direction, along the otherwise continuous, uniform lenticular lenses 176. In this embodiment, the series of knots 186 form ripples 185 on the otherwise uniform longitudinal lenticular lenses 176, including connected knots 186 of different widths and/or thicknesses/heights (viewed in a sectional view in the x-z plane). There may be a series of two to tens of knots in each ripple 185. The distance between isolated ripples 185 (series of knots 186) along a lenticular lens may be several micrometers to thousands of micrometers. The ripples 185 on the structured lenticular surface 172 scatter light in the longitudinal x direction parallel to the longitudinal lenticular lenses 176, and the shallow-curved lenticular lenses can scatter light in the lateral y direction perpendicular to longitudinal lenticular lenses 176, so the shallow-curved lens structure with pre-defined rippled surface can improve diffusion effect as compared to the earlier embodiment of FIG. 6a, for example. Accordingly, the ripples 185 contribute to diffusion and also reduce certain undesirable optical defects such as cutoff-effect (rainbow), Newton's rings, and interference fringes.

As shown in the embodiment of FIG. 23, the knots 186 in each ripple 185 (i.e., a series of knots) are not at the same height. As more clearly shown in FIG. 23b, the ripples 185 of each lenticular lens 176 have heights varying along a sine curve or any other defined curve, or a curve varying in a randomed/pseudo-randomed manner. However, some or all the knots in a ripple can be of the same height. Further, some or all of the ripples may be similar or different viewed in x-z section (i.e. viewed in FIG. 23b).

It is well within the scope and spirit of the present invention to provide ripples on the other embodiments of lenticular structures disclosed herein, to improve diffusion characteristics.

Experimental Results

Figure 24A:
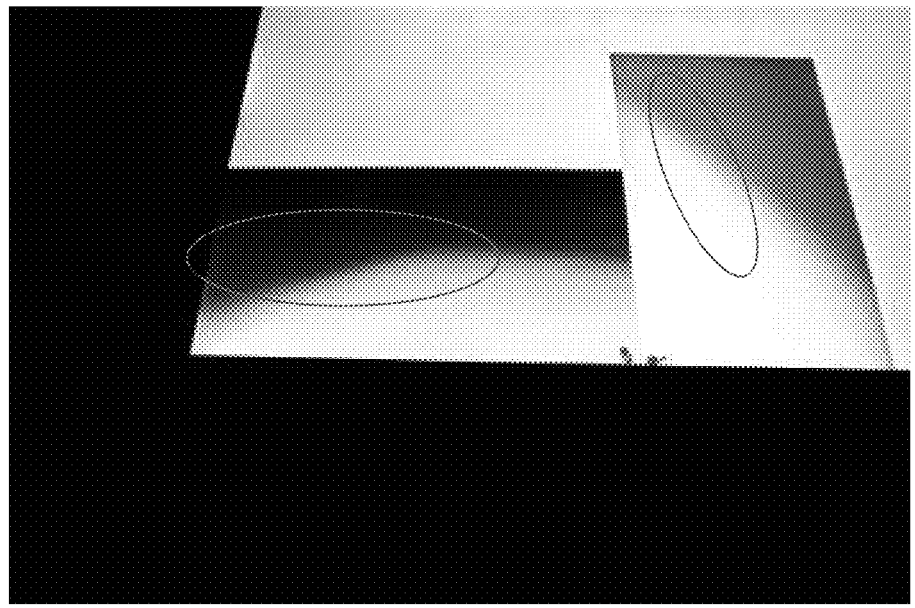
FIGS. 24a and 24b are photographs of optical substrates comparing cutoff effect.
Figure 24B:
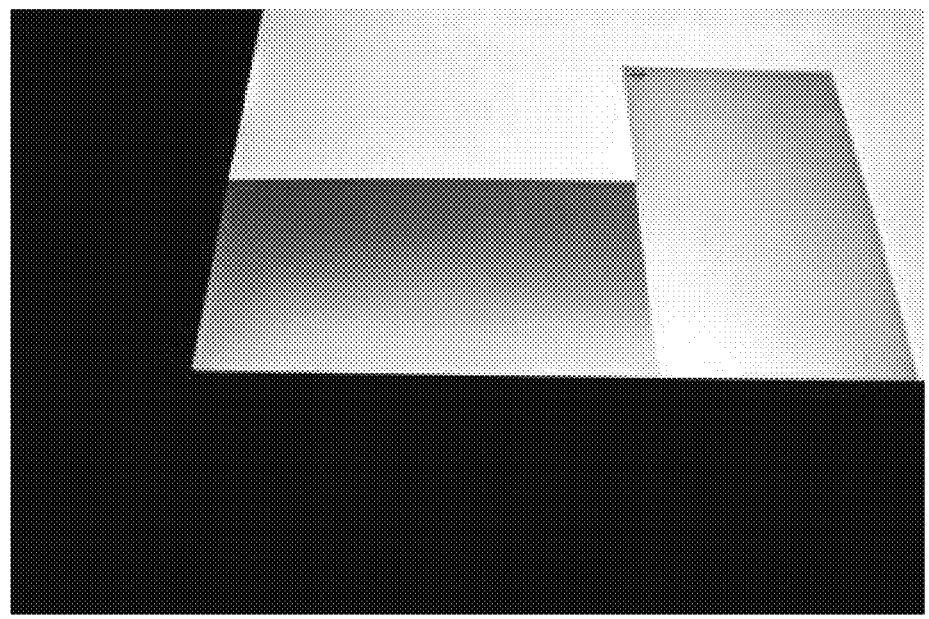

The effects, namely cutoff effect (rainbow) achieved by knotted lenticular lens structure as light input surface may be judged by the naked eye. FIG. 24a is a photograph showing visual perception of two optical substrates at certain view angle, each having only structured prismatic output surface (no structured lenticular light input surface), on a back light (e.g., a light guide and a bottom diffuser) background. FIG. 24b is a photograph showing visual perception of two optical substrates at certain view angle, each having a light input surface having a rippled lenticular lens structure and a light output surface having a prismatic structure, on a back light. Comparing FIG. 24a to FIG. 24b, the transitions (circled area) between perceived darkness and brightness exhibit a sharper cutoff, which is accompanied by a rainbow at the transitions in FIG. 24a, but the transitions between perceived darkness and brightness are more gradual without any obvious rainbow in FIG. 24b. According to these results, it is clear that the shallow-curved lens structure with pre-defined knots can effectively reduce rainbow.

Given the ability for the shallow-curved lens structure with pre-defined knots to provide better diffusion effects, there would be more parameters to control diffusion over a two dimensional plane (i.e., across the x-y plane) of the optical substrate. The diffusion characteristics in the x direct of the optical substrate may be varied by selecting the height and density of the knots. The diffusion characteristics in the y-direction may be varied by selecting the curvature radius, and subtended angle θ of the shallow-curved lens. Accordingly, optical substrates can be designed to provide the appropriate gain and haze for different backlit modules to achieve the desired display quality in different LCD applications. Further examples of underside lenticular surface to provide desired diffusion characteristics are discussed below.

In another aspect of the present invention, the primary objective of the invention is to provide a brightness enhancement film having a structured underside surface, which replaces the glossy underside surface to effectively prevent the absorption (wet-out) between the underside of the film and the surface of optical elements in contact with it. A further objective of the invention is to provide a brightness enhancement film having the characteristic of improved brightness enhancement effect.

FIGS. 27 to 31 illustrate embodiments of brightness enhancement films having a structured prismatic surface provided on one major surface and a structured lenticular surface provided on an opposite major surface of a substrate, wherein the included angle α between the longitudinal axes of the prisms and the lenticular lenses is substantially 0°, as noted earlier above. Further, in this Referring to FIG. 27, as in the previous embodiments, the lenticular surface has a structure comprising a plurality of convex curved surfaces, each being a cylindrical surface formed with a large radius to render the lenticular surface close to a flat surface, but with surface features having a slight convex curvature.

Figure 27:
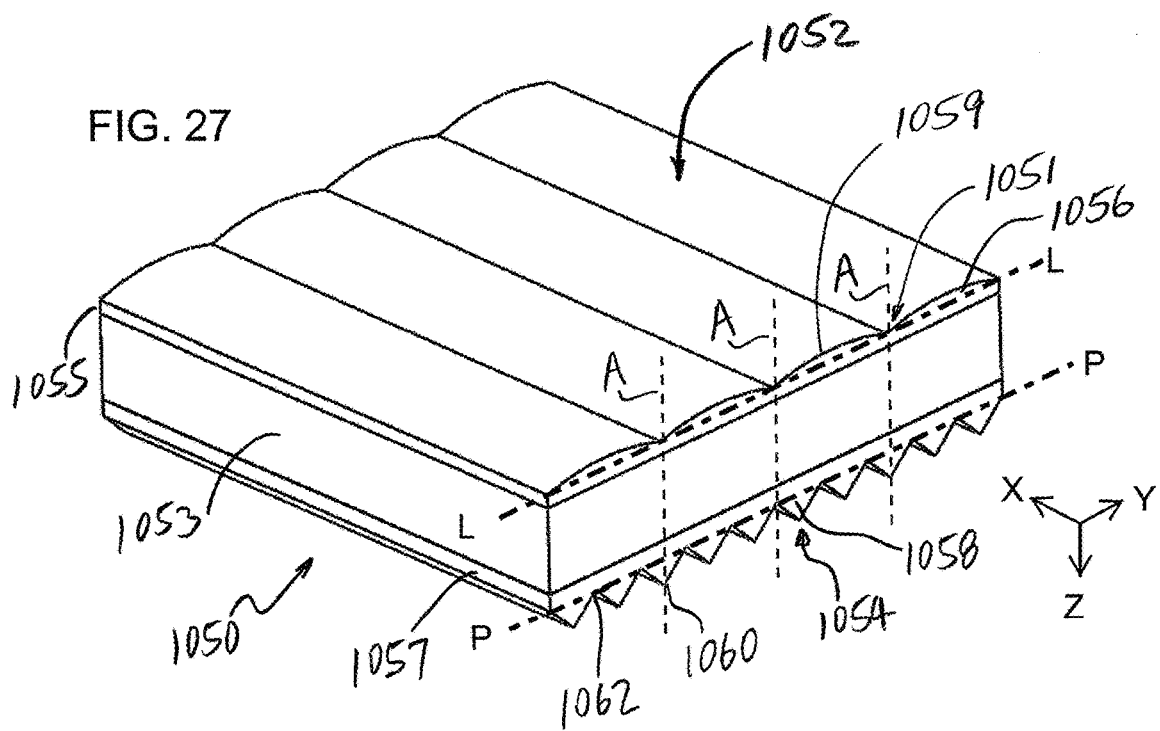
FIG. 27 is a schematic underside perspective view of a brightness enhancement film, in accordance with a further embodiment of the present invention.
Figure 28:
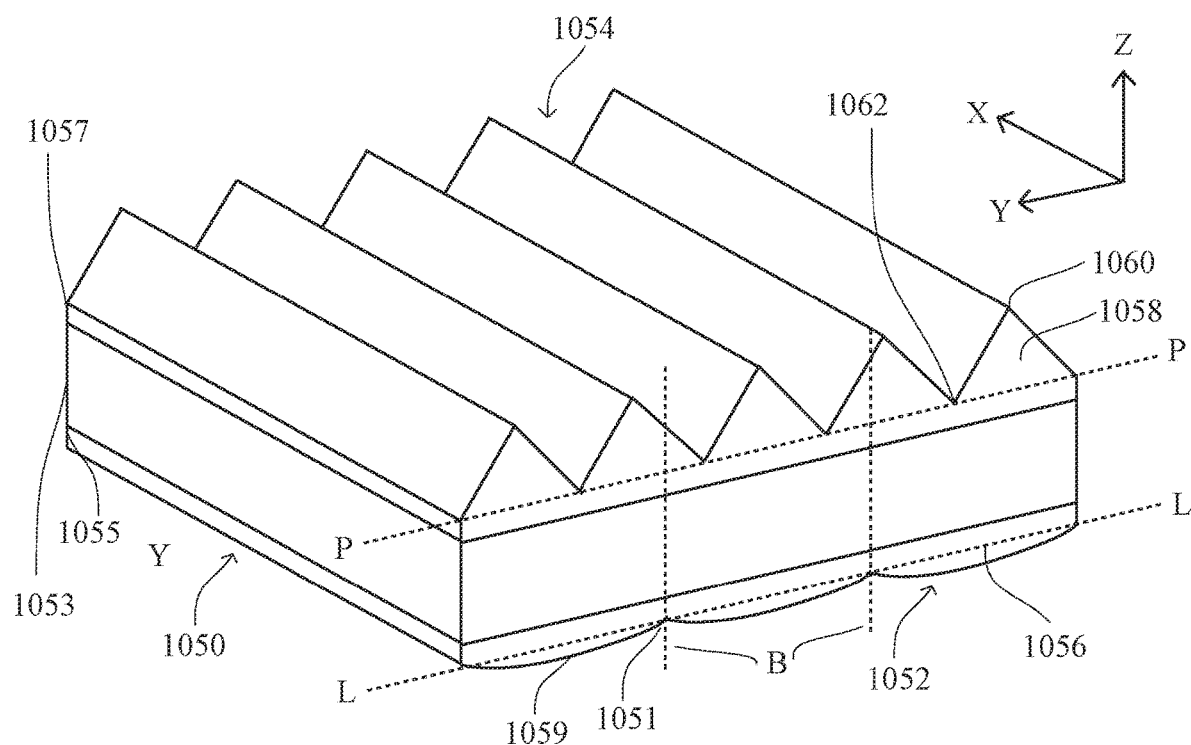
FIG. 28. is a schematic top perspective view of a variation of the brightness enhancement film of FIG. 27, in accordance with a further embodiment of the present invention.

FIG. 27 illustrates the structure of an optical substrate that functions well as a brightness enhancement film, which combines prismatic and lenticular structures on opposing sides of the substrate, in accordance with one embodiment of the present invention, which can be used as the structured optical substrate 126 and/or 128 in the LCD 110 in FIG. 5, instead of embodiments of the optical substrates discussed above. Generally, the optical substrate 1050 has a structured lenticular surface 1052 and a structured prismatic surface 1054. In this illustrated embodiment, the structured prismatic surface 1054 is a light output surface and the structured lenticular surface 1052 is a light input surface. FIG. 28 illustrates a variation of the structure shown in FIG. 27, in that there are less prisms that corresponds to the width of a lenticular lens. Otherwise, the structures of FIG. 27 and FIG. 28 are quite similar, as described below. The relationship of the number of prims corresponding to the width of a lenticular lens will be discussed later below.

Adopting the same coordinate system, for the embodiment shown in FIG. 27, given the parallel relationship of the lenticular lenses and the prisms, the y-axis is in the direction across the peaks 1060 and valleys 1062, also referred to as the lateral or transverse direction of the prisms 1058. The x-axis is orthogonal to the y-axis, in a generally longitudinal axis or direction of the prisms 1058. The longitudinal direction of prisms 1058 would be in reference to the general direction in which the peaks 1060 proceed from one end to another end of the prisms 1058. The prismatic surface 1054 lies in an x-y plane. For a rectangular piece of the optical substrate, the x and y-axes would be along the orthogonal edges of the substrate 1050. The z-axis is orthogonal to the x and y-axes (and the x-y plane). The edge showing the ends of the laterally arranged rows of prisms 1058 lies in the y-z plane, such as shown in FIG. 27, which also represents a sectional view in the y-z plane. The prisms 1058 each has a constant sectional profile in the y-z plane. References to cross sections of prisms 1058 would be sections taken in y-z planes, at various locations along the x-axis. Further, references to a horizontal direction would be in an x-y plane, and references to a vertical direction would be along the z-direction.

The prismatic surface 1054 includes parallel rows of contiguous or continuous longitudinal prisms 1058 of similar peak pitch and width (i.e., the width of the widest section or base of a prism), protruding at the light output surface (e.g., from a common base plane P-P shown in FIGS. 27 and 28, where the valleys 1062 lie) and extending between two opposing edges of the substrate 1050. The structure of the prisms 1058 is similar to the prisms in the earlier embodiments, and further disclosed above. However, in the current embodiment, the included angle between the axes of the prisms 1058 and the lenticular lenses 1056 is 0 degree. That is, the longitudinal axes of the prisms 1058 and the lenticular lenses are parallel. Specifically, in the embodiment of FIG. 27 the rows of longitudinal prisms 1058 are arranged in parallel laterally (side-by-side), defining parallel peaks 1060 and valleys 1062. The sectional profile of the peak 1060 is symmetrical about peak in this embodiment (viewed in the y-z plane). As in the earlier embodiments, the peak vertex angle may be right angled, and the peaks are of constant or similar height and/or the valleys are of constant or similar depth, across the plane of the prismatic surface 1054. The distance or pitch between adjacent peaks/valleys is constant in the illustrated embodiment of FIG. 27.

The lenticular structured surface 1052 is quite similar to the lenticular structured surface 52 discussed in connection with the embodiment of FIG. 6a, except the radius of curvature of the shallow-curved lens structure (e.g., a convex or concave lens structure, or a combination of convex and concave) in this embodiment is quite large in comparison to the widths of the lenticular lenses 1056 and prisms 1058. Particularly, as in the earlier described embodiments, the lenticular structured surface 1052 includes parallel, contiguous or continuous rows of lenticular lenses 1056 of similar width and/or pitch of crowns 1059), each protruding at the light input surface (e.g., from a common base plane L-L shown in FIGS. 27 and 28, where the valleys 1051 lie; see also distance a-b shown in FIG. 29) and extending in the x-direction continuously between two opposing edges of the substrate 1050. The curved surfaces of adjacent lenticular lenses intersect, defining parallel grooves or valleys 1051 and crowns 1059. For the lenticular lenses 1056, the y-axis is in the direction across the grooves or valleys 1051 and crowns 1059, also referred to as the lateral or transverse direction of the lenticular lenses 1056. The x-axis represents the longitudinal axis or direction of the lenticular lenses 1056. The longitudinal direction of lenticular lenses would be in reference to the general direction in which the crowns 1059 proceed from one end to another end of the lenticular lenses 1056. The edge showing the ends of the laterally arranged rows of lenticular lenses 1056 lies in the y-z plane, such as shown in FIG. 27, which also represents a sectional view in the y-z plane. The lenticular lenses 1056 each has a constant sectional profile in the y-z plane. References to cross sections of lenticular lenses 1056 would be sections taken in y-z planes, at various locations along the x-axis. Further, references to a horizontal direction would be in an x-y plane, and references to a vertical direction would be along the z-direction.

As in the earlier embodiments, in the illustrated embodiment of FIG. 27, the structured prismatic surface 1054 and the structured lenticular surface 1052 are generally parallel to each other in the overall optical substrate structure (i.e., do not form an overall substrate structure that is generally tapered like a light guide plate in a backlight module, or that is concave or convex). The prisms 1058 and the lenticular lenses 1056 on opposite major surfaces of the brightness enhancement film 1050 are horizontally staggered across the film. In the illustrated embodiments of FIGS. 27 and 28, the pitch or the centerline spacing of the lenticular lenses 1056 at the lenticular surface 1052 is not the same as (in the illustrated embodiment, is significantly greater than) the pitch or centerline spacing of the prisms 1058 at the prismatic surface 1054. Further, in the illustrated embodiments of FIGS. 27 and 28, the width (i.e., the width of the base, or base width) of the lenticular lenses 1056 along the base plane L-L and the width (i.e., the width of the base, or base width) of the triangular prisms 1058 along a base plane P-P are not the same. Alternatively, the peak-to-peak distance between adjacent prism peaks are not the same as the crown-to-crown distance between adjacent lenticular lens crowns. In the embodiment of FIGS. 27 and 28, in the lateral y-direction, the lenticular lenses 1056 and the prisms 1058 are not aligned in a one-to-one (i.e., one prism, one lenticular lens) relationship. For example, in the illustrated embodiment of FIG. 27, the width of about ten prisms 1058 corresponds to the width of about four lenticular lenses 1056 (i.e., the width of about 2.5 prisms 1058 corresponds to the width of one lenticular lens 1056; see, vertical lines A perpendicular to the major surface of the support base layer 1053 in FIG. 27). In the illustrated embodiment of FIG. 28, the width of about five prisms 1058 corresponds to the width of about three lenticular lenses 1056 (i.e., the width of about 1.67 prisms 1058 corresponds to the width of one lenticular lens 1056; see, lines B perpendicular to the major surface of the base layer 1053 in FIG. 28). In other words, the ratio of the width of the lenticular lens 1056 to the width of the prisms 1058 is about 1.67 and 2.5 in the illustrated embodiments. Most (substantially all) of the valleys 1062 of the prisms 1058 are not vertically aligned with the valleys 1051 of the lenticular lenses 1056 across the base layer 1053, with the exception at the two lateral ends (in y-direction) in FIGS. 27 and 28. In addition, most (or substantially all) of the peaks 1060 of the prisms 1058 are not vertically aligned with the crowns 1059 of the lenticular lenses 1056 across the base layer 1053 (or the brightness enhancement film 1050) (for the portion of the brightness enhancement film 1050 shown in FIGS. 27 and 28, no vertical alignment of the crowns 1059 and peaks 1060). Furthermore, while some of the valleys and/or peaks of the prisms 1058 and some of the valleys and/or crowns of the lenticular lenses 1056 are vertically aligned (e.g., at the two lateral ends (in y-direction) in FIGS. 27 and 28), given the pitch of the peaks of the prisms 1058 is different from the pitch of the crowns of the lenticular lenses 1056, no two adjacent (i.e., a pair of) prisms 1058 are vertically aligned with no adjacent (i.e., a pair of) lenticular lenses 1056, as clearly shown in FIGS. 27 and 28 (i.e., not in a one pair-to-one pair relationship).

Other than these specific illustrated examples, the ratios of the width and/or pitch of the lenticular lens and prism may range from ratio=0.1 to 10, or 0.2 to 4, or 1 to 4, or 1.67 to 2.5. While the illustrated embodiments shown have the width/pitch of the lenticular lenses greater than the width of the prisms, it is contemplated that the width/pitch of the lenticular lenses may be less than or equal the width/pitch of the prisms without departing from the scope and spirit of the present invention.

Figure 32:
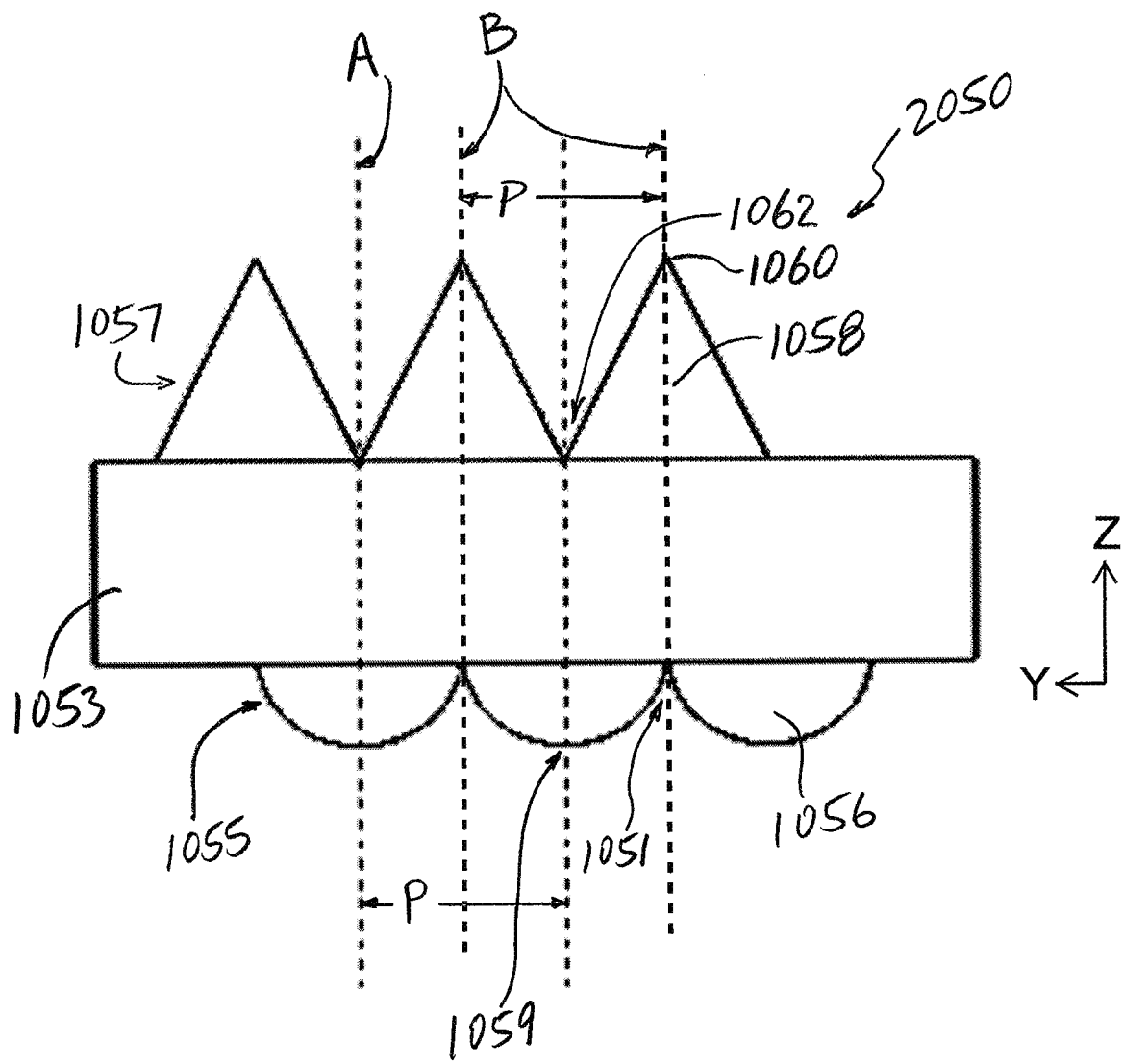
FIG. 32 is a schematic sectional view of a brightness enhancement film, in accordance with another embodiment of the present invention, illustrating a staggered relationship between the prims and lenticular lenses
Figure 33:
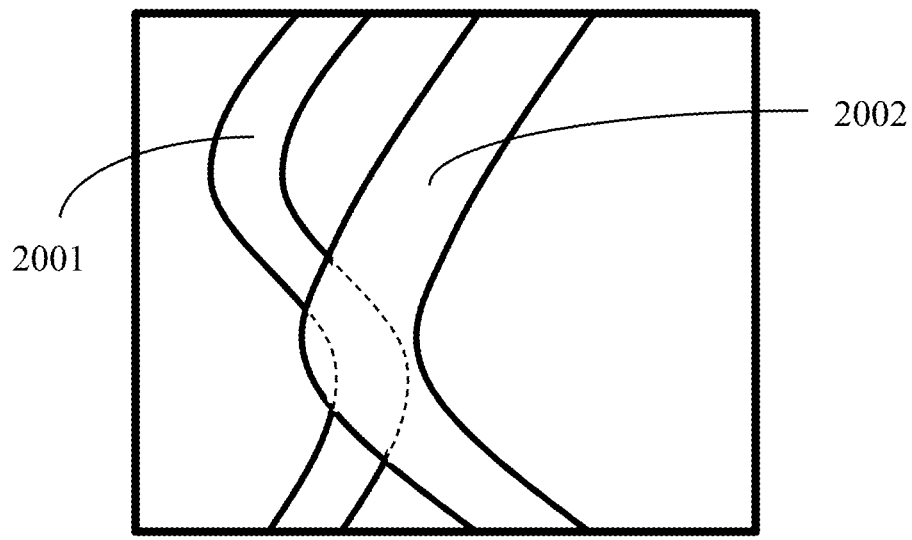
FIG. 33 to FIG. 37 illustrate a top view of a portion of trenches formed on the surface of the mold in various embodiments of the present invention, wherein opposing edges of each trench is shown for convenience.
Figure 34:
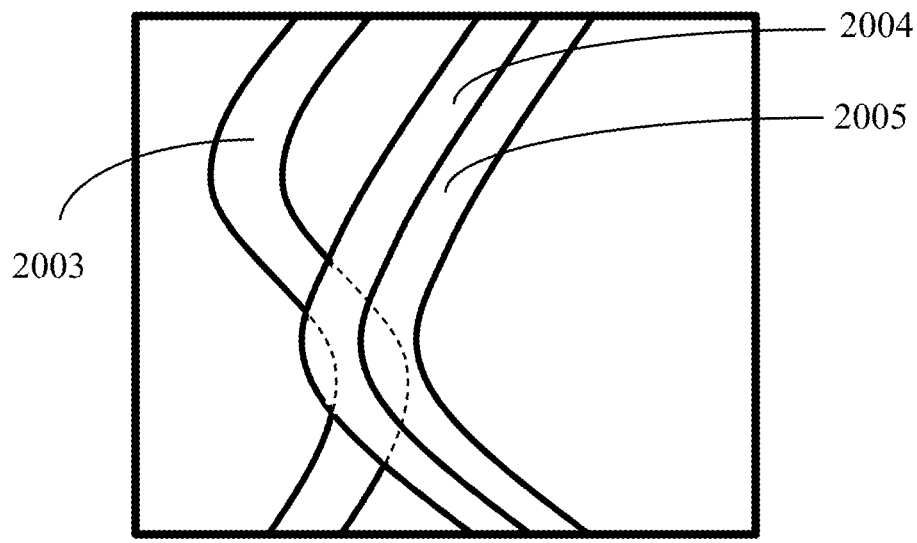
Figure 35:
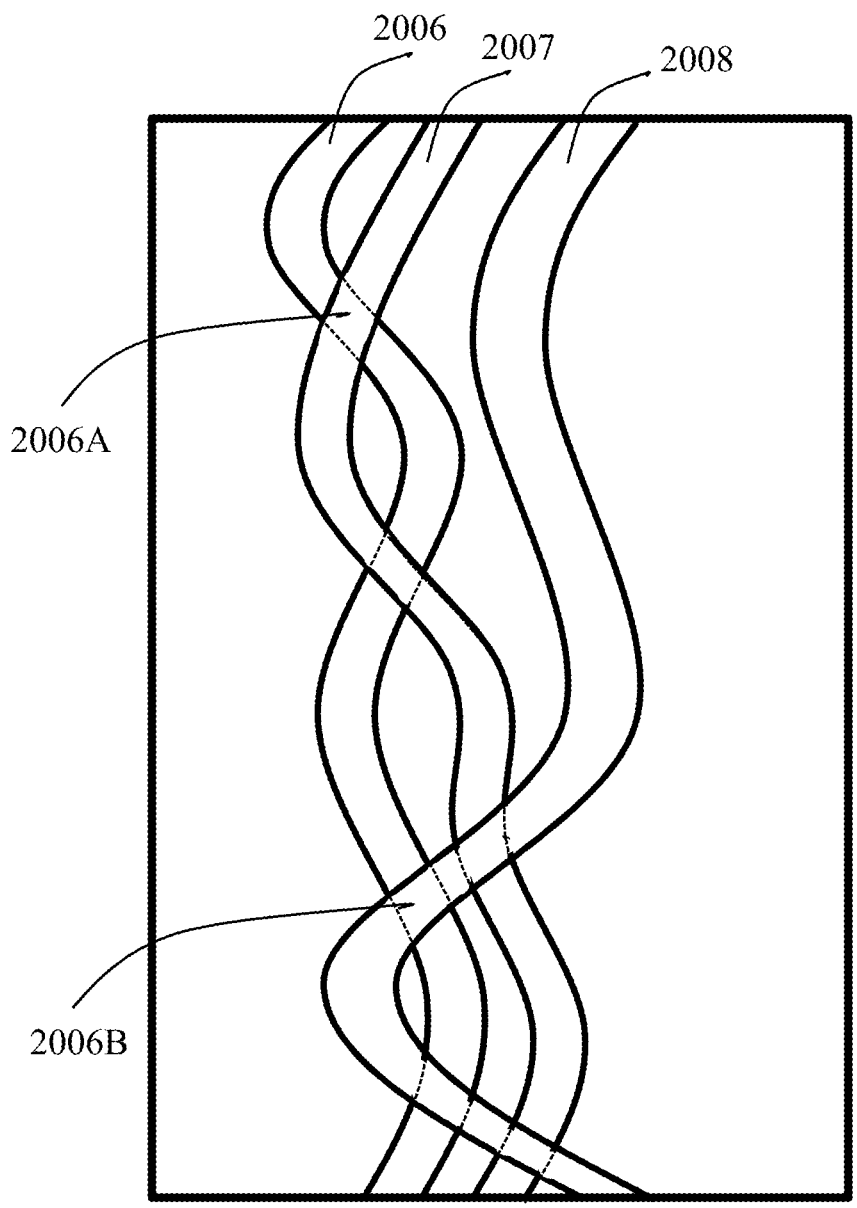
Figure 36:
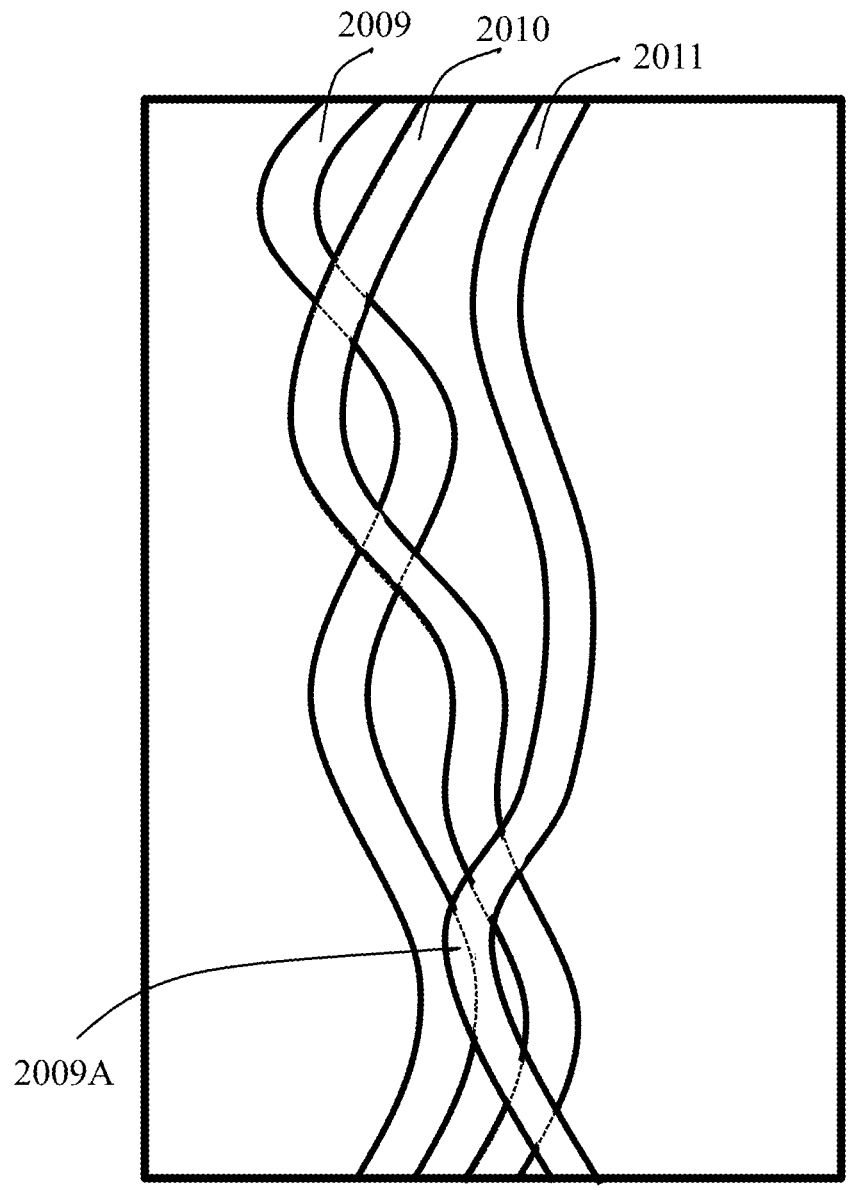
Figure 37:
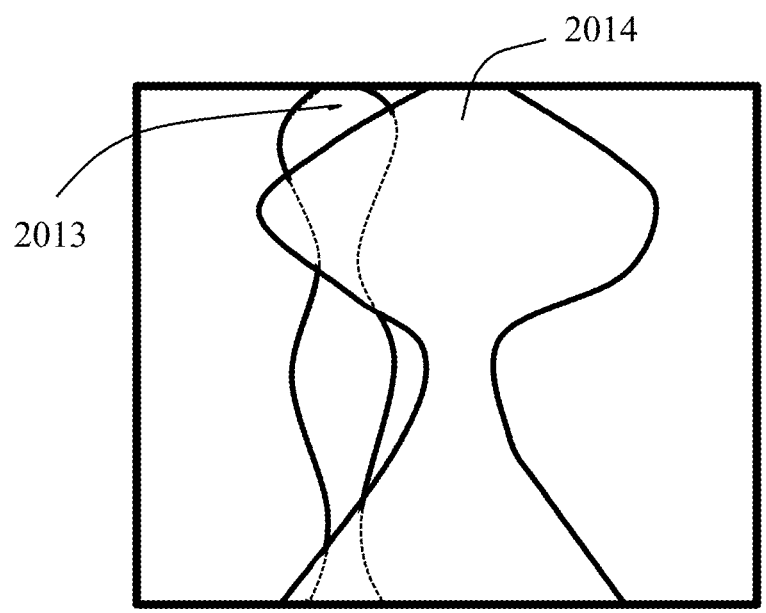

In the alternate embodiment of a brightness enhancement film 2050 shown in FIG. 32, the pitch P of the peaks 1060 (or the width) of the prisms 1058 is equal to the pitch P of the crowns 1059 (or the width) of the lenticular lens 1056. However, the prisms 1058 and the lenticular lenses 1056 are horizontally staggered (e.g., offset) in the y-direction. In the illustrated embodiment of FIG. 32, adjacent prisms 1058 and adjacent lenticular lenses 1056 do not overlap or intersect, and the width of the prisms 1058 and peak pitch P are similar, and the width and crown pitch P of the lenticular lenses 1056 are similar. As illustrated in the embodiment of FIG. 32, the valleys 1062 of adjacent prisms 1058 are vertically aligned with the crowns of the lenticular lens 1056 along line A perpendicular to the surface of the base layer 1053, and the peaks of the prisms 1058 and the valleys of the lenticular lenses 1056 are aligned along line B perpendicular to the surface of base layer 1053). Other than as illustrated in the embodiment of FIG. 32, the horizontal staggered relationship may be such that the prisms 1058 and the lenticular lenses 1056 are staggered, with the peaks 1060 and valleys 1051 and the crowns 1059 and valleys 1062 substantially not vertically aligned. It is contemplated that adjacent prisms 1058 and adjacent lenticular lenses 1056 can overlap or intersect, and/or the widths of the prisms 1058 may be different, and/or the widths of the lenticular lenses 1056 may be different, but with the prisms 1058 and the lenticular lenses horizontally staggered (with the most of the peaks 1060 and valleys 1051 and most of the crowns 1059 and valleys 1062 substantially not vertically aligned). In particular, no two adjacent prisms 1058 are vertically aligned with two adjacent lenticular lenses 1056, similar to the embodiments of FIGS. 27 and 28.

As noted elsewhere in this disclosure, the radius of curvature (r in FIG. 29) of the lenticular lens structure is large, so as to render the underside surface of the brightness enhancement film close to a flat surface, but with surface features having a slight convex curvature. As a result of the larger width and/or pitch/centerline spacing and large radius of curvature of the lenticular lenses compared to the prisms, and/or the horizontally staggered relationship between the prisms and the lenticular lenses, the moiré interference pattern between the prismatic surface and the opposite lenticular surface are significantly reduced to a minimum.

Figure 30:
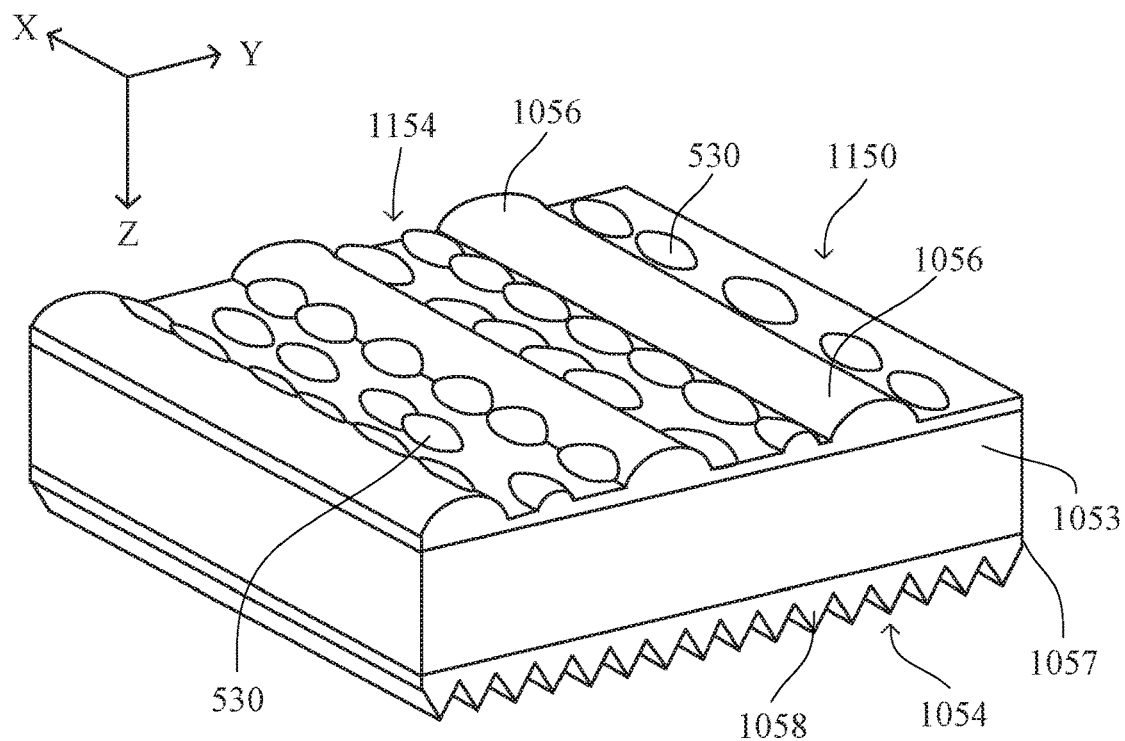
FIG. 30 is a schematic underside perspective view of a brightness enhancement film, in accordance with a further embodiment of the present invention.
Figure 31:
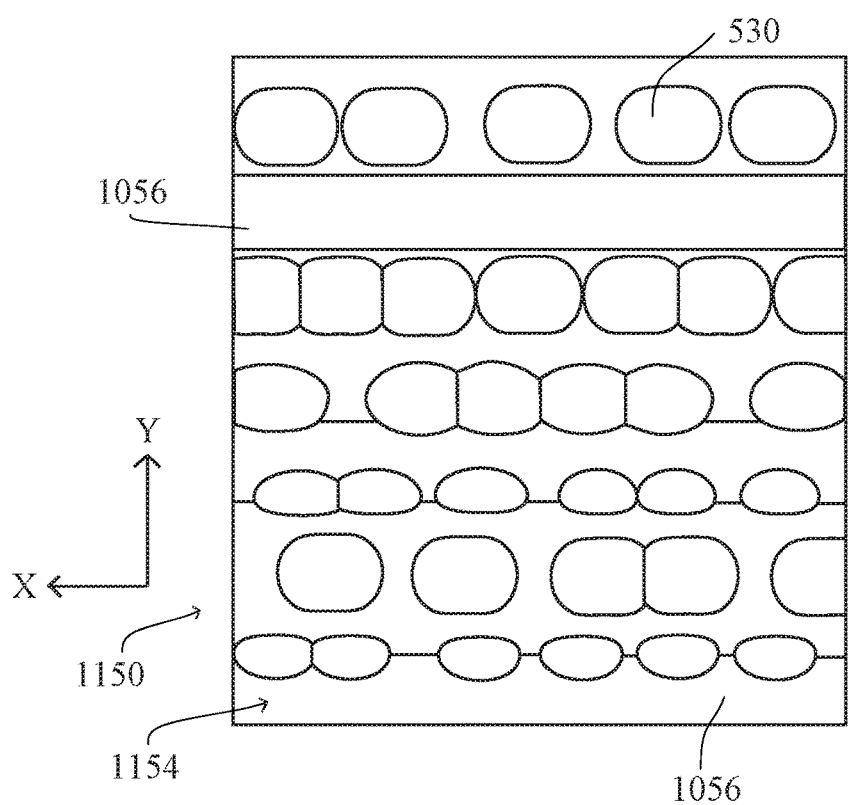
FIG. 31 is a schematic top view of the lenticular surface structure of the brightness enhancement film of FIG. 30.

In the illustrated embodiments of FIGS. 30-32, the optical substrate 1050 comprises three separate layers, including a first structured layer 1057 bearing the prismatic surface of prisms 1058, a second structured layer 1055 bearing the lenticular surface of lenticular lenses 1056, and an intermediate planar base layer 1053 supporting the layers 1055 and 1057. The two structured layers 1055 and 1057 are adhered to opposite surfaces of the base layer 1053 to form the overall optical substrate 1050. It can be appreciated that the optical substrate may be formed from a single integrated physical layer of material, instead of three separate physical layers, without departing from the scope and spirit of the present invention. The optical substrate 1050 may be a unitary or monolithic body, including a base portion bearing the surface structures of prisms and lenticular lenses on opposite surfaces.

In a sectional view taken along the y-z plane, adjacent triangular prisms 1058 lean next to each other defining a contiguous or continuous prismatic structured surface 1054, while adjacent lenticular lenses 1056 also lean next to each other defining a contiguous or continuous lenticular structured surface 1052. The lenticular structured surface 1052 contributes to diffusion function and reduces certain undesired optical defects such as wet-out, Newton's rings, and interference fringes. However, given the large radius of curvature of the lenticular surface 1052, with the lenticular surface being close to a planar surface, the diffusion function is significantly less, compared to the earlier described embodiments. The lenticular surface structures therefore have very little or minimal light diffusion characteristics, so that overall brightness of the light transmitted through the lenticular surface would not be reduced by the lenticular surface. By using low refractive index resin material for the structure that defines the lenticular surface features, the overall brightness of LCD can be further increased effectively. Nevertheless, with even a shallow or thin lenticular surface structure, the brightness enhancement film having the lenticular surface performs well in reducing certain undesired optical defects such as wet-out, Newton's rings, and interference fringes. It also reduces the moiré interference pattern between the structured prismatic surface and the opposite lenticular structured surface.

In the illustrated embodiment, the lenticular layer 1055 and the prism layer 1057 may be made of the same or different material, and the base layer 1053 may be made of a same or different material. The lenticular layer 1055 and the prism layer 1057 may be formed using an optically transparent material, preferably a polymerizable resin, such an ultraviolet or visible radiation-curable resin, such as UV curable adhesive. Generally, the structured prismatic and lenticular surfaces 1056 and 1058 are formed by applying a coatable composition comprising a polymerizable and cross-linkable resin onto a master mold or master drum and undergoing a hardening process. For example, the prismatic and lenticular structures are formed on the base layer 1053 by die assemblies, press rolling machines, mold pressing assemblies or other equivalent apparatuses. The base layer 53 may be made of a transparent material, such as polyethylene-terephthalate (PET), polyethylene (PE), polyethylene napthalate (PEN), polycarbonate (PC), polyvinyl alcohol (PVA), or polyvinyl chloride (PVC). The base layer 1053 may instead be made from the same transparent material as the structured layers 1055 and 1057. The base layer 1053 provides the necessary thickness to provide structural integrity to the final film of optical substrate 1050.

It is another objective of the invention is to provide a brightness enhancement film having the characteristics of reduced distortion and/or warpage. By controlling the shrinkage rate of the resin material used for the structure (e.g., a layer of material) that defines the prismatic surface features to be substantially similar or approximately to the shrinkage rate of the resin material used for the structure (e.g., a layer of material) that defines the lenticular surface features, the two structured surfaces of the brightness enhancement film can reduce distortion or warpage of the film.

In another embodiment, as noted above, the prismatic structured surface 1054 can be integrally-formed by molding, pressing, embossing, calendaring or extrusion onto the transparent base film, while the structured lenticular surface 1052 is manufactured separately on to the transparent base layer 1053 by UV curing with resin.

Further discussions of processes for forming a substrate having structured surfaces may be referenced to U.S. Pat. No. 7,618,164, which had been incorporated by reference herein.

In still another embodiment, the structured lenticular surface 1052 can be integrally-formed by molding, pressing, embossing, calendaring or extrusion onto the transparent base layer 1053, while the prismatic structured surface 1054 is manufactured separately on to the transparent base layer 1053 by UV curing with resin.

In a further embodiment, the prismatic structured surface 1054 may be formed integrally or separately onto a base film, while the structured lenticular surface may also be formed integrally or separately onto another base film. The two base films is combined back to back by simply stacking or applying adhesives such as pressure sensitive adhesive (PSA) to the films to form a structure equivalent to the base layer 1053. It is apparent that many techniques and combinations of manufacture methods may be applied to obtain the combination of the structured prismatic surface, the structured lenticular surface and the base layer, or equivalent thereof.

Figure 29:
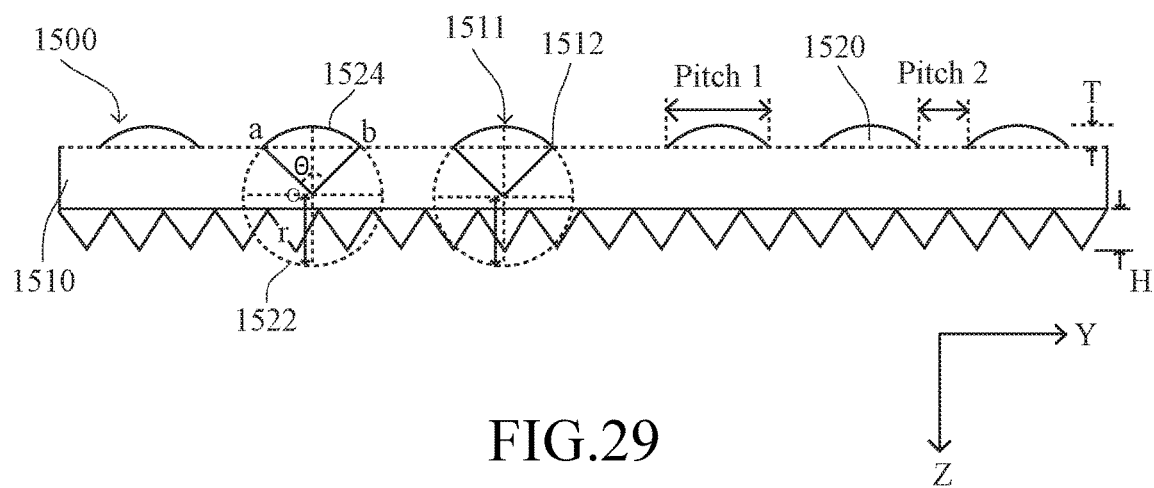
FIG. 29 is a schematic sectional view illustrating the parallel relationship of the lenticular surface structure and the prismatic surface structure.

FIG. 29 is a schematic sectional view of an optical substrate 1500 viewed in the y-z plane, for purpose of understanding the geometry of the lenticular surface of a brightness enhancement film as disclosed above with respect to FIG. 27. The optical substrate 1500 includes a base layer 1510 and a plurality of lenticular lens 1520 having convex curved surfaces 1524 formed on the top surface of the base layer 1510, and longitudinal prisms 1512 (similar to the prisms 1058 in FIG. 27) formed on the bottom surface of the base layer 1510. The surface 1524 of each of the lenticular lenses 1520 corresponds substantially to a section of the surface of a circular cylinders 1522 having a radius "r" with center "O" in cross-section, which surface section corresponds to a subtended angle θ, and a subtended arc between point "a" and "b" in cross-section. In the sectional view shown in FIG. 29, the lens 1520 corresponds to a segment of the circle 1522, which is bounded by the chord a-b and the arc a-b. As schematically shown in FIG. 29, adjacent arcuate surfaces 1524 of lenticular lenses 1520 do not contact one another to form a contiguous or continuous lens surface, as compared to FIG. 27, just to illustrate that the Pitch 2 could vary over a range, including 0 (i.e., adjacent lenticular lenses 1524 join or are touching or contiguous with no flat space or flat groove therebetween). In this embodiment, the surface 1524 of each lens 1520 "bottoms" onto the top of the base layer 1510, with a flat spacing between adjacent lenses. In this embodiment, the lens width pitch 1 is the same for the discontinuous lenses 1520. The spacing pitch 2 may be the same or different between adjacent discontinuous lenses.

In a preferred embodiment, the subtended angle θ of the protruded arc of the lenticular lens is in the range of greater than 0 to 160 degrees, or 0.5 degree to 90 degrees, or 1 degree to 65 degrees, or preferably in the range of 1.5 degrees to 7 degrees. Pitch 2 is preferably 0 μm (or substantially 0 μm, or nearly 0 μm) (i.e., there is substantially no flat space or flat groove between adjacent lenticular lenses). Distance between crown 1511 and groove 1512 is 0.01 μm to 35 μm (or half of pitch 1, or half the distance between point a to point b for lenticular lens 1524 shown in FIG. 29).

In a preferred embodiment, the vertex angle of prisms 1512 is in the range of 70 degrees to 110 degrees, more preferably in the range of 80 degrees to 100 degrees. In another preferred embodiment, the vertical height (H) of the prism units is in the range of 10 μm to 100 μm, more preferably in the range of 20 μm to 75 μm. Alternatively, the prism units may or may not have the same vertical heights. In another preferred embodiment, the horizontal pitch of the prisms 1512 is in the range of 10 μm to 250 μm, more preferably in the range of 15 μm to 80 μm.

The lenticular surface may have the variations similar to the embodiments illustrated in FIGS. 9 to 12. That is, the distance pitch 2 between two discontinuous lenticular lenses is non-zero, which may be the same or variable or different across the section, and/or the vertical height (T) of the lenticular lenses is variable. Further, the radius of curvature of different lenticular lenses may also vary and/or different lenticular surfaces may conform to cylinders of different cross-sections other than a circle (e.g., an ellipse or other cross-sections of regular or irregular geometries) and further of varying sizes. Longitudinal lenticular structures having a uniform cross-section defining other convex curve surface profiles are also contemplated (e.g., same profile or different profiles for different lenticular lenses). Some of the adjacent lenticular lenses intersect or partially overlap each other, thus defining a contiguous or continuous lenticular structured surface with some of the lenticular lenses having an asymmetrical cross-section (as viewed in the y-z plane shown in FIG. 29). Further, the longitudinal lenticular lenses may swing laterally (in the y-direction), similar to the embodiments of FIGS. 13a, 13b, 14a and 14b, along the longitudinal direction (x-direction) of the lenses, in the form of rows of laterally meandering longitudinal lenticular lenses and/or sections of continuous curved segments (i.e., sections with a curve in a particular direction, or generally C-shaped or S-shaped curve sections) coupled end-to-end to form the overall meandering longitudinal lenticular lens structure. In one embodiment, the laterally meandering rows of longitudinal lenticular structures are arranged in parallel laterally (side-by-side in the y-direction). In one embodiment, the lateral waviness is regular with a constant or variable wavelength and/or wave amplitude (or extent of lateral deformation). The lateral waviness may generally follow a sinusoidal profile, or other curved profile. In another embodiment, the lateral waviness may be of random wavelength and/or wave amplitude. In one embodiment, the vertical height, curvature, surface profile, and/or width of the lenticular lenses respectively may be the same for adjacent lenses across a particular cross-sectional plane, and may be constant or varying for different cross-sectional plane along the longitudinal x-direction. Some of the adjacent laterally meandering lenticular lenses intersect or partially overlap each other, thus defining a contiguous or continuous lenticular surface at some locations along the length of each lenticular lens. Those adjacent lenticular lenses that intersect would have an asymmetrical cross-section (as viewed in the y-z plane, similar to the structure shown in FIG. 14b; see also FIG. 12b). The lenticular lenses have the same height.

Further, adjacent lenticular lenses are separated by a spacing, and the height varies along the length of each lenticular lens in the x-direction, similar to the structure illustrated in FIGS. 15a and 15b. The height varies along a lens, the sectional surface profile varies in the x direction. The height variation may generally follow a sinusoidal profile, or other curved profile, in regular, constant, varying or random wavelength and/or wave amplitude. The width of the lenses (e.g., pitch 1 between point "a" to point "b" as shown in FIG. 29) is the same for adjacent lenses, and constant along each lens in the x-direction. In alternate embodiments, similar to FIGS. 15c to 15f, the width may also vary between adjacent lenses or along the x-direction for one or more of the lenses. The spacing (e.g., pitch 2 as shown in FIG. 29) between lenses may be constant across a section or may be varying across a section. Alternatively, the longitudinal lenticular lenses intersect or partially overlap each other, thus defining a contiguous or continuous lenticular structured surface on the optical substrate.

Essentially, the longitudinal lenticular lenses can combine any of the height varying feature and intersecting feature as disclosed in earlier embodiments, in combination with prismatic surface on opposite major surface of the brightness enhancement film, to achieve the objectives of a film having low diffusion characteristics, with minimum reduction of brightness, and preventing moiré pattern between the lenticular surface and the prismatic surface.

As a further example, FIGS. 30 and 31 illustrate a further embodiment of a brightness enhancement film 1150 having a structured lenticular surface 1154 defined with microstructures including lenticular lenses 1056 and lenticular segments 530. As more clearly shown in FIG. 31, the lenticular segments 530 are arranged in straight rows, in which the axis of the lenticular segments 530 is parallel to the axis of the longitudinal lenticular lenses 1056. One or more rows of lenticular segments 530 intersect or overlap with one or more adjacent lenticular lenses 1056. In addition or in the alternate, two or more of the lenticular segments 530 intersect or overlap along a row. In the illustrated embodiment, the height of the lenticular lenses 1056 is the same, and the height of the lenticular segments 530 is the same, with the height of the lenticular lenses 1056 different from the height of the lenticular segments 530. In an alternate embodiment, the two height of the lenticular lenses 1056 is same as the height of the lenticular segments 530. The structures and design considerations for the lenticular lenses 1056 and lenticular segments 530 can be similar to those discussed above in connection with the earlier embodiments.

Given the afore-described embodiments and experimental results, one can reasonably anticipate the effects of selecting and/or combining the different features of structured surfaces to reduce interference fringes and increase gain, without compromising acceptable diffusion, as well as achieve the other benefits of the present invention noted above.

In a further embodiment, the structured prismatic light output surface may include varying peak heights, and pre-defined structural irregularities distributed in the structure surface. The pre-defined irregularities introduced may be in-kind to anticipated structural defects arising from manufacturing, such as non-facet flat sections in the prism structure (e.g., at peaks or valleys) of the structured surface. The structural irregularities are distributed across the structured light output surface in at least one of orderly, semi-orderly, random, and quasi-random manner. The predefined irregularities introduced into the structured light output surface could mask certain user perceivable defects caused by structural defects that have been unintentionally included in the structured light output surface from the manufacturing process. Further reference to the defect masking effect of predefined structural irregularities may be made to U.S. Pat. No. 7,883,647, which had been commonly assigned to the assignee of the present application, and which is fully incorporated by reference herein.

In another embodiment, the structured prismatic light output surface may include, in the alternate or in addition, irregular prism structures, as disclosed in U.S. Pat. No. 7,618,164, which had been commonly assigned to the assignee of the present application, and which is fully incorporated by reference herein. In the alternate or in addition, the structured prismatic light output surface may include anti-chatter structures, as disclosed in U.S. Pat. No. 7,712,944, which had been commonly assigned to the assignee of the present application, and which is fully incorporated by reference herein. In the alternate or in addition, the structured prismatic light output surface may include rows of laterally arranged snaking, wavy or meandering longitudinal prism structures, as disclosed in U.S. patent application Ser. No. 12/854,815 filed on Aug. 11, 2010, which had been commonly assigned to the assignee of the present application, and which is fully incorporated by reference herein. In another embodiment, the structured prismatic light output surface may include, in the alternate or in addition, irregular prism structures, as disclosed in, which had been commonly assigned to the assignee of the present application, and which is fully incorporated by reference herein.

The present invention also discloses a method of forming an uneven structure on a substrate. The uneven structure can comprise a plurality of segments. The segments do not extend from an edge of the substrate to an opposite edge of the substrate described previously in FIG. 14c to FIG. 14f. For example, a segment can extend from an edge of the substrate to a point inside the surface area of the substrate or from a first point inside the surface area of the substrate to a second point inside the surface area of the substrate.

The substrate can be an optical substrate having a light input surface and a light output surface. In one embodiment, the uneven structure can be formed on the light input surface of the substrate; the uneven structure can comprise at least one of a lenticalur structure and a prismatic structure, preferably, the uneven structure is a lenticalur structure. In another embodiment, the uneven structure can be formed on the light output surface of the substrate; the uneven structure can comprise at least one of a lenticalur structure and a prismatic structure, preferably, the uneven structure is a prismatic structure.

The method includes two main steps. In step A: cut a plurality of trenches in an order on a surface of a mold through a control system, wherein the plurality of trenches comprise at least one first trench, wherein for any second trench of the at least one first trench, the second trench overlaps with at least one third trench different from the second trench such that the second trench is cut off by the at least one third trench. Preferably, use a hard tool to penetrate into the roll to cut a plurality of trenches in an order on a surface of a roll through a CNC (Computer Numeric Control) system, wherein each of the plurality of trenches is cut in a first direction, wherein when each of the plurality of trenches is cut, the hard tool is not pulled away from the roll (when the hard tool does not penetrate into the mold/roll, the mold/roll has a unstructured surface; however, when the hard tool penetrates into the mold/roll, the front end of the hard tool is kept below the unstructured surface until the trench is completely formed); it changes one-dimensional cylindrical structure to two-dimensional structure in the form of the annelid such that there exists no space adjacent two trenches so as to increase the diffusion of the optical film. Preferably, (the front end of) the hard tool has a lenticular shape (as illustrated in FIG. 8, the front end of the hard tool has an arc shape); comparing with the film embossed by the mold cut by the hard tool having a prismatic shape, the film embossed by the mold cut by the hard tool having a lenticular shape has a better diffusion performance. However, the hard tool of the present invention is not limited to have an arc shape, the hard tool having a smoothly-curved shape to get a better diffusion performance can be applied in the present invention. In one embodiment, a portion of the at least one first trench that is not cut off corresponds to a plurality of segments of the uneven structure. In step B: use the surface of the mold to emboss a thin film on the substrate to form the uneven structure.

Each trench is cut on a surface of a mold through a control system. Preferably, each trench is cut in a first direction (e.g., from an edge of the mold to an opposing edge of the mold or a tangential direction of a roll). U.S. Pat. No. 7,618,164 fully incorporated by reference herein has disclosed how to generate the structured surface of optical substrate in accordance with a number of process techniques, including micromachining using hard tools to form molds or the like.

The hard tools may be very small diamond tools mounted on CNC (Computer Numeric Control) system (e.g. turning, milling and ruling/shaping machines). Preferably, the control system is a CNC (Computer Numeric Control) system and the mold is a roll.

Figure 39A:
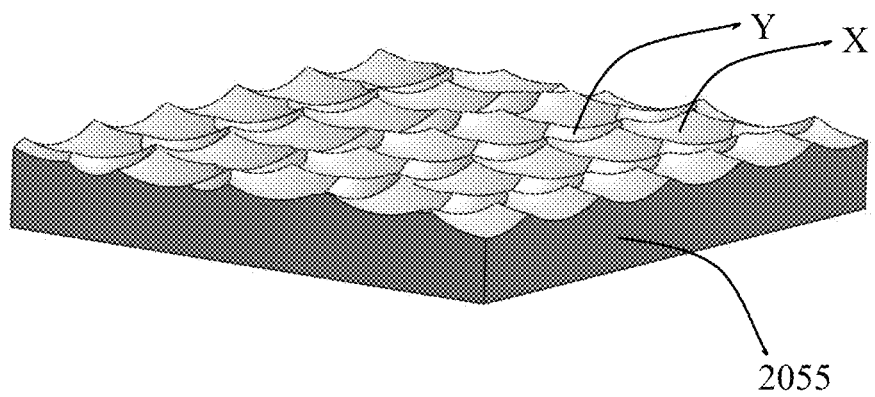
FIG. 39a is a schematic three-dimensional view of the mold having a plurality of trenches distributed across the surface thereof
Figure 39B:
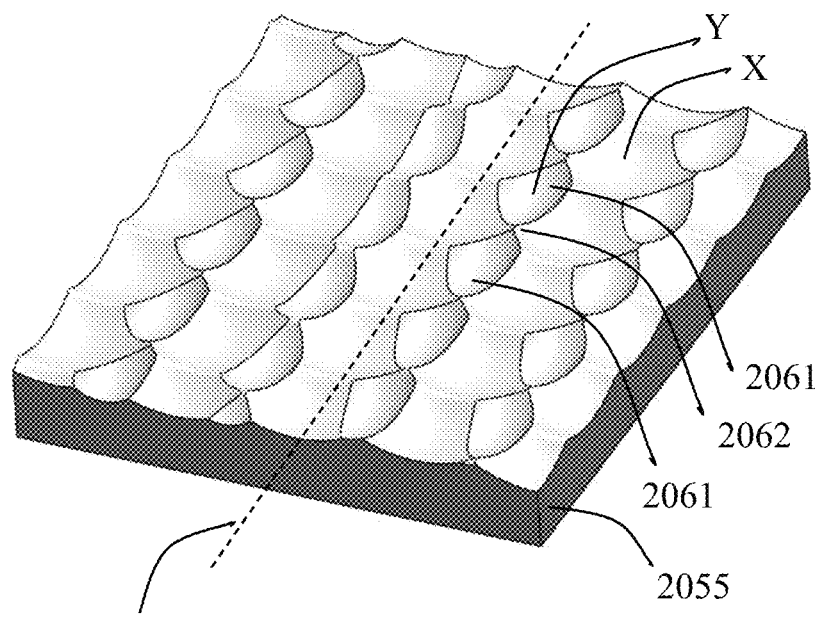
Figure 39C:
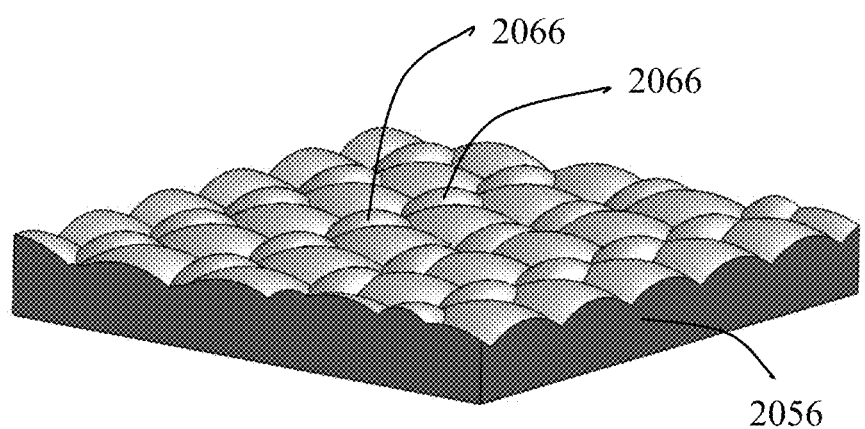
FIG. 39c is a schematic three-dimensional view of the substrate having an uneven structure (e.g., segments) formed thereon by embossing a thin film on the substrate.
Figure 39D:
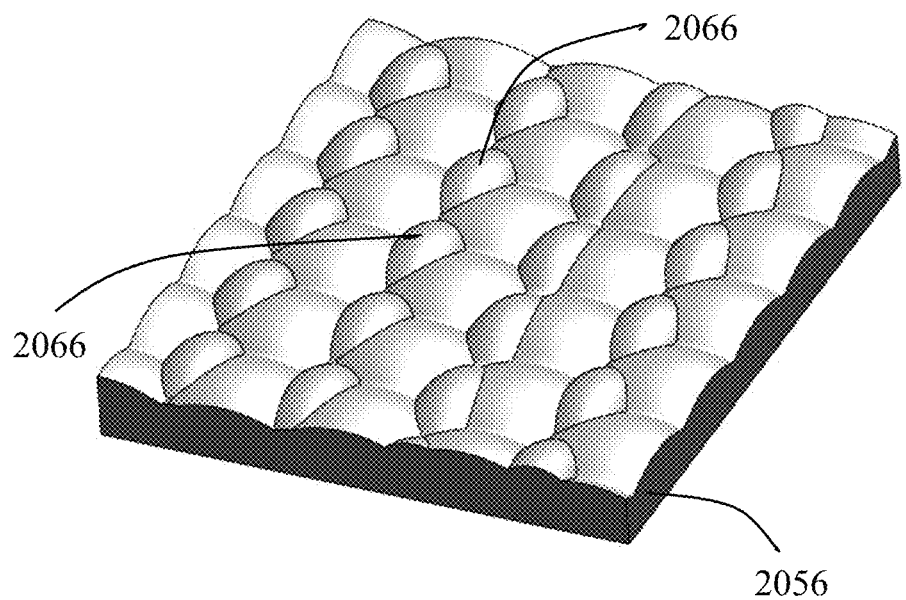
FIG. 39d is a schematic top view of FIG. 39c.

It should be noted that FIG. 33 to FIG. 37 illustrate a portion of trenches on the surface of the mold, however, the trenches can be distributed across the surface of the mold (see FIG. 39a and FIG. 39d). Moreover, the segments of the uneven structure to be formed on the substrate are complementary to (or correspond to) the portion of the trenches that is not cut off so that only a set of complementary figures (see FIG. 39a and FIG. 39d) are illustrated for convenience.

FIG. 33 to FIG. 37 illustrate a top view of a portion of trenches formed on the surface of the mold in various embodiments of the present invention, wherein opposing edges of each trench is shown for convenience. The trenches comprise at least one first trench (i.e. at least one first trench is cut off), wherein for any second trench of the at least one first trench, the second trench overlaps with at least one third trench different from the second trench such that the second trench is cut off by the at least one third trench. In one embodiment, see FIG. 33, the second trench is symbolized by 2001 and the third trench is symbolized by 2002. In one embodiment, see FIG. 34, the second trench is symbolized by 2003 and the third trenches are symbolized by 2004, 2005. In one embodiment, see FIG. 35, the second trench is symbolized by 2006 and the third trenches are symbolized by 2007, 2008; the second trench is symbolized by 2007 and the third trench is symbolized by 2008. In one embodiment, see FIG. 36, the second trench is symbolized by 2009 and the third trench is symbolized by 2010; the second trench is symbolized by 2010 and the third trench is symbolized by 2011. In one embodiment, see FIG. 37, the second trench is symbolized by 2013 and the third trench is symbolized by 2014. There is at least one space between trenches in FIG. 33 to FIG. 37, however, there can be no space between trenches (i.e. there is no space between the segments of the uneven structure). The second trench can overlap with two third trenches (e.g., or more) different from the second trench such that the second trench is cut off by the two third trenches (see FIG. 34 to FIG. 35). In one embodiment, each trench is the second trench cut off by the at least one third trench such that the uneven structure comprises no continuous lens or prism extending from an edge of the substrate to an opposite edge of the substrate.

When the trench A and the trench B (maybe at least one trench B) are formed so that the trench A has a first edge and a second edge and the trench B has a third edge and a fourth edge respectively correspond to the first edge and the second edge of the trench A, cut-off (i.e. the trench A is cut off by the trench B) can be defined as a portion of the third edge of the trench B is located outside the first edge of the trench A when the trench A and the trench B exaggeratively overlap with each other. There are many ways to form the overlap, such as controlling the depth variation of trenches (refer back to FIG. 15a to FIG. 15f), controlling the swing of the trenches (refer back to FIG. 13a, FIG. 13b, FIG. 14a and FIG. 14b) and controlling the depth variation and the swing of the trenches (refer back to FIG. 13a, FIG. 13b, FIG. 14a, FIG. 14b, FIG. 15a to FIG. 15f).

In one embodiment, the trenches comprise at least one first trench (i.e. at least one first trench is cut off), wherein for any second trench of the at least one first trench, the second trench overlaps with at least one third trench different from the second trench such that the second trench is cut off by the at least one third trench, wherein the at least one third trench comprises a fourth trench and a fifth trench, the second trench is cut off by the fourth trench in a first location of the second trench and the second trench is cut off by the fifth trench in a second location of the second trench different from the first location of the second trench. In one embodiment, refer back to FIG. 35, the second trench is symbolized by 2006, the third trenches are symbolized by 2007, 2008, the fourth trench is symbolized by 2007, the fifth trench is symbolized by 2008, the second trench 2006 is cut off by the fourth trench 2007 in a first location 2006A of the second trench 2006 and the second trench 2006 is cut off by the fifth trench 2008 in a second location 2006B of the second trench 2006 (different from the first location 2006A of the second trench 2006).

In one embodiment, the trenches comprise at least one first trench (i.e. at least one first trench is cut off), wherein for any second trench of the at least one first trench, the second trench overlaps with at least one third trench (different from the second trench) and a fourth trench (different from the second trench and the at least one third trench) such that the second trench is cut off by the at least one third trench, but is not cut off by the fourth trench. In one embodiment, refer back to FIG. 36, the second trench is symbolized by 2009, the third trench is symbolized by 2010, the fourth trench is symbolized by 2011, the second trench 2009 is cut off by the third trench 2010 but is not cut off by the fourth trench 2011 (see the location 2009A).

Figure 38A:
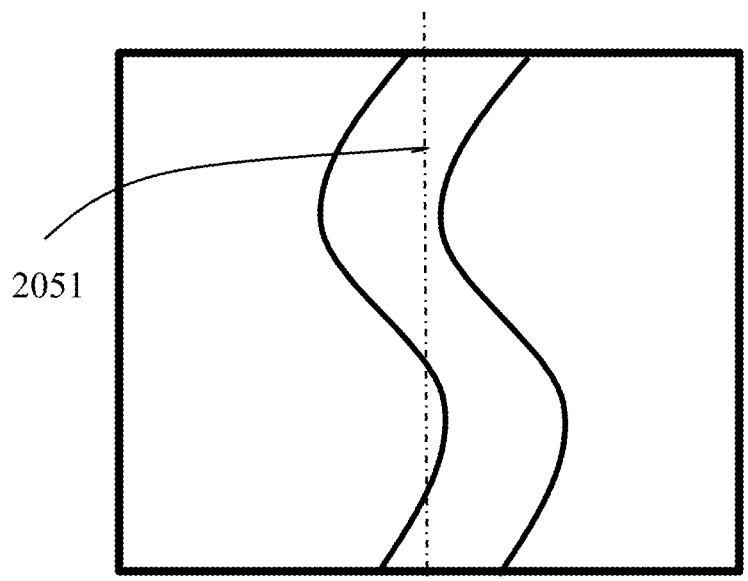
FIG. 38a illustrates a top view of the trench having a first longitudinal axis not located between the opposing edges thereof in FIG. 33 to FIG. 36.
Figure 38B:
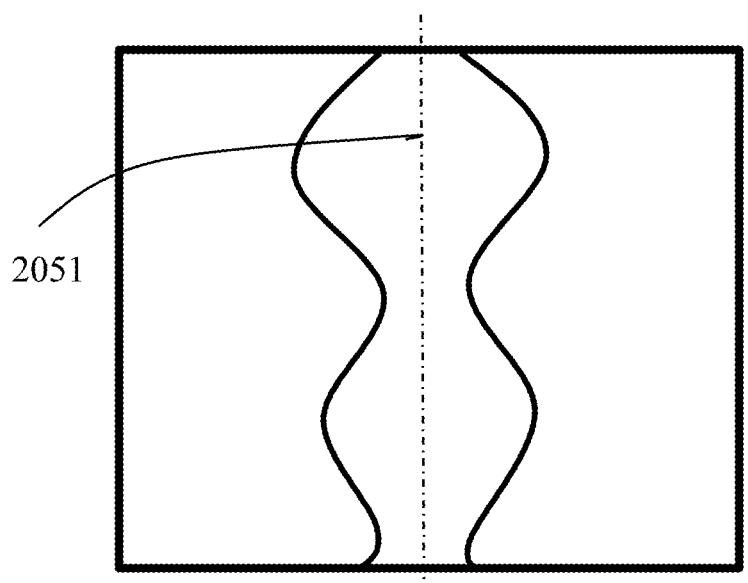
FIG. 38b illustrates a top view of the trench having a first longitudinal axis located between the opposing edges thereof in FIG. 37.

In the embodiments illustrated in FIG. 33 to FIG. 36, the opposing edges of each trench swing along a first longitudinal axis 2051, however, the first longitudinal axis 2051 is not located between the opposing edges of each trench (see FIG. 38a). The embodiments illustrated in FIG. 33 to FIG. 36 can be done by controlling swing of the trenches (refer back to FIG. 13a, FIG. 13b, FIG. 14a and FIG. 14b), preferably, by controlling less depth variation and more swing of the trenches (refer back to FIG. 13a, FIG. 13b, FIG. 14a, FIG. 14b, FIG. 15a to FIG. 15f). In the embodiments illustrated in FIG. 37, the first longitudinal axis 2051 is located between the opposing edges of each trench (see FIG. 38b). The embodiments illustrated in FIG. 37 can be done by controlling the depth variation of the trenches (refer back to FIG. 15a to FIG. 15f) (i.e. cut a first trench 2013 along a first direction by maintaining the position of the hard tool substantially along a first straight line in the first direction (see the first longitudinal axis 2051 in FIG. 38b); and cut a second trench 2014 along the first direction by maintaining the position of the hard tool substantially along a second straight line (see the first longitudinal axis 2051 in FIG. 38b) parallel to the first straight line in the first direction, wherein the transverse width of the second trench 2014 controlled by the penetrating depth of the hard tool is increased enough to cut off the first trench 2013 along the transverse direction of the second trench 2014 such that the first trench 2013 is separated into a plurality of notches by the second trench 2014; if the penetrating depth of each of the first trench and the second trench is constant when it is cut along the first direction by maintaining the hard tool substantially along the first straight line in the first direction, it is impossible that the second trench 2014 cuts the first trench 2013 along the traverse direction thereof. In this case, the traverse width of the second trench 2014 is controlled by the penetrating depth of the hard tool, and the traverse width of the second trench 2014 increases to a certain degree enough to cut the first trench 2013 along the traverse direction thereof). Comparing with cutting each trench meandering along the first direction, cutting each trench by maintaining the hard tool substantially along the first line in the first direction not only shortens the time of the mold-making but also enhances the precision of the mold to reduce the error of the mold-making (the front end of the hard tool has an arc shape so as to guarantee that each trench cut on the mold has a smooth arc shape and the film embossed by the mold has a better diffusion performance). Preferably, the embodiments illustrated in FIG. 37 can be done by controlling more depth variation and less swing of trenches (refer back to FIG. 13a, FIG. 13b, FIG. 14a, FIG. 14b, FIG. 15a to FIG. 15f). The opposing edges of each trench may be symmetrical with the first longitudinal axis 2051. The opposing edges of each edge can be asymmetrical with the first longitudinal axis 2051, preferably, the average distance between one edge and the first longitudinal axis 2051 is substantially the same as the average distance between the other edge and the first longitudinal axis 2051.

Please refer back to FIG. 39a to FIG. 39d. FIG. 39a is a schematic three-dimensional view of the mold having a plurality of trenches distributed across the surface thereof. FIG. 39b is a schematic top view of FIG. 39a. FIG. 39c is a schematic three-dimensional view of the substrate having an uneven structure (e.g., segments) formed thereon by embossing a thin film on the substrate. FIG. 39d is a schematic top view of FIG. 39c. In the embodiment illustrated in FIG. 39a and FIG. 39b, a plurality of trenches are formed and distributed across the surface of the mold 2055 by controlling the depth variation of trenches, however, it is not limited to this case (for example, controlling the swing of the trenches, controlling the depth variation and the swing of the trenches). Specifically, when a trench X is cut later than a trench Y, the trench Y is cut off by the trench X and forms a plurality of parts 2061 substantially arranged in a first line 2063. There is a space 2062 between the adjacent parts 2061. In one embodiment, the width of the trench X is larger than that of the trench Y. Optionally, the width of a portion of the trench X is smaller than that of the trench Y. In another embodiment, the depth variation of the trench X is larger than that of the trench Y. After embossing, the parts 2061 across the surface of the mold 2055 are complementary to (or correspond to) the segments 2066 of the uneven structure formed on the substrate 2056.

It is contemplated within the scope and spirit of the present invention, further combination of two of more of the above described structured surface features may be implemented to be present in a single optical substrate, to obtain the desired optimal result for a particular application with an LC module.

Figure 25:
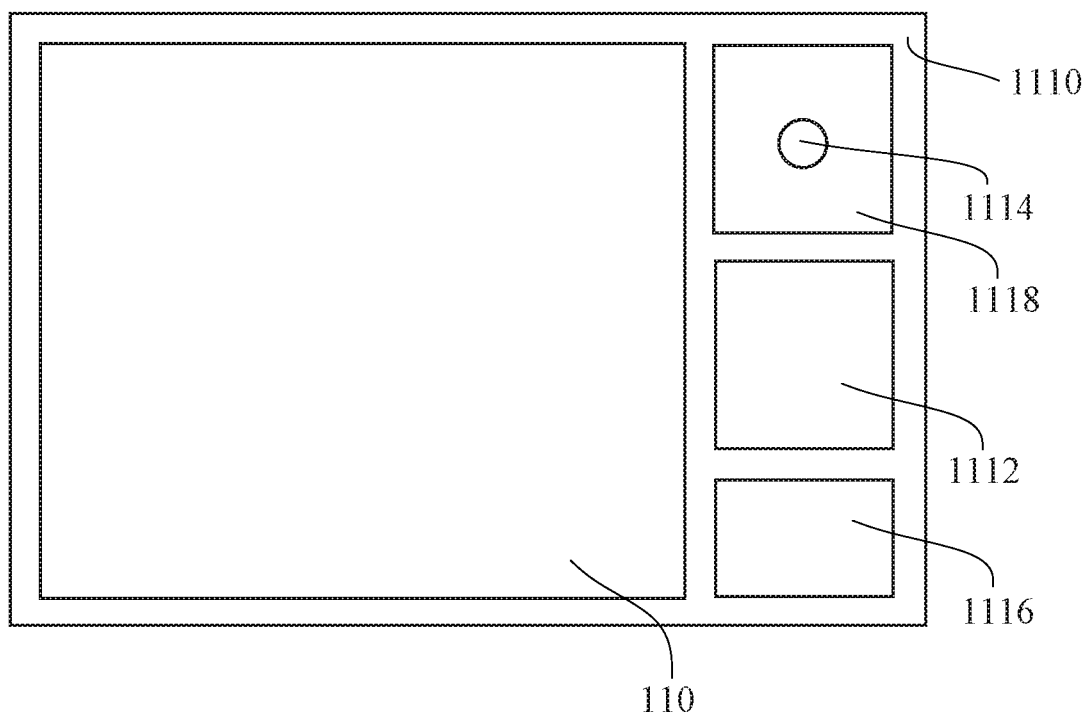
FIG. 25 illustrates an electronic device comprising an LCD panel that incorporates the inventive optical substrate of the present invention, in accordance with one embodiment of the present invention.

The optical substrates in accordance with the present invention may be used with LCDs to be deployed for displays, for example, for televisions, notebook computers, monitors, portable devices such as cell phones, digital cameras, PDAs and the like, to make the displays brighter. In accordance with the present invention, the optical substrate (e.g., 50 in FIG. 6a, and 1050 in FIG. 27) comprises a prismatic, structured light output surface and a structure lenticular light input surface, which together enhances brightness, reduces interference fringes, and provides acceptable diffusion characteristics, when applied in an LCD for example. An inventive LCD incorporating the inventive optical substrate in accordance with the present invention may be deployed in an electronic device. As shown in FIG. 25, an electronic 1100 (which may be one of a PDA, mobile phone, television, display monitor, portable computer, refrigerator, etc.) comprises the inventive LCD 110 in accordance with one embodiment of the present invention. The LCD 110 comprises the inventive optical substrate described above. The electronic device 1110 may further include within a suitable housing, a user input interface such as keys and buttons (schematically represented by the block 1116), image data control electronics, such as a controller (schematically represented by block 1112) for managing image data flow to the LCD 110, electronics specific to the electronic device 1110, which may include a processor, A/D converters, memory devices, data storage devices, etc. (schematically collectively represented by block 1118), and a power source such as a power supply, battery or jack for external power source (schematically represented by block 1114), which components are well known in the art.

It will be apparent to those skilled in the art that various modifications and variations can be made to the disclosed structures and processes of the present invention without departing from the scope or spirit of the invention. In view of the foregoing descriptions, it is intended that the present invention covers modifications and variations of this invention if they fall within the scope of the following claims and their equivalents.

What is claimed is:

1. An optical sheet, comprising:
   a substrate having a first surface and a second surface opposite to the first surface; and
   a film having a third surface and a fourth surface opposite to the third surface, wherein the third surface of the film is on the first surface of the substrate and the fourth surface of the film comprises a plurality of lenticular segments each of which does not extend from a first edge of the substrate to a second edge of the substrate opposite to the first edge of the substrate, wherein each first lenticular segment of the plurality of lenticular segments is enclosed by a plurality of second lenticular segments arranged in a closed path and each of the plurality of second lenticular segments overlaps the corresponding first lenticular segment, wherein the overall exposed surface of each first lenticular segment of the plurality of lenticular segments is a roughed surface.

2. The optical sheet according to claim 1, wherein the roughed surface of each of the plurality of first lenticular segments has a plurality of convex features thereon.

3. The optical sheet according to claim 2, wherein the size of the first lenticular segment is larger than the size of the convex feature.

4. The optical sheet according to claim 1, wherein the roughed surface of each of the plurality of first lenticular segments has a plurality of concave features thereon.

5. The optical sheet according to claim 4, wherein the size of the first lenticular segment is larger than the size of the concave feature.

6. The optical sheet according to claim 1, wherein each two adjacent lenticular segments overlap so as to have no space therebetween.

7. The optical sheet according to claim 1, wherein the first surface of the substrate is a major light input surface and the second surface the substrate is a major light output surface.

8. The optical sheet according to claim 7, further comprising a prismatic structure disposed on the second surface of the substrate, wherein the prismatic structure comprises a plurality of prisms each of which extends substantially in a first direction.

9. The optical sheet according to claim 1, wherein each of the plurality of lenticular segments has an elliptic-like projection on the first surface of the substrate.

10. An optical sheet, comprising:
    a substrate having a first surface and a second surface opposite to the first surface;
    a prismatic structure disposed on the second surface of the substrate, wherein the prismatic structure comprises a plurality of prisms each of which extends substantially in a first direction; and
    a film having a third surface and a fourth surface opposite to the third surface, wherein the third surface of the film is on the first surface of the substrate and the fourth surface of the film comprises a plurality of light-diffusing elements each of which does not extend from a first edge of the substrate to a second edge of the substrate opposite to the first edge of the substrate, wherein each first light-diffusing element of the plurality of light-diffusing elements is enclosed by a plurality of second light-diffusing elements arranged in a closed path and each of the plurality of second light-diffusing elements overlaps the corresponding first light-diffusing element, wherein the overall exposed surface of each first light-diffusing element of the plurality of light-diffusing elements is a roughed surface.

11. An optical sheet, comprising:
    a substrate having a first surface and a second surface opposite to the first surface; and
    a film having a third surface and a fourth surface opposite to the third surface, wherein the third surface of the film is on the first surface of the substrate and the fourth surface of the film comprises a plurality of lenticular segments each of which does not extend from a first edge of the substrate to a second edge of the substrate opposite to the first edge of the substrate, wherein each first lenticular segment of the plurality of lenticular segments is enclosed by a plurality of second lenticular segments arranged in a closed path, wherein each first lenticular segment of the plurality of lenticular segments has a top and an enclosed valley region formed by each of the plurality of second lenticular segments overlapping the corresponding first lenticular segment, wherein the overall exposed surface of each of the plurality of first lenticular segments is roughed from the top to the enclosed valley region.

12. The optical sheet according to claim 11, wherein each of the plurality of lenticular segments has an elliptic-like projection on the first surface of the substrate.

13. The optical sheet according to claim 11, wherein each two adjacent lenticular segments overlap so as to have no space therebetween.

14. The optical sheet according to claim 11, wherein the first surface of the substrate is a major light input surface and the second surface the substrate is a major light output surface.

15. The optical sheet according to claim 14, further comprising a prismatic structure disposed on the second surface of the substrate, wherein the prismatic structure comprises a plurality of prisms each of which extends substantially in a first direction.

16. The optical sheet according to claim 11, wherein the roughed surface of each of the plurality of first lenticular segments has a plurality of convex features thereon.

17. The optical sheet according to claim 16, wherein the size of the first lenticular segment is larger than the size of the convex feature.

18. The optical sheet according to claim 11, wherein the roughed surface of each of the plurality of first lenticular segments has a plurality of concave features thereon.

19. The optical sheet according to claim 18, wherein the size of the first lenticular segment is larger than the size of the concave feature.

* * * * *